(12) United States Patent
Stranic et al.

(10) Patent No.: US 12,423,891 B2
(45) Date of Patent: Sep. 23, 2025

(54) SYSTEMS AND METHODS FOR VISUALIZING TENSOR DATASETS

(71) Applicant: Snark AI, Inc., San Francisco, CA (US)

(72) Inventors: Ivo Stranic, Brooklyn, NY (US); Tatevik Hakobyan, Burlington, MA (US); Davit Buniatyan, Mountain View, CA (US); Sasun Hambardzumyan, Yerevan (AM); Hrant Topchyan, Yerevan (AM)

(73) Assignee: Snark AI, Inc., San Francisco, CA (US)

( * ) Notice: Subject to any disclaimer, the term of this patent is extended or adjusted under 35 U.S.C. 154(b) by 191 days.

(21) Appl. No.: 18/094,187

(22) Filed: Jan. 6, 2023

(65) Prior Publication Data
US 2024/0233222 A1    Jul. 11, 2024

(51) Int. Cl.
| | |
|---|---|
| *G06T 11/60* | (2006.01) |
| *G06F 16/22* | (2019.01) |
| *G06F 16/25* | (2019.01) |
| *G06F 16/26* | (2019.01) |
| *G06T 3/20* | (2006.01) |
| *G06T 3/40* | (2024.01) |

(52) U.S. Cl.
CPC .......... *G06T 11/60* (2013.01); *G06F 16/2264* (2019.01); *G06F 16/258* (2019.01); *G06F 16/26* (2019.01); *G06T 3/20* (2013.01); *G06T 3/40* (2013.01)

(58) Field of Classification Search
CPC ............ G06T 11/60; G06T 3/20; G06T 3/40; G06F 16/2264; G06F 16/258; G06F 16/26
See application file for complete search history.

(56) References Cited

U.S. PATENT DOCUMENTS

| | | | |
|---|---|---|---|
| 6,801,908 B1* | 10/2004 | Fuloria | ............... G06F 16/2428 |
| 2011/0288929 A1* | 11/2011 | Mei | ..................... G06F 16/4393 |
| | | | 707/E17.084 |

(Continued)

OTHER PUBLICATIONS

Activeloop, "The Future of Deep Learning with Deep Lake" CIDR 2023, 17 pages.

(Continued)

*Primary Examiner* — Jeffery A Brier
(74) *Attorney, Agent, or Firm* — Foley & Lardner LLP

(57) ABSTRACT

A method can include identifying, by one or more processors, filtering criteria for displaying a multi-dimensional sample dataset within a display region. The method can include selecting, by the one or more processors, based on the filtering criteria, a subset of samples from the multi-dimensional sample dataset, each sample of the subset of samples associated with a respective set of tensors that are to be displayed within the display region. The method can include mapping, by the one or more processors, display data associated with the respective set of tensors of each sample of the subset of samples to respective display locations for display in the display region. The method can include presenting, by the one or more processors, the display data associated with the respective set of tensors in the display region according to the mapping.

17 Claims, 26 Drawing Sheets
(19 of 26 Drawing Sheet(s) Filed in Color)

(56) References Cited

U.S. PATENT DOCUMENTS

2015/0324101 A1* 11/2015 Roesch ............... G06T 11/206
  715/771
2022/0121880 A1 4/2022 Buniatyan

OTHER PUBLICATIONS

Hambardzumyan, et al. 2023. "Deep Lake: a Lakehouse for Deep Learning." CIDR 2023, Jan. 8-11, 2023, Amsterdam, The Netherlands, 12 pages.

* cited by examiner

FIG. 2

SYSTEMS AND METHODS FOR VISUALIZING TENSOR DATASETS

BACKGROUND

The present disclosure relates generally to visualization and machine learning systems. A machine learning model can be trained based on a training dataset. However, the training dataset can be large (e.g., 1 gigabyte (GB), 10 GB, 100 GB, 1 terabyte (TB), 10 TB etc.) and complex. The large size, complexity, and format of the dataset can create technical difficulties in communicating the dataset between systems, storing the dataset, processing the dataset, and displaying the dataset. Furthermore, engineers, data scientists, or users may lack the tools to understand and visualize the training dataset.

SUMMARY

One implementation of the present disclosure is a method. The method can include identifying, by one or more processors, a display region for displaying a first subset of samples of a multi-dimensional sample dataset, the display region corresponding to a first zoom level, each sample of the first subset associated with a respective set of tensors. The method can include selecting, by the one or more processors, a first subset of tensors of the respective set of tensors for each sample of the first subset of samples based on the first zoom level of the display region. The method can include presenting, by the one or more processors, first display data corresponding the first subset of tensors within the display region. The method can include receiving, by the one or more processors, a request to adjust the first zoom level to a second zoom level. The method can include selecting, by the one or more processors, a second subset of tensors of the respective set of tensors for each sample of a second subset of samples, the second subset of samples identified from the multi-dimensional sample dataset based on the second zoom level, the second subset of tensors having at least one different tensor type than the first subset of tensors. The method can include presenting, second display data corresponding to the second subset of tensors within the display region.

In some implementations, the second subset of samples is a subset of the first subset of samples.

In some implementations, the second subset of samples is a superset of the first subset of samples and a subset of the multi-dimensional sample dataset.

In some implementations, the method includes selecting, by the one or more processors, the first subset of tensors based on a visibility rule for tensor types associated with the first zoom level.

In some implementations, the method includes receiving, by the one or more processors, the request to adjust the first zoom level including a receiving, by the one or more processors, a request to change a display arrangement of the multi-dimensional sample dataset.

In some implementations, a first tensor data type of a first tensor of the first subset of tensors includes image data. In some implementations, a second tensor data type of a second tensor of the first subset of tensors includes mask data, label data, or bounding box data.

In some implementations, a first sample of the first subset of samples includes the first tensor and the second tensor. In some implementations, the second subset of tensors includes the first tensor and does not include the second tensor.

In some implementations, the method includes presenting, by the one or more processors, the first display data including generating a first set of fetch requests for the first display data corresponding the first subset of tensors.

In some implementations, the method includes presenting, by the one or more processors, the second display data by generating, by the one or more processors, a second set of additional fetch requests for the second display data corresponding to the second subset of tensors. In some implementations, the second subset of tensors is a superset of the first subset of tensors.

In some implementations, the second subset of tensors is a subset of the first subset of tensors. In some implementations, the method includes presenting, by the one or more processors, the first display data including canceling, by the one or more processors, one or more of the first set of fetch requests that do not correspond to the second display data associated with the second subset of tensors.

Another implementation of the present disclosure is a system. The system can include a data processing system including memory storing instructions coupled to one or more processors. The data processing system can identify a display region for displaying a first subset of samples of a multi-dimensional sample dataset, the display region corresponding to a first zoom level, each sample of the first subset associated with a respective set of tensors. The data processing system can select a first subset of tensors of the respective set of tensors for each sample of the first subset of samples based on the first zoom level of the display region. The data processing system can present first display data corresponding the first subset of tensors within the display region. The data processing system can receive a request to adjust the first zoom level to a second zoom level. The data processing system can select a second subset of tensors of the respective set of tensors for each sample of a second subset of samples, the second subset of samples identified from the multi-dimensional sample dataset based on the second zoom level, the second subset of tensors having at least one different tensor type than the first subset of tensors. The data processing system can present second display data corresponding to the second subset of tensors within the display region.

In some implementations, the second subset of samples is a subset of the first subset of samples.

In some implementations, the second subset of samples is a superset of the first subset of samples and a subset of the multi-dimensional sample dataset.

In some implementations, the data processing system operates to select the first subset of tensors is based on a visibility rule for tensor types associated with the first zoom level.

In some implementations, the data processing system operates to receive a request to change a display arrangement of the multi-dimensional sample dataset.

In some implementations, the data processing system operates to generate a first set of fetch requests for the first display data corresponding the first subset of tensors.

In some implementations, a first tensor data type of a first tensor of the first subset of tensors includes image data. In some implementations, a second tensor data type of a second tensor of the first subset of tensors includes mask data, label data, or bounding box data.

In some implementations, a first sample of the first subset of samples includes the first tensor and the second tensor. In some implementations, the second subset of tensors includes the first tensor and does not include the second tensor.

Another implementation of the present disclosure is a method. The method can include identifying, by one or more processors, a display region for displaying a first subset of samples of a multi-dimensional sample dataset, the display region corresponding to a first display position, each sample of the first subset associated with a respective set of tensors that are to be displayed within the display region. The method can include generating, by the one or more processors, a first set of fetch requests for the respective set of tensors of the respective set of tensors of each sample of the first subset of samples. The method can include receiving, by the one or more processors, a request to adjust the first display position to a second display position. The method can include terminating, by the one or more processors, one or more of the first set of fetch requests based on the second display position. The method can include generating, by the one or more processors, a second set of fetch requests for the respective set of tensors of each sample of a second subset of samples selected based on the second display position. The method can include presenting, by the one or more processors, display data corresponding to the respective set of tensors of each sample of the second subset of samples within the display region.

In some implementations, the method includes receiving, by the one or more processors, a zoom level for the display region. In some implementations, the method includes selecting, by the one or more processors, a subset of tensors of the respective set of tensors for at least one sample of the second subset of samples, the second subset of samples identified from the multi-dimensional sample dataset based on the zoom level. In some implementations, the method includes presenting, second display data corresponding to the subset of tensors within the display region.

Another implementation of the present disclosure is a method. The method can include identifying, by one or more processors, filtering criteria for displaying a multi-dimensional sample dataset within a display region. The method can include selecting, by the one or more processors, based on the filtering criteria, a subset of samples from the multi-dimensional sample dataset, each sample of the subset of samples associated with a respective set of tensors that are to be displayed within the display region. The method can include mapping, by the one or more processors, display data associated with the respective set of tensors of each sample of the subset of samples to respective display locations for display in the display region. The method can include presenting, by the one or more processors, the display data associated with the respective set of tensors in the display region according to the mapping.

In some implementations, the method can include mapping, by the one or more processors, the display data to a two-dimensional grid format.

In some implementations, the method can include mapping, by the one or more processors, the display data to a list format.

In some implementations, the method can include receiving, by the one or more processors, a request to adjust a first display position of the display region to a second display position. The method can include selecting, by the one or more processors, based on the filtering criteria and the second display position, a second subset of samples from the multi-dimensional sample dataset. The method can include mapping, by the one or more processors, second display data associated with the respective set of tensors of each sample of the second subset of samples to respective display locations for display in the display region. The method can include presenting, by the one or more processors, the second display data associated with the respective set of tensors of the second subset of samples in the display region according to the second mapping.

In some implementations, the method can include receiving, by the one or more processors, a request to adjust a first zoom level of the display region to a second zoom level. In some implementations, the method can include selecting, by the one or more processors, based on the filtering criteria and the second zoom level, a second subset of samples from the multi-dimensional sample dataset. In some implementations, the method can include mapping, by the one or more processors, second display data associated with a subset of the respective set of tensors of each sample of the second subset of samples to respective display locations for display in the display region, the subset of the respective set of tensors selected based on the second zoom level. In some implementations, the method can include presenting, by the one or more processors, the second display data associated with the respective set of tensors of the second subset of samples in the display region according to the second mapping.

In some implementations, the method can include generating, by the one or more processors, a set of fetch requests for the display data corresponding to the respective set of tensors of the subset of samples.

In some implementations, the method can include terminating, by the one or more processors, at least one of the set of fetch requests for the display data responsive to receiving a request to adjust a first zoom level of the display region to a second zoom level.

In some implementations, the method can include terminating, by the one or more processors, at least one of the set of fetch requests for the display data responsive to receiving a request to adjust a first display location of the display region to a second display location.

Another implementation of the present disclosure is a system. The system can include a data processing system including memory coupled to one or more processors to identify filtering criteria for displaying a multi-dimensional sample dataset within a display region. The data processing system can select based on the filtering criteria, a subset of samples from the multi-dimensional sample dataset, each sample of the subset of samples associated with a respective set of tensors that are to be displayed within the display region. The data processing system can map display data associated with the respective set of tensors of each sample of the subset of samples to respective display locations for display in the display region. The data processing system can present the display data associated with the respective set of tensors in the display region according to the mapping.

In some implementations, the data processing system operates to map the display data to a two-dimensional grid format.

In some implementations, the data processing system operates to map the display data to a list format.

In some implementations, the data processing system operates to receive a request to adjust a first display position of the display region to a second display position. In some implementations, the data processing system operates to select based on the filtering criteria and the second display position, a second subset of samples from the multi-dimensional sample dataset. In some implementations, the data processing system operates to map second display data associated with the respective set of tensors of each sample of the second subset of samples to respective display locations for display in the display region. In some implementations, the data processing system present the second display data associated with the respective set of tensors of the second subset of samples in the display region according to the second mapping.

In some implementations, the data processing system operates to receive a request to adjust a first zoom level of the display region to a second zoom level. In some implementations, the data processing system operates to select based on the filtering criteria and the second zoom level, a second subset of samples from the multi-dimensional sample dataset. In some implementations, the data processing system operates to map second display data associated with a subset of the respective set of tensors of each sample of the second subset of samples to respective display locations for display in the display region, the subset of the respective set of tensors selected based on the second zoom level. In some implementations, the data processing system operates to present the second display data associated with the respective set of tensors of the second subset of samples in the display region according to the second mapping.

In some implementations, the data processing system operates to generate a set of fetch requests for the display data corresponding to the respective set of tensors of the subset of samples.

In some implementations, the data processing system operates to terminate at least one of the set of fetch requests for the display data responsive to receiving a request to adjust a first zoom level of the display region to a second zoom level.

In some implementations, the data processing system operates to terminate at least one of the set of fetch requests for the display data responsive to receiving a request to adjust a first display location of the display region to a second display location.

Another implementation of the present disclosure is one or more storage media storing instructions thereon, that, when executed by one or more processors, cause the one or more processors to identify filtering criteria for displaying a multi-dimensional sample dataset within a display region. The instructions can cause the one or more processors to select based on the filtering criteria, a subset of samples from the multi-dimensional sample dataset, each sample of the subset of samples associated with a respective set of tensors that are to be displayed within the display region. The instructions can cause the one or more processors to map display data associated with the respective set of tensors of each sample of the subset of samples to respective display locations for display in the display region. The instructions can cause the one or more processors to present the display data associated with the respective set of tensors in the display region according to the mapping.

In some implementations, the instructions cause the one or more processors to receive a request to adjust a first display position of the display region to a second display position. The instructions cause the one or more processors to select based on the filtering criteria and the second display position, a second subset of samples from the multi-dimensional sample dataset. In some implementations, the instructions cause the one or more processors to map second display data associated with the respective set of tensors of each sample of the second subset of samples to respective display locations for display in the display region. In some implementations, the instructions cause the one or more processors to present the second display data associated with the respective set of tensors of the second subset of samples in the display region according to the second mapping.

In some implementations, the instructions cause the one or more processors to receive a request to adjust a first zoom level of the display region to a second zoom level. In some implementations, the instructions cause the one or more processors to select based on the filtering criteria and the second zoom level, a second subset of samples from the multi-dimensional sample dataset. In some implementations, the instructions cause the one or more processors to map second display data associated with a subset of the respective set of tensors of each sample of the second subset of samples to respective display locations for display in the display region, the subset of the respective set of tensors selected based on the second zoom level. In some implementations, the instructions cause the one or more processors to present the second display data associated with the respective set of tensors of the second subset of samples in the display region according to the second mapping.

In some implementations, the instructions cause the one or more processors to generate a set of fetch requests for the display data corresponding to the respective set of tensors of the subset of samples.

Another implementation of the present disclosure is a method. The method can include receiving, by one or more processors, a request to modify a layout for samples of a multi-dimensional sample dataset, each sample of the multi-dimensional dataset corresponding to a respective tensor or set of tensors. The method can include providing, by the one or more processors, a graphical user interface that enables modification of the layout. The method can include receiving, responsive to providing the graphical user interface, a first request to create or modify a first view of one or more first tensor types of the respective tensors of each sample of the multi-dimensional sample dataset, the request identifying one or more first tensor types and one or more of a first view size and a first view position. The method can include receiving a second request to create or modify a second view of one or more second tensor types of the respective tensors of each sample of the multi-dimensional sample dataset, the request identifying the one or more second tensor types and one or more of a second view size and a second view position. The method can include generating, by the one or more processors, the layout based on the first request and the second request, the layout including the first view and the second view. The method can include presenting, by the one or more processors, at least a portion of the multi-dimensional sample dataset according to the layout.

In some implementations, the one or more second tensor types has at least one tensor type in common with the one or more first tensor types.

In some implementations, the method can include retrieving, by the one or more processors, display data for at least the portion of the multi-dimensional sample dataset based on the layout.

In some implementations, the method can include providing, by the one or more processors, an indication of each tensor associated with each sample of the multi-dimensional sample dataset.

In some implementations, the method includes receiving, by the one or more processors, an interaction that defines a change in the first view position of the first view.

In some implementations, the method includes receiving, by the one or more processors, an interaction that defines a change in the first view size of the first view.

In some implementations, the method includes receiving, by the one or more processors, an interaction that defines a subset of the tensors of each sample of the multi-dimensional sample dataset that are to be displayed according to the first view size and the second view position of the second view.

In some implementations, the one or more first tensor types are part of a first group of the respective tensors of each sample of the multi-dimensional sample dataset.

In some implementations, one or more of the first view size and the first view position are associated with a respective default value. In some implementations, the method can include generating, by the one or more processors, the layout by setting one or more of the first view size and the first view position to the respective default value.

In some implementations, the method can include receiving, by the one or more processors, a request to view at least a portion of the multi-dimensional dataset according to a second layout. In some implementations, the method can include presenting, by the one or more processors, at least the portion of the multi-dimensional sample dataset according to the second layout.

Another implementation of the present disclosure is a system. The system can include a data processing system including memory coupled to one or more processors to receive a request to modify a layout for samples of a multi-dimensional dataset, each sample of the multi-dimensional sample dataset corresponding to a respective tensor or set of tensors. The data processing system can provide a graphical user interface that enables modification of the layout. The data processing system can receive, responsive to providing the graphical user interface, a first request to create or modify a first view of one or more first tensor types of the respective tensors of each sample of the multi-dimensional sample dataset, the request identifying one or more first tensor types and one or more of a first view size and a first view position. The data processing system can receive a second request to create or modify a second view of one or more second tensor types of the respective tensors of each sample of the multi-dimensional sample dataset, the request identifying the one or more second tensor types and one or more of a second view size and a second view position. The data processing system can generate the layout based on the first request and the second request, the layout including the first view and the second view. The data processing system can present at least a portion of the multi-dimensional sample dataset according to the layout.

In some implementations, the one or more second tensor types has at least one tensor type in common with the one or more first tensor types.

In some implementations, the data processing system to receive an interaction that defines a change in the first view position of the first view.

In some implementations, the data processing system operates to receive an interaction that defines a change in the first view size of the first view.

In some implementations, one or more of the first view size and the first view position are associated with a respective default value. In some implementations, the data processing system operates to generate the layout by setting one or more of the first view size and the first view position to the respective default value.

Another implementation of the present disclosure is one or more storage media storing instructions thereon that, when executed by one or more processors, cause the one or more processors to receive a request to modify a layout for samples of a multi-dimensional dataset, each sample of the multi-dimensional sample dataset corresponding to a respective tensors. The instructions can cause the one or more processors to provide a graphical user interface that enables modification of the layout. The instructions can cause the one or more processors to, responsive to providing the graphical user interface, receive a first request to create or modify a first view of one or more first tensor types of the respective tensors of each sample of the multi-dimensional sample dataset, the request identifying one or more first tensor types and one or more of a first view size and a first view position. The instructions can cause the one or more processors to receive a second request to create or modify a second view of one or more second tensor types of the respective tensors of each sample of the multi-dimensional sample dataset, the request identifying the one or more second tensor types and one or more of a second view size and a second view position. The instructions can cause the one or more processors to generate the layout based on the first request and the second request, the layout including the first view and the second view. The instructions can cause the one or more processors to present at least a portion of the multi-dimensional sample dataset according to the layout.

In some implementations, the one or more second tensor types has at least one tensor type in common with the one or more first tensor types.

In some implementations, the instructions cause the one or more processors to receive an interaction that defines a change in the first view position of the first view.

In some implementations, the instructions cause the one or more processors to receive an interaction that defines a change in the first view size of the first view.

In some implementations, the one or more of the first view size and the first view position are associated with a respective default value. In some implementations, the instructions cause the one or more processors to generate the layout by setting one or more of the first view size and the first view position to the respective default value.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 2 is a block diagram of an example data lake where a sample including multiple tensors is read from chunks of the data lake.

DETAILED DESCRIPTION

Figure 1:
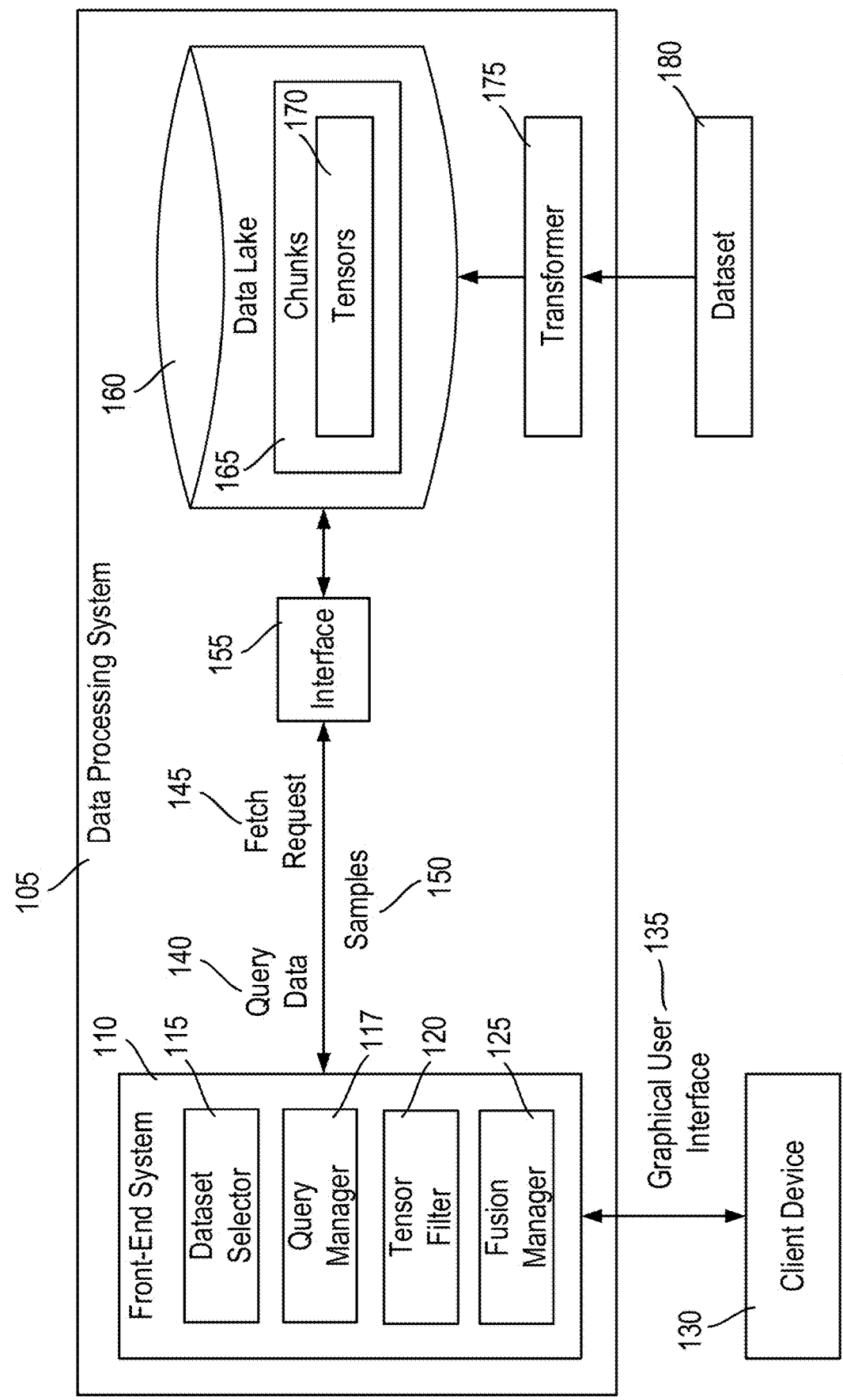
FIG. 1 is block diagram of an example data processing system that constructs a graphical user interface to display tensors that make up a sample of a dataset.

Referring generally to the figures, systems and methods for visualizing tensor datasets are shown and described. A data processing system can generate data to cause a client device to display a graphical user interface for visualizing tensors of a dataset. The dataset can be a set of samples for training a machine learning model or executing a machine learning process, although the dataset can be used for any other purpose. Each sample of the dataset can include, or be composed of, one or multiple tensors. Tensors can be multi-dimensional arrays (e.g., n-dimensional arrays) or similar multi-dimensional data structures. For example, a tensor can be a first order tensor (e.g., a scalar), a second order tensor (e.g., a vector), a third order tensor (e.g., e.g., a matrix), a fourth order tensor, or any other higher order tensor. The data processing system can construct graphical user interfaces to display samples of the dataset based on the tensors that make up each sample.

The data processing system can realize various processing resource improvements, memory storage improvements, network bandwidth improvements, and graphical user interface improvements. For example, the data processing system can generate a graphical user interface to display or visualize tensor data itself. Instead of requiring a file format utilized specifically for formatting or presentation, the data processing system can visualize tensors within the graphical user interface. The data processing system can present (e.g., translate, project, render, or draw) tensors as visual objects, graphic images, text representations, lines, shapes, pixel values, colors, etc. This can allow the data processing system to present a graphical user interface (e.g., generate/produce a graphical user interface or produce user interface elements for display in a graphical user interface) based on tensor data itself, allowing a user, engineer, data scientist, or any other person to visualize and understand the dataset without requiring the dataset to be stored in, or translated into, a file format normally used for visualizing information. Instead of requiring a data processing system to store samples of a first copy of a dataset in a tensor format for training a machine learning model and store a second copy of the dataset in a second format for display in a graphical user interface, the data processing system can construct graphical user interfaces to display samples from tensors of the dataset. The data processing system can further generate user interface elements corresponding to tensors and cause the user interface elements to be displayed within the graphical user interface.

This technique for visualizing tensor data can reduce data storage requirements for a dataset since the data processing system does not need to store duplicate copies of datasets, one dataset for machine learning and another dataset for visualization. For example, a different technical solution might store one copy of a dataset in a file format for presentation on a user interface and another copy of the dataset in a file format for machine learning. The present technical solution can reduce this duplicate data storage by presenting user interface elements for tensors within a graphical user interface instead of requiring duplicate data storage. The tensor based format may be applicable for machine learning and the data processing system can perform operates to generate user interface elements for a graphical user interface to display representations of the tenors.

Furthermore, the data processing system can improve the speed at which the data processing system can display samples within a graphic user interface by dynamically fetching, retrieving, streaming, or pulling samples from a data lake, database, data repository, storage component, or any other physical device or system or software component or construct. For example, instead of requiring an entire dataset to be retrieved for visualization, the data processing system can monitor which data samples a user has requested to view in the graphical user interface and the data processing system can retrieve those samples (e.g., or only those samples) that the user has requested. By dynamically retrieving only the samples that a user has requested to view in the graphical user interface, the data processing system can more quickly retrieve the samples from the data lake and reduce the amount of network resources consumed, compared to loading the entire dataset from the data lake. Furthermore, the data processing system can cancel, terminate, or stop requests if a user navigates, via the graphical user interface, away from viewing a first sample to viewing different samples or other information. The data processing system can monitor or detect that a request was sent to retrieve a sample but the user has navigated away from viewing the requested sample. Responsive to this detection, the data processing system can generate and transmit a cancel message to stop the sample from being retrieved, thus reducing the retrieval of samples that the data processing system does not need to display. This can reduce the total amount of network bandwidth utilized and reduces the total number of samples the data processing system needs to store.

Furthermore, the data processing system can translate a dataset into tensors and chunk the tensors, e.g., store the tensors as binary data within chunks of predefined sizes that include headers. Instead of storing each sample as its own file, or storing each tensor as its own file, the data processing system can dynamically retrieve bit or byte ranges of the chunks corresponding to tensors of specific samples. Furthermore, instead of retrieving an entire chunk, which may be significantly large (e.g., 5 megabytes (MB), 10 MB, 15 MB, 20 MB, etc.), the data processing system can identify which samples a user has requested to view in the graphical user interface and retrieve portions of the chunks (e.g., a bit or byte range) corresponding to the tensors of the requested samples for display within the graphical user interface. Retrieving only portions of the chunks, instead of the entire chunks, can greatly reduce the amount of data to be loaded and transported across a network. This can reduce overall memory resource consumption and lower network resource usage. In this regard, the data processing system can retrieve the tensors from the chunks for faster visualization within a graphical user interface. For example, the length of time between requesting a sample for display and displaying the sample in the graphical user interface can be reduced.

Furthermore, the data processing system can cache tensors of data samples that have been loaded for display, or actually been displayed, in the graphical user interface. This can lower or reduce the rate at which the data processing system makes redundant or duplicate request for samples. For example, if a user views a sample, the sample can be retrieved by the data processing system and cached and saved for an amount of time (e.g., a predefined amount of time). If the user then again requests to view the sample at a future time, the data processing system can rapidly and efficiently cause the cached sample to be displayed within the graphical user interface by loading the sample from the cache instead of requiring the data processing system to retrieve the sample a second time.

Referring now to FIG. 1, a data processing system 105 is shown that constructs a graphical user interface 135 to display tensors 170 that make up a sample 150 of a dataset 180. The data processing system 105 can be a server system, a cloud computing platform, a local computing system, a laptop computer, a desktop computer, a client device, or any other system that can process information. The data processing system 105 can be or include one or multiple computing nodes, servers, or distributed processing systems. The data processing system 105 can include a front-end system 110, an interface 155, a data lake 160, and a transformer 175. The front-end system 110, the interface 155, the data lake 160, and the transformer 175 can be pieces of software, applications, scripts, code, objects, etc. configured to perform tasks, operations, jobs, etc.

The front-end system 110, the interface 155, and the data lake 160 can be implemented on a single data processing system 105 or implemented on separate data processing systems 105. The front-end system 110 and the interface 155 can be pieces of computer software, modules, software components, etc. The data lake 160 can be or include a data repository, a database, a set of databases a storage medium, a storage device, etc. The data lake 160 can store structured or unstructured datasets 180. The data lake 160 can store one or multiple different datasets 180.

The front-end system 110 can construct, generate, build, implement, or create a graphical user interface 135. The front-end system 110 can generate data or instructions that cause the graphical user interface 135 to be constructed, displayed, or rendered on the client device 130. The front-end system 110 can construct the graphical user interface 135 and cause the client device 130 to display the graphical user interface 135. The front-end system 110 can generate data and transmit, communicate, send, or publish the data to the client device 130 causing the client device 130 to draw, build, or display the graphical user interface 135. The front-end system 110 can implemented or be written in WebAssembly (WASM) or C++ and can cause a web browser executing on the client device 130 to display the graphical user interface 135. The front-end system 110 can be a web-based front-end. The front-end system 110 can communicate the graphical user interface 135 to a software application run on the client device 130, and the software application can cause the graphical user interface 135 to be displayed on the client device 130.

The client device 130 can be a computer, such as a desktop computer or a laptop computer, a smartphone, a tablet, a server, a computing device, a stationary computing device, a portable computing device, a smartwatch, smart glasses, or any other type of computing or display system, device, or apparatus. The client device 130 can include a user interface for displaying information to a user. The user interface can be a screen, a touch-screen, a resistive touch-screen, a capacitive touch screen, a liquid crystal display (LCD), a light emitting diode (LED) display, a quantum dot LED (QLED) display, an organic light emitting diode (OLED) display, or any other type of display. The client device 130 can further include a speaker or speakers to play audio data, e.g., if the dataset 180 includes audio data, the client device 130 can play the audio data via the speakers. The client device 130 can include an input device for interacting with, manipulating, or providing data to the graphical user interface 135. The input device can be a keyboard, a mouse, a touch-screen, a microphone, or any other type of human machine interface. The client device 130 can be associated with (e.g., operated by, possessed by, managed by, owned by, etc.) an engineer, a data scientist, a business analyst, a user, or any other entity.

The front-end system 110 can generate the graphical user interface 135 to display samples 150 of a dataset 180 that may be used to train machine learning or artificial intelligence models, or that may be used as an inference dataset 180 that may be used during execution of a machine learning or artificial intelligence model. The front-end system 110 can communicate with the interface 155 to retrieve samples 150 of the dataset 180 to be displayed in the graphical user interface 135. The front-end system 110 can retrieve, receive, request, query, pull, or stream the samples 150 from the data lake 160 via the interface 155. The interface 155 can process requests, queries, or other data to retrieve samples 150 from the data lake 160 and provide, send, transmit, or stream the samples 150 to the front-end system 110 for display in the graphical user interface 135.

Each sample 150 can be, include, be associated with, correspond to, or be composed of, one or multiple tensors 170. The tensors 170 can be generated from data or files, such as image files, text files, audio files, video files, tags, binary code, or any other type of file used for training a machine learning model. For example, one sample 150 could include an image tensor 170 and a label tensor 170 that classifies the image tensor 170. Some tensors 170 can be classifications of information in other tensors 170, e.g., a label for an object in an image, a mask identifying pixels associated with an object in an image, a depth map indicating depth associated with pixels in an image, a bounding box identifying an object in an image. Such classifying information may be generated, for example, by a machine learning model, or may be generated by an unsupervised annotation process or a manual annotation process. The tensors 170 can be generated and stored in the data lake 160, or may be included within the dataset 180 during or after on-boarding. The tensors 170 of a sample 150 can be grouped together. For example, when the dataset 180 is on-boarded to the data lake 160, a particular sample file tensor 170 (e.g., which may represented data from an image, video, audio file) can be grouped with a corresponding label tensor 170 for the image. For example, a picture of a handwritten number, e.g., the number nine, could be a first tensor 170 while a label that classifies the picture as the number nine could be a second tensor 170. The samples 150 can include other tensors 170, for example, bounding boxes, masks, etc. The front-end system 110 can retrieve samples 150 (e.g., the underlying tensors 170 that make up the samples 150) and display the samples 150 (e.g., the tensors 170 that make up each sample 150) in the graphical user interface 135.

The front-end system 110 can include a dataset selector 115. The dataset selector 115 can receive a user input via the graphical user interface 135. The user input can be a resource identifier (e.g., a uniform resource location (URL)), a search request, or a graphical icon selection that identifies a dataset 180 from one or multiple datasets 180 stored by the data lake 160. The dataset selector 115 can receive the user input from the client device 130 and communicate with the interface 155 to retrieve at least a portion of the dataset 180 from the data lake 160 for display in the graphical user interface 135, responsive to the selection made by the user.

The front-end system 110 can generate or transmit requests or fetch requests 145 for samples 150 of the dataset 180. The front-end system 110 can generate or transmit fetch requests 145 for display data, e.g., tensors 170 of the samples 150, for display, presentation, or rendering within the graphical user interface 135. The fetch request 145 can identify a specific sample index, a list of sample indices, a window of sample indices, a range of sample indices, a collection of sample indices, etc. For example, the fetch request 145 can identify a window of data samples 150 between indices, e.g., samples 150 from indices 100 to 120. The interface 155 can retrieve the samples 150 and tensors 170 corresponding to the indices responsive to receiving the fetch request 145. The interface 155 can respond to the front-end system 110 with tensors 170 corresponding to the requested sample indexes.

The fetch request 145 can be a range request which indicates a bit or byte range of the chunks 165. The fetch request 145 can cause the interface 155 to read and retrieve bits or bytes within the bit or byte range from chunks 165 defined by the fetch request 145. The fetch request 145 can be generated by the front-end system 110 based on samples 150 displayed in the graphical user interface 135. For example, if the user requests to view samples 150 in the graphical user interface 135, instead of retrieving every sample 150 of the dataset 180, the front-end system 110 can retrieve only the samples 150 the user has requested to view. Furthermore, if the user requests to view samples 150 in the graphical user interface 135, instead of retrieving entire chunks 165 of the data lake 160, the front-end system 110 can retrieve only bits across a bit range or bytes across a byte range of the chunks 165. By only retrieving a portion of the chunks 165, instead of the entire chunks 165, the samples 150 can be loaded from the interface 155 to the front-end system 110 significantly faster since the chunks 165 can be large in size, e.g., 5 MB, 10 MB, 15 MB, 20 MB, etc.

If a user is viewing ten samples 150 from indices 100-120 in the graphical user interface 135, and the user scrolls, navigates, zooms in, zooms out, performs a dynamic, multidirectional scroll, or interacts with the graphical user interface 135 to display samples 150 from 120-140, the front-end system 110 can generate a fetch request 145 to retrieve samples 150 with indices 120-140. The front-end system 110 can transmit the fetch request 145 to the interface 155. The interface 155 can retrieve the samples 150 corresponding to the indices 120-140 and transmit the samples 150 back to the front-end system 110. The front-end system 110 can update the graphical user interface 135 to display the retrieved samples 150. For example, if a user is viewing samples 150 from indices 100-120, and then the user performs a navigation event to view samples 170-190, the system can generate one or a set of fetch requests 145 to retrieve samples 150 corresponding to indices 170-190. If samples 150 of index values 121-169 are outside the viewing area of the graphical user interface 135, the front-end system 110 may not generate a fetch request 145 for samples 150 of indices 121-169.

The fetch requests 145 can be generated by the front-end system 110 as a single bulk request for multiple samples 150 or multiple tensors 170 of one or multiple samples 150. The fetch request 145 can be generated by the front-end system 110 as a set of requests 145, e.g., individual request for individual samples 150 or individual requests for individual tensors 170 of individual samples 150. For example, the front-end system 110 can detect what display data is requested to be viewed by a user in the graphical user interface 135. For example, the front-end system 110 can identify what tiles, squares, or elements that are mapped to a particular samples 150 are within a viewing area or window. With the detected samples 150, the front-end system 110 can generate one or a set of fetch requests 145 for tensors 170 of samples 150 to be viewed within the graphical user interface 135. If the samples 150 are filtered, the set of fetch requests can be requests for tensors 170 for a portion or subset of samples 150 within a larger collection of samples 150. However, if the user navigates away from viewing the samples 150 before the interface 155 returns the requested tensors 170 for the requested samples 150, the front-end system 110 can cancel or terminate the fetch requests 145 for samples 150 that are no longer within a viewing area of the graphical user interface 135. For example, the front-end system 110 can terminate at least one fetch request 145 of the set of fetch requests 145 for the display data responsive to receiving a request to adjust a first zoom level of the display region to a second zoom level or adjust a first display location of a display region within the graphical user interface 135 to a second display location.

The front-end system 110 includes a query manager 117. The query manager 117 can receive, identify, or generate filtering criteria or query data 140. The query data 140 can be a query to view samples 150 of the dataset 180 according to certain parameters, query parameters, query rules, query indicators, query language text, criteria, filtering criteria, etc. The query data 140 can specify certain tensors 170 or tensor types. The tensors 170 can be objects or containers that describe data in n-dimensions, e.g., n-dimensional arrays. The tensors 170 can have a variety of orders, e.g., scalars, vectors, matrices, etc. The tensors 170 can be stored within chunks 165 in the data lake 160. The tensors 170 can be images, videos, labels, bounding boxes, user identifiers, timestamps, masks, depth indications, important points in an image, etc. Each tensor 170 can have a different order.

The query data 140 can specify certain tensors 170, e.g., images including objects classified to a certain category, images with bounding boxes with a height less than a particular level, images with only a single mask, etc. The interface 155 can receive the query data 140 and query the data lake 160 to retrieve samples 150 or indexes associated with the identified samples 150 that include the tensors 170 specified in the query. The interface 155 can respond to the front-end system 110 with a list, set, collection, group, or file of sample index values that indicate samples 150 that meet the criteria defined by the query data 140. The interface 155 can filter the samples 150 of the dataset 180 according to the indices viewed in the graphical user interface 135 and based on the fetch request 145 based on the query data 140. The front-end system 110 can send requests 145 for specific samples 150 of the list of indexes when the front-end system 110 receives a request to view samples of specific index values from the client device 130.

For example, the query manager 117 can identify filtering criteria 140 for displaying the multi-dimensional sample dataset 180 within a particular display region of the graphical user interface 135. The display region can be a window, a grid, a column, a page, etc. where one or multiple samples 150 are simultaneously rendered and viewed by a user in the graphical user interface 135. The query manager 117 can receive the filtering criteria 140 from the client device 130 as a text input, spoken words, a picture, an element selection, etc. The query manager 117 can select a subset of samples 150 from the data lake 160 based on the filtering criteria of the query data 140. For example, the query manager 117 can select the subset of samples 150 from the multi-dimensional sample dataset 180 by transmitting the query data 140 to the interface 155. Each sample of the dataset 180 (and of the subset of samples 150 that satisfy criteria of the query data 140) can include a respective set of tensors 170 that are to be displayed within the display region of the graphical user interface 135. The front-end system 110 (e.g., by communicating with the interface 155) can retrieve samples 150 for index values identifying samples 150 that meet the criteria of the query data 140 and return the samples 150 or the indices of the samples 150 to the query manager 117. The front-end system 110 can generate display data for the respective tensors 170 of the samples 150 retrieved from the interface 155. The front-end system 110 can map the display data to various locations for display in the display region of the graphical user interface 135. For example, the front-end system 110 can generate display data to display tensors 170 of certain samples 150 in particular tiles, boxes, squares, windows, etc. within a display region of the graphical user interface 135. The front-end system 110 can map the samples 150 to a grid (e.g., a two-dimensional grid format), a list (e.g., a column of elements), etc.

The front-end system 110 can include a tensor filter 120. The tensor filter 120 can cause or update the graphical user interface 135 to display or hide certain tensors 170 of samples 150 displayed in the graphical user interface 135. For example, the tensor filter 120 can cause the graphical user interface 135 to display a window, e.g., responsive to a request client device 130. The window can identify each tensor type of the tensors 170 of samples 150 being displayed in the graphical user interface 135. A user, via the client device 130, can interact with the window to display or hide each tensor based on tensor type. The user, via the client device 130 can display or hide each tensor independently, e.g., hide a first tensor type, display a second tensor type, hide a third tenor type, display a fourth tensor type, etc. The tensor filter 120 can update the samples 150 displayed in the graphical user interface 135, based on the user input received from the window, to display or hide tensors of the samples 150. The tensor filter 120 can further display or hide groups or sets of tensors 170. For example, a user, via the client device 130, may define multiple tensors as a group. The tensor filter 120 can allow a user to activate or deactivate the entire group of tensors 170 to display or hide the tensors 170.

The front-end system 110 can include a fusion manager 125. The fusion manager 125 can receive user input from the client device 130 and customize the layout of samples 150 in the graphical user interface 135. For example, the front-end system 110 can display the samples 150 within windows or user interface elements that are shaped as boxes, rectangles, three dimensional platforms, circles, triangles, prisms, grid squares, etc. The window of the sample 150 can include multiple sub-windows. Each sub-window can display a particular tensor of the sample 150. The sub-windows can be separate or overlapping. The fusion manager 125 can configure the layout of a single sample 150. The fusion manager 125 can create or delete sub-windows for tensors 170 within a larger window for the sample 150. The fusion manager 125 can allow a user to instantiate sub-windows, position the sub-windows, adjust the sizes and orientations of the sub-windows, etc. Furthermore, the fusion manager 125 can associate each sub-window with tensors 170 of a specific tensor type, based on user input received from the client device 130.

The fusion manager 125 can include a default layout for samples 150, e.g., an image within a first window, a label for the image in a top left corner of the image, etc. Responsive to displaying a canvas for editing views of different tensors 170 of a sample 150, the fusion manager 125 can display the views or windows on the canvas according to the default layout. The default layout can include various default values defining the number of views to be displayed, the size of each view, the corners of each view, the positions of each view, the tensor types for each view, etc. For example, one or more default values can define a size and position of a particular view. The front-end system 110 can generate a layout of views on a canvas for a user to edit according to the default values, for example, by generating the layout by setting one or more of a first view size and a first view position of a first view to respective default values, setting one or more of a second view size and a second view position of a second view to respective default values. The fusion manager 125 can allow a user to adjust the default layout and/or create a new layout of tensors 170 by providing requests, input, or interactions to the canvas 1800 of the graphical user interface 135 via the client device 130.

The fusion manager 125 can allow for multiple tensors 170 to be displayed in their own views or windows within a larger sample window. Because the user is able to separate out tensors 170 into different views, the user may be able to review the samples 150 of the dataset 180 in a manner that the user would not normally be able to view. For example, for an image, a user may not be able to simultaneously view the image and a depth map together. However, because the user can configure the views of the image tensor 170 and the depth map tensor 170 such that the user can view the image and depth map tensors 170 side-by-side, the user may be able to visually compare the image and depth map tensors 170 against each other and identify any errors that may be present, e.g., the depth map 170 not matching up to the image 170. Furthermore, if a particular image has a large number of classified objects, if a user views all of the bounding boxes and masks over a single image, the image may appear cluttered and difficult to understand. However, the fusion manager 125 can allow a user to view the image overlaid with bounding box in a first view and view the image overlaid with masks in a second view. Furthermore, with these two views, the user can quickly identify if there are any errors between the bounding boxes and the masks, for example, one box being misplaced or incorrectly sized and not properly covering pixels for an object identified by a mask.

The fusion manager 125 can allow a user to display more than one primary set of data, e.g., a set of data for an autonomous car could include a stereo camera feed, depth maps, disparity maps, etc. For example, for stereo camera images, a first window could display a left image (e.g., a first tensor), a second window can display a right image (e.g. a second tensor), a third window can display a depth image for the left image (e.g., a third tensor), and a fourth window can display a depth image for the right image (e.g., a fourth tensor). A user, via the client device 130, can provide user input customizing the shape, location, size of the sub-windows for the tensors 170 within the window for the sample 150. The fusion manager 125 can save a configuration for displaying the samples 150 according to the user customization. The fusion manager 125 can cause the graphical user interface 135 to display samples 150 of the dataset 180 according to the configuration specified by the user. The user can, via the client device 130, create multiple different configurations for viewing the samples 150. The front-end system 110 can save the different configurations and allow a user to select one configuration for displaying the samples 150.

The data processing system 105 can include a transformer 175. The transformer 175 can receive a structured or unstructured dataset 180 and transform the dataset 180 for storage in the data lake 160. The unstructured dataset 180 can include images (e.g., JPEG images, PNG images, GIF, SVG, etc.), videos (MP4, MOV, WMV, AVI), audio (e.g., MP3, MP4, WAV), labels or classifications for the images, videos, or audio, bounding boxes that identify specific objects within the images or videos, depth indications that represent the depth of objects within the images or videos, masks that identify a section of pixels of an image or video that corresponds to a particular classified object, or any other type of data. The transformer 175 can transform the unstructured dataset 180 into tensors 170 and store tensors 170 in the chunks 165. The chunks 165 can be fragments or portions of binary data. The chunks 165 can have predefined sizes. In some implementations, chunks 165 can have a predefined size corresponding to a type of tensor 170 to be saved within the chunk 165. The chunks 165 can include headers uniquely identifying the chunks 165 and/or metadata. The chunks 165 can include the binary data of the tensors 170. The headers of the chunks 165 can specify or identify the type of tenors 170 stored within each chunk 165. Each chunk 165 can include multiple tensors 170, e.g., one single chunk 165 can store a tensor 170 of a first image, a tensor 170 of a second image, and a tensor 170 of a third image.

The transformer 175 can generate chunks 165 of pre-defined sizes with the dataset 180. For example, the transformer 175 can generate a first chunk 165 and save tensors 170 of images in the chunk 165 until the chunk 165 is filled. The transformer 175 can then save the chunk 165 to the data lake 160 and begin filling the next chunk 165. Examples of transforming unstructured datasets 180 into tensors 170 and chunks 165 is described in detail in U.S. patent application Ser. No. 17/450,848 filed Oct. 14, 2021, the entirety of which is incorporated by reference herein.

Figure 2:
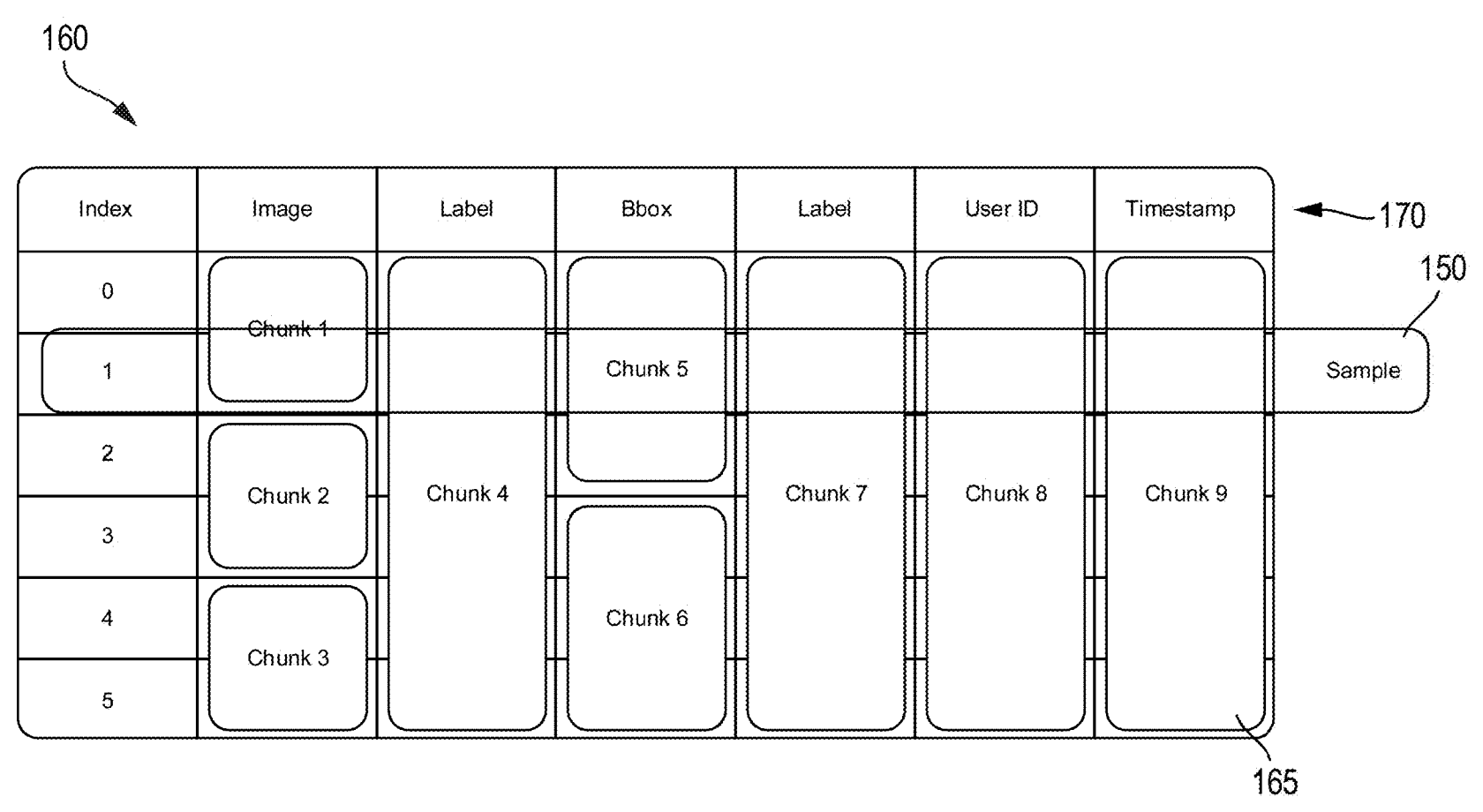

Referring now to FIG. 2, the data lake 160 is shown where a sample 150 including multiple tensors 170 is indicated as including a subset of the chunks 165 of the data lake 160. The data lake 160 can store chunks 165 in columns, rows, a matrix, etc. For example, each column of the data lake 160 can represent a specific tensor type that for which the chunks 165 are storing data. The columns can be or represent multi-dimensional arrays. For example, the dataset 180, after being stored in the data lake 160, can be a multi-dimensional dataset 180. The columns can include dynamic sizes, e.g., each column can represent a different tensor order. For example, the image tensor could be a third order tensor while the column for labels can be a first order tensor.

Furthermore, the data lake 160 can store rows. Each row can include an index. The index can be a tensor 170, e.g., a scalar value specifying a specific sample 150. The interface 155 can retrieve samples 150 from the data lake 160 by reading tensors 170 from multiple chunks 165. For example, if the interface 155 receives a request from the front-end system 110 to retrieve a sample 150 for index one, the interface 155 can retrieve tensors 170 from the chunks 165 corresponding to the index one. For example, responsive to the sample fetch request 145 for a sample 150 associated with an index of one, the interface 155 can retrieve an image from a first chunk ("chunk 1"), retrieve a label from the image from a fourth chunk ("chunk 4"), retrieve a bounding box for an object in the image from a fifth chunk ("chunk 5"), retrieve a label specific to the bounding box in a seventh chunk ("chunk 7"), retrieve a user identifier (ID) from an eighth chunk ("chunk 8"), and retrieve a time stamp for the image from a ninth chunk ("chunk 9"). The interface 155 can read or retrieve different bit or byte ranges of the chunks 165 to retrieve each tensor 170. The interface 155 can transmit the tensors 170 of the sample 150 for the index of one to the front-end system 110 responsive to the fetch request 145 for the sample 150 of the index of one.

The interface 155 can handle fetch requests 145 including index ranges received from the front-end system 110 in a similar manner. For example, the fetch request 145 can request a list, set, group, or range of indices. A range of indices can be samples 150 of indices between a lower and upper index, all indices between a lower and upper index that meet a criteria defined by the query data 140, all indices a number of above and below a particular index, etc. The interface 155 can retrieve, collect, identify, or pull the tensors 170 from the chunks 165 corresponding to the indices indicated by the fetch request 145. The interface 155 can return, transmit, provide, or communicate the samples 150 to the front-end system 110 for display in the graphical user interface 135.

The tensors 170 can include, be associated with, be linked to, or be mapped to type features, type categories, data types, tensor data types, or "htypes." The type feature can indicate the specific type of a tensor 170, e.g., whether a particular tensor 170 is an image, a label, a bounding box, etc. The type feature can be included within the tensors 170 or linked to, mapped with, connected to, or tagged to, the tensors 170. The front-end system 110 can use the type feature to determine how to render, draw, or display a particular tensor 170 in the graphical user interface 135. For example, for a tensor 170 of an image type, the front-end system 110 can render the image as red, green, and blue (RGB) pixels within the graphical user interface 135. For example, for a tensor 170 of a label type, the front-end system 110 can generate graphical text that represents the words of the label within the graphical user interface 135. The type features can be stored with each tensor 170 in the chunks 165, in headers of the chunks 165, or in a separate data storage element. Some tensor types may not be displayed and the front-end system 110 may not render data in the graphical user interface 135 responsive to receiving a tensor 170 of a tensor type that is not for display. For example, the following table illustrates tensors 170, data types of the tensors 170, tensor types, sample compression (or tensor compression), chunk compression, and tensor shape:

| Tensor Name | Images | Labels | Boxes | Masks |
|---|---|---|---|---|
| Data Type | uint8 | uint32 | float32 | bool |
| Tensor Type | image | class label | bbox | binary mask |
| Sample Compression | jpg | None | None | lz4 |
| Chunk Compression | None | None | None | None |
| Shape | (118287, 10:640, 59:640, 1:3) | (118287, 1,) | (118287, 0:93, 4,) | (118287, 51:640, 59:640, 0:93) |

A user, via the client device 130, can specify the type features for tensors 170 when the dataset 180 is on-boarded to the data processing system 105. The transformer 175 can compare the data entries for a particular tensor 170 against an expected number of values and dimensions associated with the tensor type to validate the selection made by the user. For example, if a user selects a bounding box type for a particular array of values, the transformer 175 can verify that the array of values includes a predefined number of values (e.g., four values or a number of values divisible by four). If the array does not include the correct number of values or the data element provided by the client device 130 does not include the correct dimension of arrays, the transformer 175 can generate an error and the front-end system 110 can display the error to the user within the graphical user interface 135 with an explanation of the mismatch between the expected number of values in an expected dimension of arrays.

The front-end system 110 can use the type features of the tensors 170 of a sample 150 to determine the order in which to render the tensors 170 of the sample 150 within the graphical user interface 135. For example, the front-end system 110 can store a ranking or hierarchy of tensor types and render the tensors 170 based on the ranking or hierarchy. For example, primary tensor 170, e.g., images, videos, or audio, can be rendered first by the front-end system 110. Then, secondary tensors 170 can be rendered by the front-end system 110 on top of the primary tensors 170, e.g., masks, labels, bounding boxes, etc. The ranking can store a list of each tensor type. The front-end system 110 can render the tensor 170 of the tensor type at the top of the ranking first and the tensors 170 of tensor types at the bottom of the hierarchy last.

The transformer 175 can compress the tensors 170 when the transformer 175 stores the tensors 170 within the data lake 160. The transformer 175 can apply a different type of compression to different types of tensors 170. For example, images can be compressed with PNG, JPEG, or another format. Mask tensors 170 can be compressed with lz4 compression. The front-end system 110 or the client device 130 can decompress the tensors 170 with a decompression technique determined based on the compression technique selected for the tensor type, e.g., the front-end system 110 or the client device 130 can decompress image tensors 170 with one technique (e.g., PNG or JPEG) and decompress mask tensors 170 with another technique (e.g., lz4).

Figure 3:
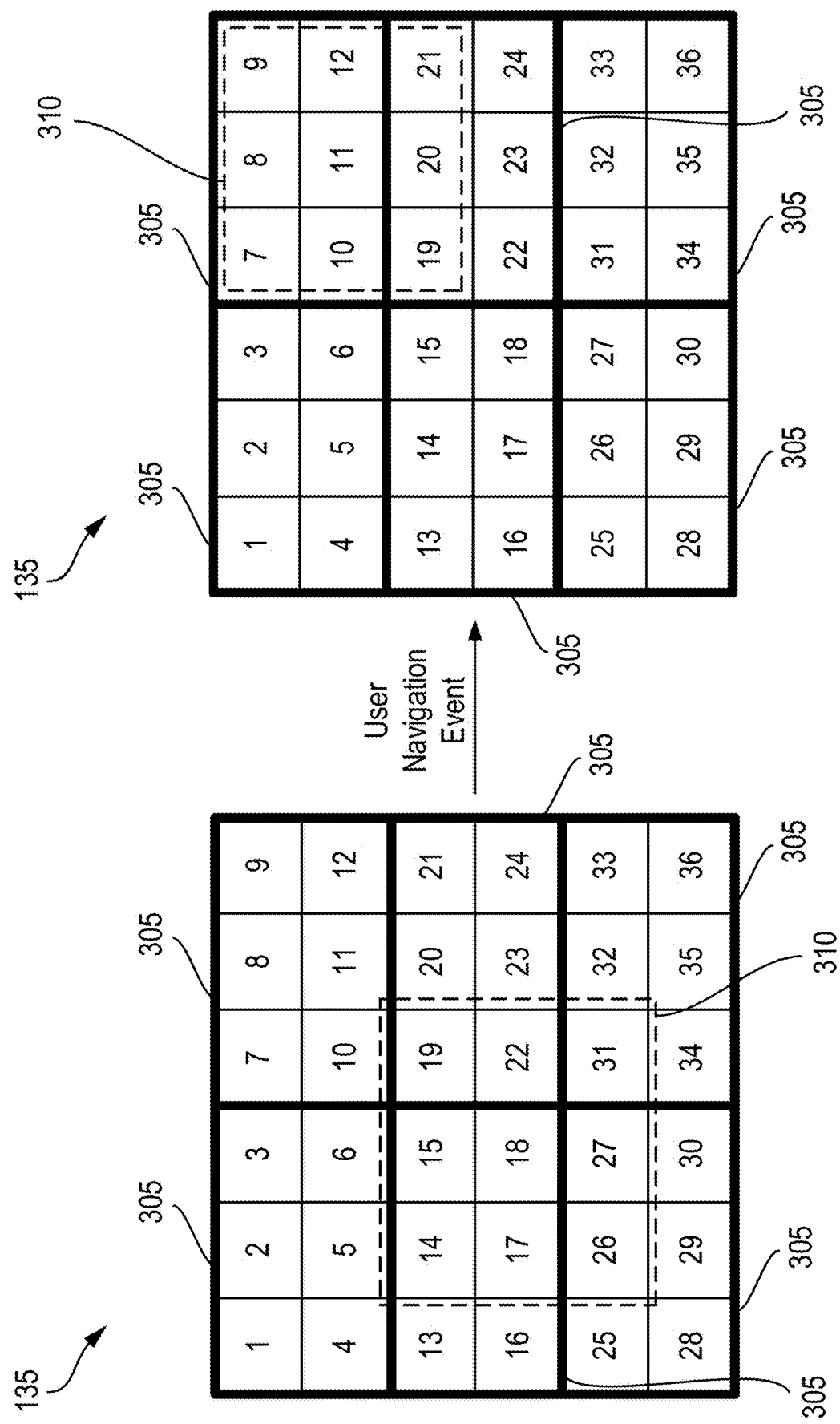
FIG. 3 is an example graphical user interface that includes samples displayed on a grid broken into chunks.

Referring now to FIG. 3, the graphical user interface 135 is shown where samples 150 are displayed on a grid broken into chunks. The graphical user interface 135 can be broken into a grid to display the sample 150 of a dataset 180. The front-end system 110 can determine a total number of samples of the dataset 180 to display, and determine a square root of the number of samples of the dataset 180. For example, in FIG. 3, the dataset 180 includes thirty-six samples, and the square root of thirty-six is six. The front-end system 110 can retrieve the samples 150 that are mapped to a viewing area of the graphical user interface 135, e.g., as shown in in FIG. 3.

In FIG. 3, the graphical user interface 135 is mapped with index values. While the index values are shown in order from one to thirty-six, the index values may be out of order. The index values may not be numbered consecutively by the front-end system 110. For example, if the query manager 117 runs a query to retrieve tensors 170 of samples 150 that meet a criteria of the query data 140, some of the samples 150 may be filtered out and therefore a collection of indices identified for samples 150 that meet the criteria may not be consecutive. The front-end system 110 can map display data for rendering or displaying tensors 170 of samples 150 within elements of the graphical user interface 135 based on a highest to lowest ranking of the indices of the samples 150. Based on the mapping of tensors 170 and samples 150 to tiles, regions, or areas of the graphical user interface 135, the front-end system 110 can present the tensors 170 of the samples 150 (e.g., display data associated with the tensors 170) in the display region 310 of the graphical user interface 135.

The tile or graphical element 305 can be indexed starting from the top left corner of the sample to across a row of the chunk 305 from left to right. Although the index values in FIG. 3 increase by increments of one, the index values may not increase by increments of one. For example, for a list of index values of samples 150 that meet a criteria of query data 140, the index values may not increase by increments of one. The graphical elements 305 can order sample indices from left to right from the top row to the bottom row. Once the first chunk 305, e.g., the top left chunk 305, is filled with indexes, the next chunk 305 to the right is indexed in the same manner. Once all graphical elements 305 of a row are indexed, the front-end system 110 can index the next lower row of graphical elements 305 in the same manner. By indexing chunks in this snaking pattern from left to right row by row, when a view, area, or display region 310 of the graphical user interface 135 surrounds at least a portion of the tiles of the grid, the indexes can be close or closest together in order to facilitate faster sample 150 retrieval from the data lake 160.

The front-end system 110 can identify the display region 310 is set for displaying a first subset of samples 150 of a multi-dimensional sample dataset 180, the display region 310 corresponding to a first display position, each sample 150 of the first subset associated with a respective set of tensors 170 that are to be displayed within the display region 310. For example, in FIG. 3, the display region 310 can surround tiles of index values 14, 15, 19, 17, 18, 22, 26, 27, and 31. The front-end system 110 can detect that a user, via the client device 130, has moved the display region 310 to a position to view the particular samples 150. The front-end system 110 can retrieve samples 150 corresponding to these indices from the data lake 160 and display the samples 150 in the graphical user interface 135. For example, the front-end system 110 can generate a first set of fetch requests 145 for the respective set of tensors 170 of each sample 150 of the first subset of samples 150.

The front-end system 110 can receive a request from the client device 130 to adjust the first display position 310 to a second display position 310. For example, a user could navigate, e.g., pan, scroll, etc. the display region 310 to cover tiles associated with different indices, e.g., indices 7, 8, 9, 10, 11, 12, 19, 20, and 21. If the front-end system 110 has not yet received the samples 150 of the previous set of indices, the front-end system 110 can send cancel or termination requests (e.g., the first set of fetch requests 145) for those samples 150 corresponding to indices that are not currently within the display region 310 (e.g., cancel requests for samples 14, 15, 17, 18, 22, 26, 27, or 31 but not cancel the request for index 19). For example, the front-end system 110 can determine that requests for one or multiple indices that were previously within the display region 310 were generated, but those indices are no longer within the display region 310. The front-end system 110 can cancel the requests for those identified indices. The front-end system 110 can send a cancel message to the interface 155 to specify not to retrieve specific indices. Although the display region 310 is shown to be the same size before and after the user navigation event, the display region 310 may change size or shape. For example, if a user zooms in or out, the display region 310 can become larger or smaller (or the size of the tiles may become larger or smaller), causing display of additional samples 150 or excluding samples 150 from the display region 310. Responsive to a zoom navigation event, the front-end system 110 can retrieve new samples 150 that are within the new display region 310 or alternatively cancel or terminate requests for samples 150 that are no longer within the display region 310.

The front-end system 110 can send requests to the interface 155 to retrieve the indices of tiles that are at least partially within the display region 310. For example, the front-end system 110 can generate a second set of fetch requests 145 for the respective set of tensors 170 of each sample 150 of a second subset of samples 150 selected based on the second display position 310. The front-end system 110 can present display data in the graphical user interface 135 corresponding to the respective set of tensors of each sample of the second subset of samples within the display region.

The front-end system 110 or the client device 130 (e.g., the browser or an application on the client device 130) can cache compressed tensors 170 or decompressed tensors 170. For example, the cached compressed tensors 170 can be decompressed and displayed by the browser on-the-fly to improve data storage. Caching decompressed tensors 170 can result in faster display speeds. For example, if a user views samples within the first display region 310 and then navigates to a second display region 310, the front-end system 110 can cache any loaded samples. If the user navigates back to the original display region 310, the samples 150 can still be stored by the front-end system 110 and the front-end system 110 may not need to request the samples 150 a second time. This can reduce the number of requests made and improve display speed and lower network bandwidth consumption.

Figure 4:
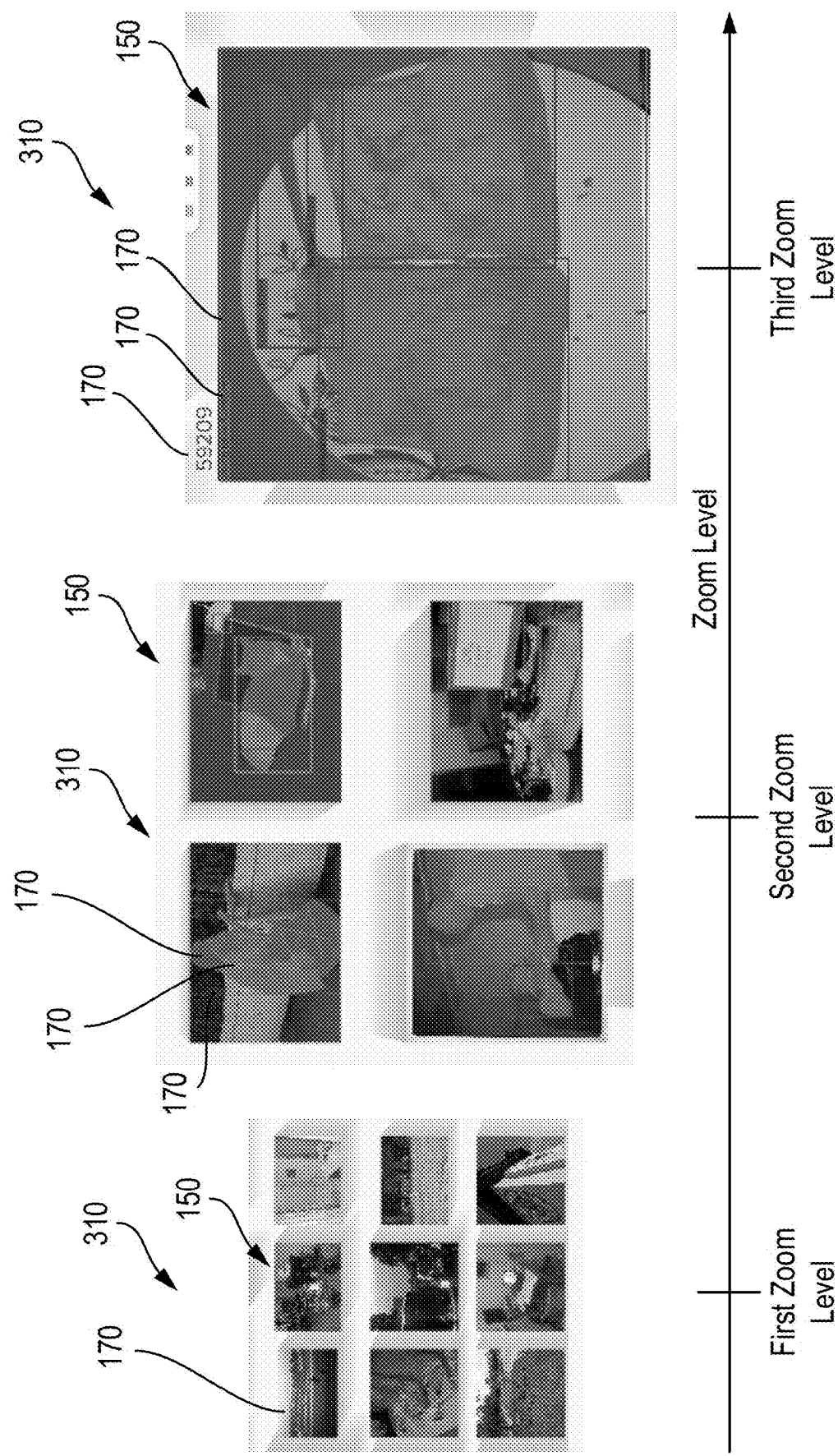
FIG. 4 is an example of samples of tensors displayed in a graphical user interface at different zoom levels where tensors are displayed or hidden by tensor type and zoom level.

Referring now to FIG. 4, samples 150 of tensors 170 displayed in a viewing window 310 the graphical user interface 135 at different zoom levels are shown, where tensors 170 are displayed or hidden by tensor type and zoom level. The front-end system 110 can display subsets of samples 150 of the dataset 180. For example, at the first zoom level, a first subset of samples of the dataset 180 can be displayed. Furthermore, at the second or third zoom levels, second or third sets of samples 150 of the dataset 180 can be displayed. The first subset of samples 150 can be the largest subset of samples 150. The second subset of samples 150 can be a subset of the first subset of samples 150. The third subset of samples 150 can be a subset of the second subset of samples 150. In some cases, the subsets of samples can be supersets of other subsets of the datasets 180. For example, the second subset of samples 150 could be a superset of the first subset of samples and a subset of the dataset 180. For example, if a user zooms and moves the viewing window 310, the second subset of samples 180 can include some samples 150 of the first subset of samples 150 at also other samples 150.

The front-end system 110 can receive input from the client device 130 to change a zoom level. For example, a user can scroll via a mouse wheel or click on a scroll button in the graphical user interface 135. Furthermore, the user can, via the client device 130, switch between viewing the graphical user interface 135 in different display arrangements for viewing the dataset 180. For example, a user, via the client device 130, can select between a grid view, a column view, or a single sample view. If a user zooms in, the front-end system 110 can cause tensors 170 of different tensor types that were not displayed in zoomed out views. If a user zooms out, the front-end system can cause tensors 170 to be hidden such that tensors at a zoomed out view can include tensors 170 of tensor types not displayed at the zoomed in view.

The front-end system 110 can retrieve tensors 170 for samples 150 based on a zoom level of the client device 130 in the graphical user interface 135. For example, the front-end system 110 can select a first set or subset of tensors 170 of the tensors 170 for each sample 150 of the first subset of samples based on the first zoom level of the display region 310. The front-end system 110 can retrieve samples 150 that are within or at least partially within the viewing window 310. For predefined zoom levels or predefined ranges of zoom levels, the front-end system 110 can store and apply a rule or visibility rule that defines which tensor types should be displayed. The visibility rule can be a mapping between zoom level and tensor type. For example, each tensor type can be visible above a predefined level but may be invisible at a lower zoom level. The front-end system 110 can present first display data in the graphical user interface 135 corresponding the first subset of tensors within the display region 310 at a first zoom level. For example, at a fully zoomed out zoom level, e.g., a first zoom level, the front-end system 110 can determine that only tensors 170 of a first tensor type should be displayed (e.g., only image tensors 170 of samples 150 should be displayed). Therefore, the front-end system 110 may retrieve the image tensors 170 of samples but not other tensors 170 of the samples 150, e.g., the front-end system 110 may not request label tensors 170, bounding boxes 170, etc.

If a user, via the client device 130, zooms into a second zoom level, the front-end system 110 can determine that other tensors 170 of second tensor types (e.g., bounding box tensors 170, mask tensors 170, important point tensors 170) should be displayed in addition to the first set of tensors (e.g., image tensors 170). For example, the front-end system 110 can receive a request from the client device 130 to adjust the zoom level from the first zoom level to the second zoom level. Responsive to receiving the request, the front-end system 110 can select a second subset of tensors 170 of the respective set of tensors 170 for each sample 150 of a second subset of samples 150, the second subset of samples 150 identified from the dataset 180 based on the second zoom level. The second subset of tensors 170 can include at least one different tensor type than the first subset of tensors viewed at the first zoom level.

For example, after receiving the zoom input from the first zoom level to the second zoom level, the front-end system 110 can retrieve the bounding box tensors 170, the mask tensors 170, and important point tensors 170 for the images (e.g., tensors other than the image type tensor 170). The front-end system 110 can present second display data within the graphical user interface 135 corresponding to the second subset of tensors 170 within the display region 310 of the graphical user interface 135. For example, the front-end system 110 can render the bounding box tensors 170 and the mask tensors 170 in the graphical user interface 135 over the existing image tensors 170 displayed in the graphical user interface 135. Furthermore, if the user zooms in again to a third level, e.g., via the client device 130, the front-end system 110 can determine that image tensors 170, bounding box tensors 170, mask tensors 170, important point tensors 170, and label tensors 170 should be displayed. The front-end system 110 can request the label tensors 170 for the samples 150 and display the label tensors 170 in the graphical user interface 135. The front-end system 110 can display or hide tensors 170 based on a visibility rule that maps tensor types to being displayed or hidden. For example, the visibility rule can indicate for a particular zoom level, which tensor types should be visible and which tensor types should be invisible. For example metadata of a tensor 170 can indicate the type of tensor 170. The front-end system 110 can use the visibility rule and the metadata of the tensors 170 to determine whether to display or hide each tensor 170. For example, at a first zoom level, the visibility rule should indicate that tensors 170 of one or more first tensor types should be visible. At a second zoom level, the visibility rule should indicate that tensors 170 of one or more second tensor types should be visible and tensors 170 of one or more third tensor types should be hidden.

As the user zooms in via the client device 130, the front-end system 110 can generate fetch request 145 to retrieve tensors 170 of corresponding tensor types for the current zoom level of the viewing window 310. For example, the front-end system 110 can present first display data the graphical user interface 130 by generating first fetch requests 145 for tensors 170 of tensor types assigned for a first zoom level, the tensors 170, and presenting the tensors 170 within the graphical user interface 130. Furthermore, the front-end system 110 can present second display data the graphical user interface 130 by generating second fetch requests 145 for tensors 170 of tensor types assigned for a second zoom level, the tensors 170, and presenting the tensors 170 within the graphical user interface 130. The second subset of tensors 170 can be a superset of the first subset of tensors 170, e.g., can include the first subset of tensors 170 and additional tensors 170. If the user is zooming out, the second subset of tensors 170 displayed can be a subset of the first subset of tensors 170 displayed.

Furthermore, if a user navigates away from viewing samples 150 after transmitting the fetch requests 145 to the interface 155, e.g., the front-end system 110 can cancel the fetch requests 145. For example, the front-end system 110 can present first display data in the graphical user interface 135 and cancel one or more of a first set of fetch requests 145 that do not correspond to second display data associated with the second subset of tensors 170.

Figure 5:
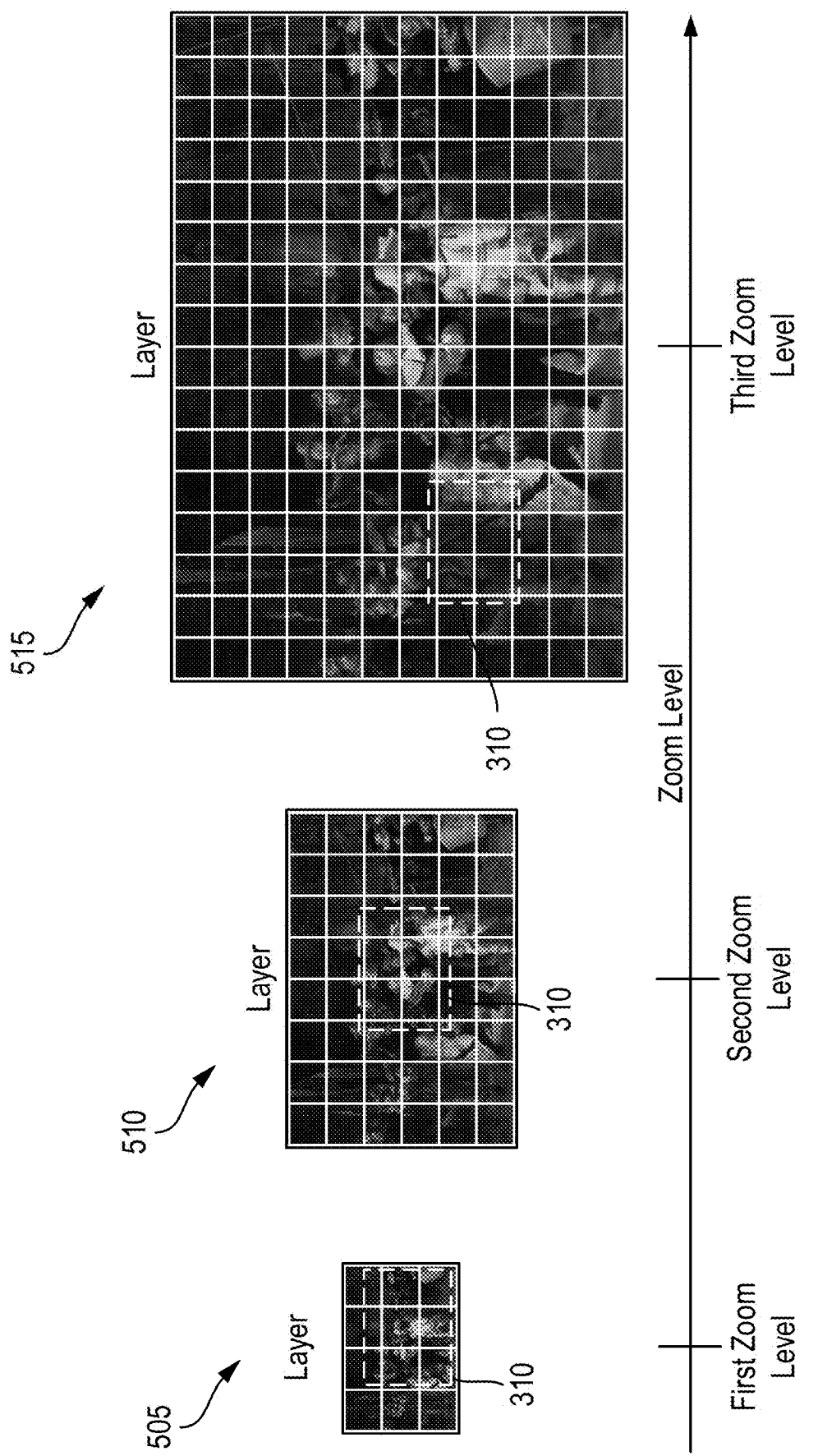
FIG. 5 is an example image layered and tiled for data storage and retrieval.

Referring now to FIG. 5, an example image layered and tiled for data storage and retrieval is shown. The transformer 175 can receive an original image and store the image as tensors 170 as a first layer 515. The transformer 175 can down sample the original image one, two, three, or any number of times to generate other layers, e.g., layer 510 and layer 505. For example, the transformer 175 can recursively down sample the original image until a minimum image size is reached, e.g., a size corresponding to a single tile. The transformer 175 can split each image layer into multiple squares, rectangles, tiles, hexagons, or any other shape. The transformer 175 can generate a sample 150 to represent each tile of each layer, for example, a sample 150 could include a tensor 170 representing the tile and a label tensor 170 linking the tile to a specific layer. The transformer 175 can store the tensors 170 for the layers 505-515 within the data lake 160.

When viewing the image, based on a zoom and pan level received in the graphical user interface 135 of the client device 130, the front-end system 110 can retrieve tile samples 150 corresponding to the image from the data lake 160. For example, the front-end system 110 can identify a layer level corresponding to the zoom level and identify samples 150 requested to be viewed by the user via the client device 130. The front-end system 110 can retrieve the samples 150 from the data lake 160 and display the samples 150 in the graphical user interface 135. For example, at a first zoom level, the front-end system 110 can retrieve tile samples 150 of the layer 505. The front-end system 110 can monitor a viewing window 310 and detect that all tile samples 150 of the layer 505 are at least partially within the viewing window 520 and therefore the front-end system 110 can retrieve all of the tile samples 150 of the layer 505. A user can request, via the client device 130, to zoom into a second zoom level. The front-end system 110 can detect tile samples that are at least partially within the viewing window 310 and retrieve the tile samples 150 of the layer 510 from the data lake 160. Furthermore, the user can request, via the client device 130, to zoom into a third zoom level. The front-end system 110 can detect tile samples 150 that are at least partially within the viewing window 310 and retrieve the tile samples of the layer 515 from the data lake 160.

Figure 6:
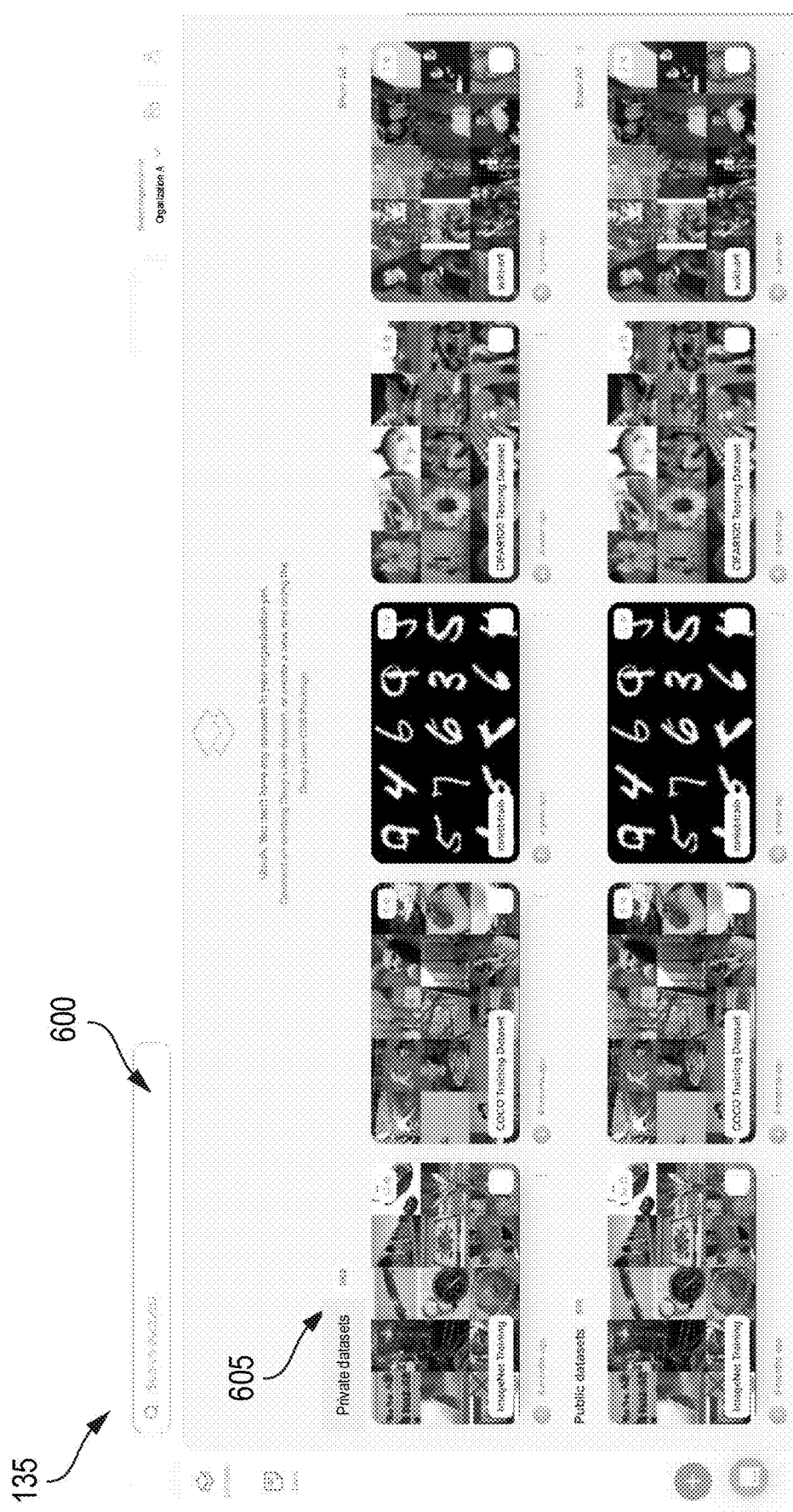
FIG. 6 is an example graphical user interface where a user can select a dataset from multiple datasets for visualization.

Referring now to FIG. 6, the graphical user interface 135 is shown where a user can select a dataset 180 from multiple datasets 180 for visualization. The graphical user interface 135 can include a user interface element 600. The user interface element 600 can be a search box where a user can input text via the client device 130. The user can enter a keyword or words, phrases, an identifier or identifiers, a URL, or any other data that can explicitly or implicitly identify a particular dataset 180.

Furthermore, the graphical user interface 135 can include user interface elements, icons, or graphic images 605 to represent datasets stored in the data lake 160. The datasets 180 can be customer specific datasets or private datasets, public domain datasets, or any other type of dataset. A user can scroll, via the client device 130 and the graphical user interface 135, through the various user interface elements 605 to identify a particular dataset 180. The user can interact with at least one of the user interface elements 605 and select one user interface element to visualize a corresponding dataset 180. For example, the user can tap on a specific user interface element 605, click on a specific user interface element 605, speak the name of the user interact element 605 to select the user interface element 605. Responsive to a selection of one user interface element 605, the front-end system 110 or the client device 130 can cause the graphical user interface 135 to display samples 150 of the selected dataset 180.

Figure 7:
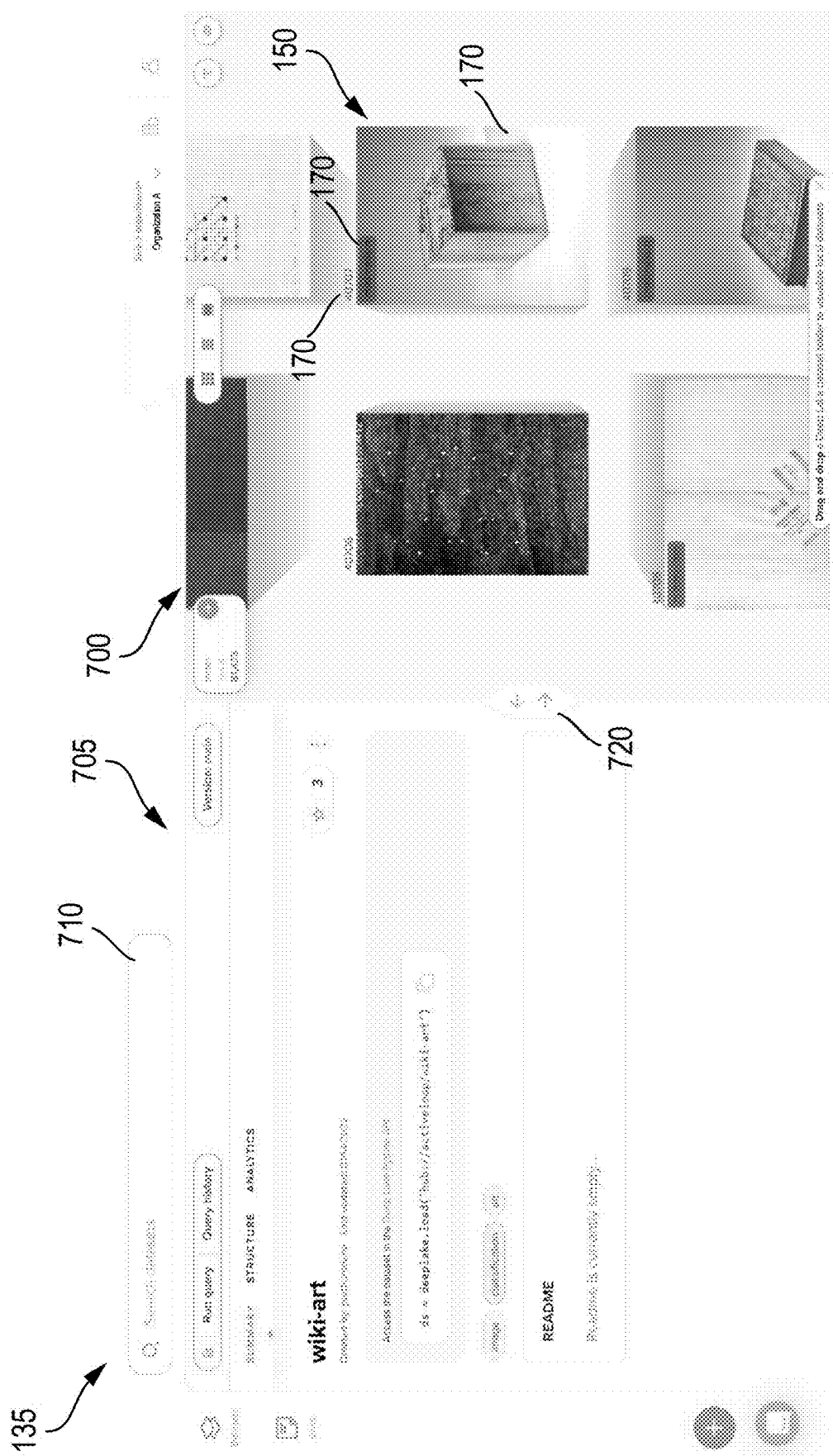
FIG. 7 is an example graphical user interface including a first window for running queries and a second window for visualizing samples of a dataset, the samples including multiple tensors.

Referring now to FIG. 7, the graphical user interface 135 including a first window 705 for running queries and a second window 700 for visualizing samples 150 of a dataset 180 is shown. The graphical user interface 135 can be divided into two separate windows, sections, areas, interface elements, etc. The first window 705 can allow a user, via the client device 130, to select a dataset, specify a query, review data structure information, review analytics for the dataset 180, etc.

The second window 700 can display graphic representations of the samples 150 and the tensors 170 of each sample 150. The second window 700 can include graphical representations of the samples 150 in a grid, in a column with a single row, as multiple columns, as individual samples 150, etc. The graphical representations of the samples 150 can be displayed according to tensor type information, tensor visibility settings, and display area zoom level or location, as described herein. The second window 700 can include samples 150 displayed within interface elements. The user interface elements can be squares, boxes, tiles, rectangles, circles, platforms, pedestals, or any other two dimensional or three dimensional shape. The user interface elements can be displayed in a grid layout. The samples 150 can be ordered or arranged based on their respective indices. For example, samples 150 can be ordered in terms of increasing index from left to right, top to bottom, snaking from left to right across a first row and then left to right across a second row below the first row, snaking from top to bottom along a first left most column and then from top to bottom along a second column immediately to the right of the first leftmost column, etc.

The second window 700 can present samples 150 within a particular range of indices. For example, when the front-end system 110 first displays the graphical user interface 135, the front-end system 110 can select a median index of all the indices of the dataset 180 or pseudo-randomly select an index of the indices of the dataset 180. The front-end system 110 can select a range of indices around the selected index and retrieve samples 150 for the range of indices and display the samples 150 in the second window 700. The window 700 of samples 150 can be greater than or equal to the number of grid points in the second window 700. For example, the front-end system 110 can retrieve a number of samples 150 corresponding to a number of grid points displayed in the second window 700. The front-end system 110 can retrieve a number of samples 150 greater than the number of grid points displayed in the second window 700 so that if a user scrolls up, down, left, or right to display additional samples 150, at least some samples 150 are already retrieved from the interface 155 and the sample 150 can be rapidly displayed within the second window 700. If a user navigates the second window 700 to view indices that have not yet been retrieved by the front-end system 110, the front-end system 110 can retrieve new samples 150 for indices of the second window 700 that the user has navigated to view or a window of new samples 150 corresponding to the indices of the second window 700 that the user has navigated to view.

The samples 150 displayed in the second window 700 can include, or be composed of, multiple tensors 170. For example, the second window 700 can display multiple tensors 170 together within a single window, user interface element, region of the second window 700, etc. For example, in FIG. 7, an image tensor 170 can be displayed. A label tensor 170 corresponding to the respective sample 150 (e.g., "minimalism") can be displayed in an upper left corner of the image tensor 170 of the respective sample 150 overlaying pixels of the image tensor 170. Furthermore, a respective index tensor 170, e.g., "407076" can be displayed as part of the sample 150 above the image tensor 170.

The user interface 135 can include a partition 720. The partition 720 can separate the first window 705 from the second window 700. The partition 720 can be a line, rectangle, shape, or column that divides the first window 705 from the second window 700. The partition 720 can include user interface elements. Responsive to receiving a user interaction with the elements of the partition 720, the graphical user interface 135 can be updated to view one of the first window 705 or the second window 700 in full screen or split screen mode.

Figure 8:
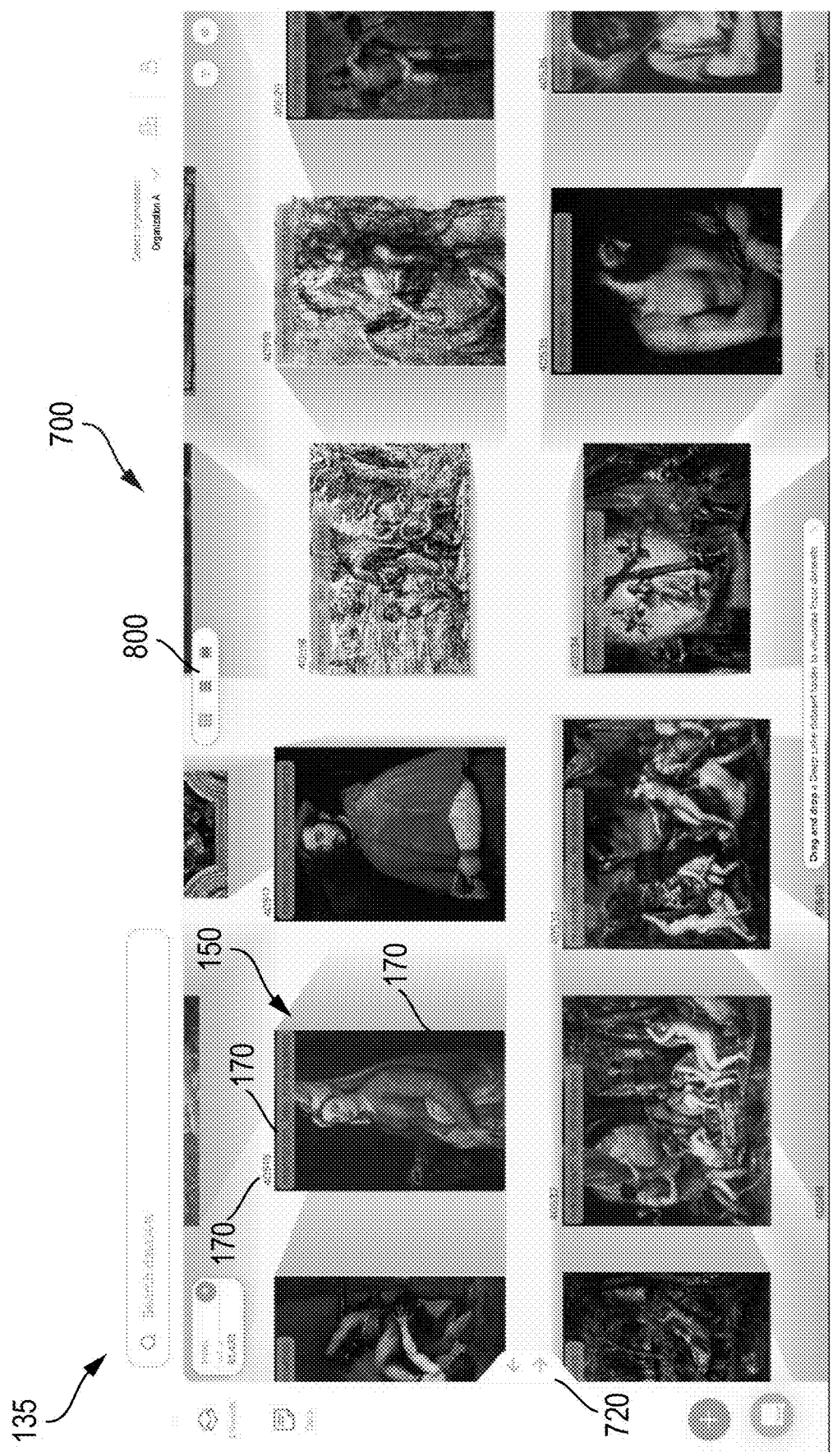
FIG. 8 is an example graphical user interface including samples displayed in a grid.
Figure 9:
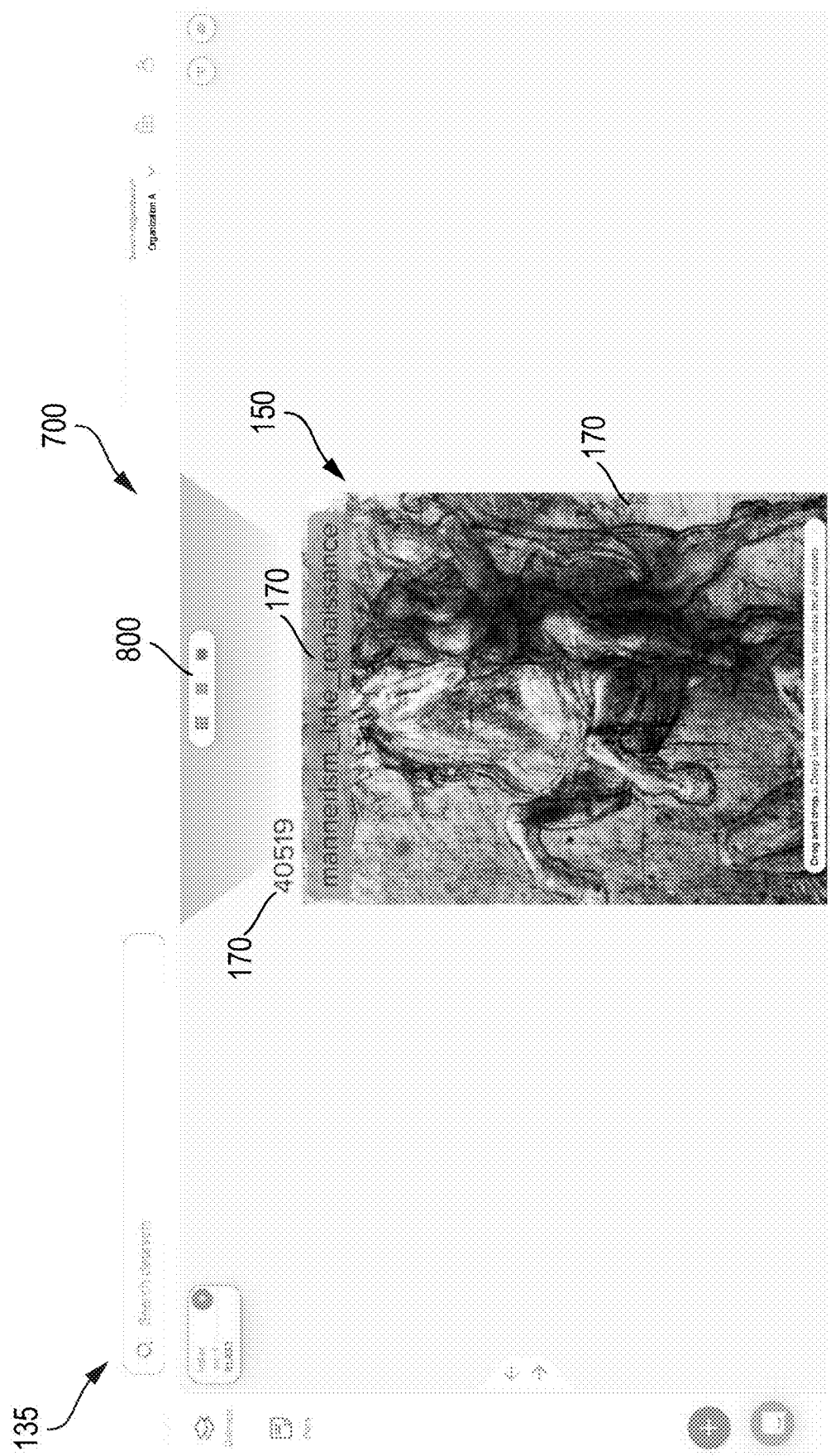
FIG. 9 is an example graphical user interface including samples displayed in a column.
Figure 10:
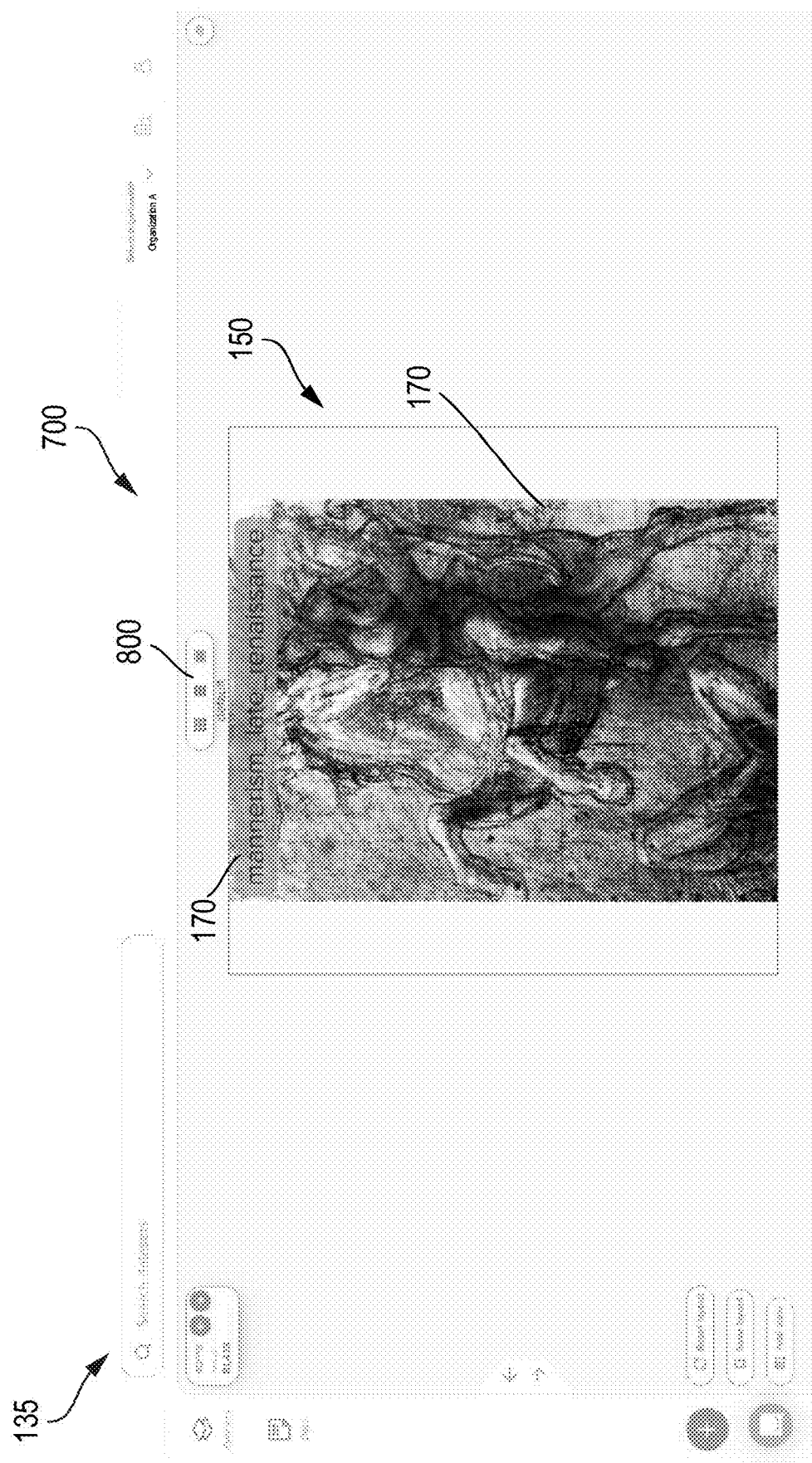
FIG. 10 is an example graphical user interface including samples displayed one by one.

Referring now to FIGS. 8-10, the graphical user interface 135 including samples 150 is shown. A user can interact, via the client device 130, with the partition 720 to view the second user interface 700 in full screen. The window 700 can include a user interface element 800. The user interface element 800 can include multiple view modes, e.g., a grid view mode, a column view mode, or a single sample view mode. In FIG. 8, the grid view mode is selected and samples 150 can be displayed in tiles, boxes, rectangles, or other shapes in the intersections of the rows and columns of the grid. The shape of the box can correspond with a shape of the tensor image 170 to be displayed within the box. In the grid view mode, the user can scroll, via the client device 130 up, down, left, right, or diagonally to navigate through the grid of samples 150 in FIG. 8.

In FIG. 8, samples 150 can be mapped to certain locations (e.g., tiles, areas, elements, etc.) within the window 700. The window 700 can be or correspond to the display region 310 described in FIG. 3. The front-end system 110 can cause display data for displaying tensors 170 of the samples 150 to be mapped to and displayed in the regions of the window 700. The front-end system 110 can receive requests from the client device 130 to adjust a zoom level or navigation position (e.g., scroll up, down, left, right, diagonally, etc.). The requests can cause the front-end system 110 to adjust the window 700 from a first display position to a second display position. For example, the display region for displaying samples within the window 700 can be adjusted from a first location to a second location, or from a first zoom level to a second zoom level.

The front-end system 110, based on the new display position or zoom level, can select samples 150 or sample indices for displaying within the window 700. For example, if the samples 150 are all mapped to locations in a grid or positions within a column, the front-end system 110 can identify samples 150 to be loaded and displayed that correspond to tiles, boxes, or areas of the window 700 that are visible to the user. If the user has provided filtering criteria, the front-end system 110 can select a second subset of samples 150 of the multi-dimensional sample dataset 180 for display within the window 700 based on both the filtering criteria, the display position, or the zoom level. The front-end system 110 can map second display data associated with a respective set of tensors 170 of each sample 150 of a second subset of samples 150 to respective display locations for display in the display region navigated to by the user via the client device 130. For example, the front-end system 110 can map display data for viewing tensors 170 of samples 150 within the specific tiles, squares, or boxes within the window 700. Based on the mapping, the front-end system 110 can present the second display data associated with the respective set of tensors 170 of the second subset of samples 150 in the display region according to the second mapping.

In FIG. 9, a column mode is selected via the user interface element 800 and the samples 150 can be displayed in a column. In the column mode, a user can scroll, via the client device 130, up or down the column of samples 150 displayed in FIG. 9. In FIG. 10, a single sample mode is selected via the user interface element 1100 and the samples 150 can be displayed in the window 700 individually, e.g., one by one. In the single sample mode, a user can scroll, via the client device 130, up or down to sequentially view single samples.

Referring now to FIGS. 11-14, the graphical user interface 135 is shown including a first window 705 where a user enters a query 140 specifying tensors 170 and a second window 710 where filtered samples 150 of a dataset 180 selected based on the query 140 are displayed. The graphical user interface 135 can include a user interface element 1100. The user interface element 1100 can be a box, a text entry element, a rectangle, or any other shape. The element 1100 can be configured to receive text written or selected by a user via the client device 130. The text entered by the client device 130 can be the query data 140.

Responsive to a user entering the query data 140 into the user interface element 1100 and a user interacting with an element 1110 to request that the query 140 be executed, the front-end system 110 can transmit the query data 140 to the interface 155. The interface 155 can receive the query data 140. The interface 155 can retrieve indexes for samples or samples 150 themselves from the data lake 160 that meet the criteria specified by the query data 140. The front-end system 110 can transmit the query data 140 to the interface 155 and the interface 155 can store, persist, or maintain the query data 140 and apply the query data 140 to the data lake 160 each time a fetch request 145 is received from the front-end system 110. The interface 155 can retain the query data 140 until additional queries are made in the graphical user interface 135. Responsive to receiving new query data 140, the interface 155 can overwrite previously stored query data 140 with the new query data 140 and query the data lake 160 with the new query data 140. In some implementations, previously submitted queries may be stored in association with the dataset 180 to which they correspond.

Figure 11:
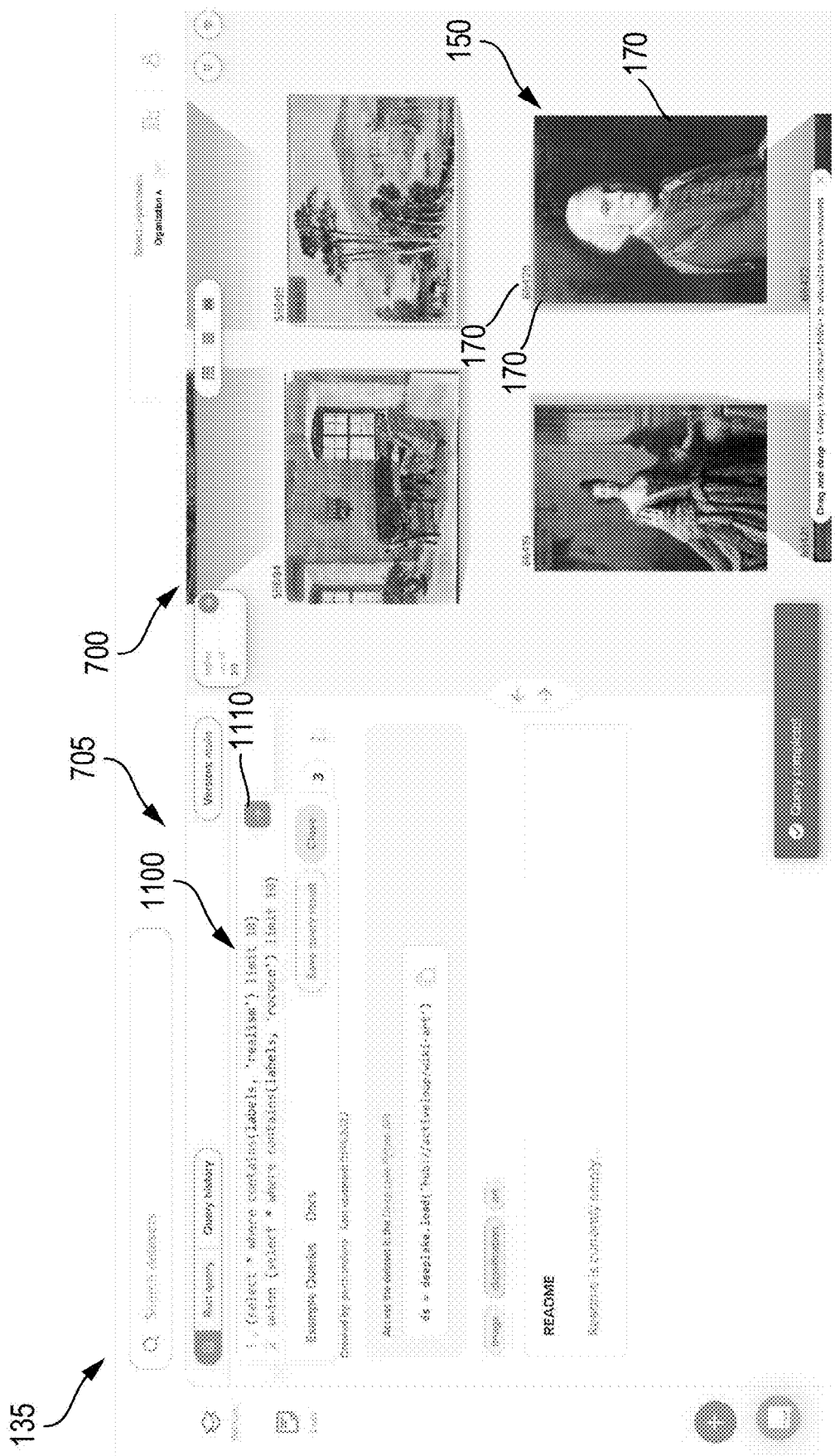
FIG. 11 is an example graphical user interface including a first window where a user enters a query specifying tensors and a second window where samples of a dataset filtered based on query are displayed.

In FIG. 11, the query data 140 can be,
1 (select * where contains(labels, 'realism') limit 10)
2 union (select * where contains(labels, 'rococo') limit 10)

The query data 140 can cause the interface 155 to retrieve no more than ten samples 150 that include the "realism" tensor label 170 along with no more than ten samples 150 that include the "rococo" tensor label 170. For example, the interface 155 can retrieve twenty samples 150, ten of the samples 150 including the "realism" tensor label 170 and ten of the sample 150 including the "rococo" tensor label 170. The front-end system 110 can display the retrieved samples 150 in the second window 700.

Figure 12:
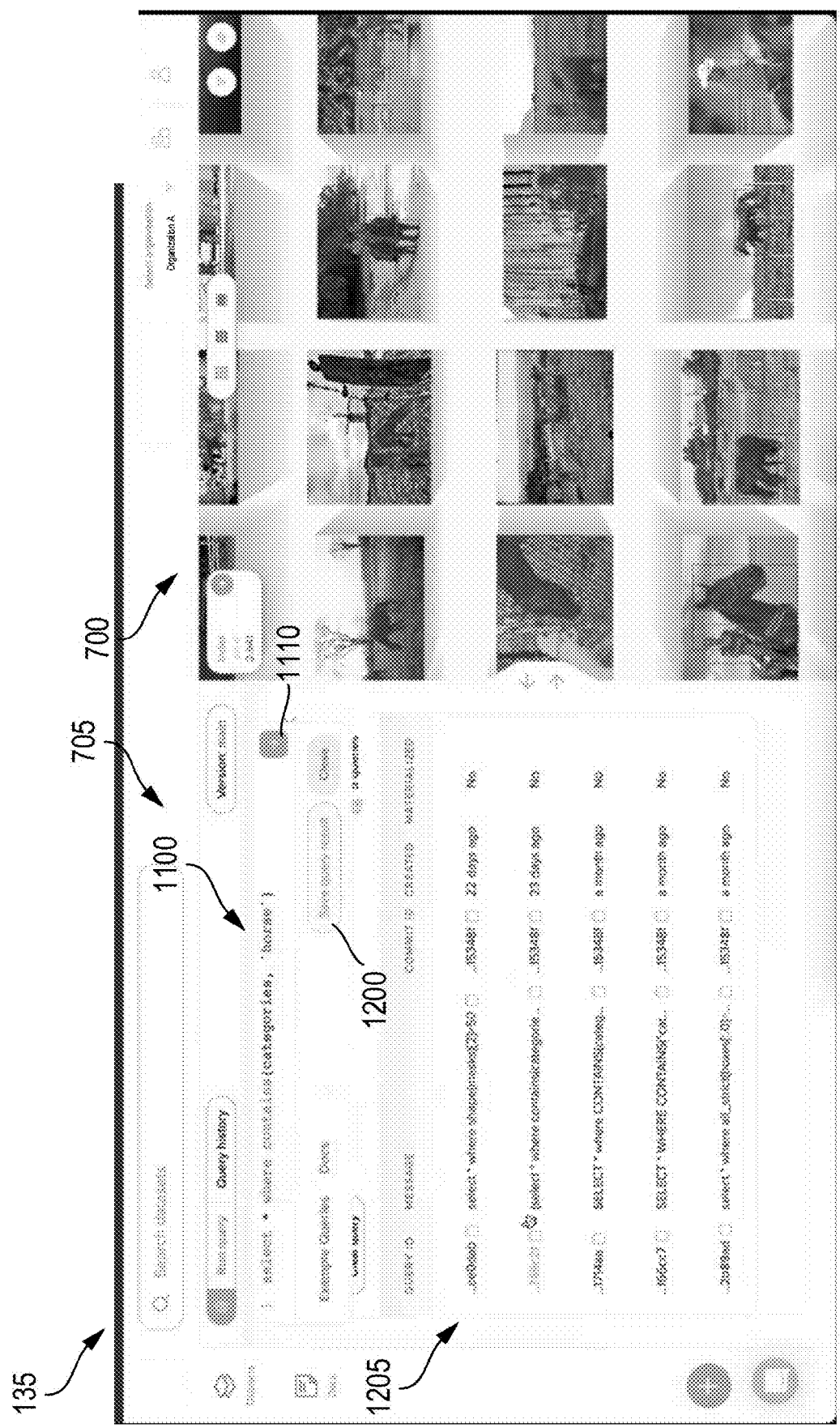
FIG. 12 is another example graphical user interface including a first window where a user enters a query specifying tensors and a second window where samples of a dataset filtered based on query are displayed.

In FIG. 12, the query data 140 can be,
1 select * where contains(categories, 'horse')

The query data 140 can cause the interface 155 to retrieve samples 150 that include the "horse" tensor category 170. The interface 155, based on the query data 140, can retrieve samples 150 from the data lake 160 that include a "horse" tensor category 170. The "horse" tensor category 170 can be applied to samples 150 that include image tensors 170 that include horses represented by pixels in the image tensor 170 (e.g., the images are images of horses).

In FIG. 12, the window 700 can include a user interface element 1200. The user interface element 1200 can be a button or input device causing a query entered into the element 1100 to be stored in association with the dataset 180 that is being displayed. Responsive to receiving an interaction with the client device 130, the front-end system 110 can store the query data 140 into a historical query list for the dataset 180. The front-end system 110 can store the historical query list locally on the front-end system 110 or cause the historical query list to be stored by the interface 155 in the data lake 160. For example, queries 140 made to a particular dataset 180 can be stored in the data lake 160 with the particular dataset 180 for which the queries were made. The front-end system 110 can display an element 1205 including the historical query list. The front-end system 110 can display the historical query list to a user if the user has permission to read or access the dataset 180 or if the dataset 180 is a public dataset (e.g., having permissions such that any user can read, view, or access the dataset 180). If a dataset 180 is private, and a user has read access but does not have write access to the dataset 180, and the user makes a query, the query history can be stored in a user account, rather than in the dataset 180 itself.

Query histories stored for a user account may only be shown for the user account. Other users associated with other user accounts may not have access or visibility to the query history for a dataset 180 if the query history is stored in another user account. In some implementations, an administrator account (e.g., a group manager account, an organization manager account, a system manager account) may have permissions to view the query history of particular users (e.g., managed user accounts). The query history can store the query data 140 itself and/or the indices of tensors 170 of the samples 150 in the dataset 180 that satisfy the query data 140. Responsive to receiving a selection of a historical query from the query history, the front-end system can run the query data 140 of the query history again to retrieve samples 150 or tensors 170 corresponding to the query data 140 or retrieve samples 150 corresponding to indexed tensors 170 stored for the selected historical query.

Figure 13:
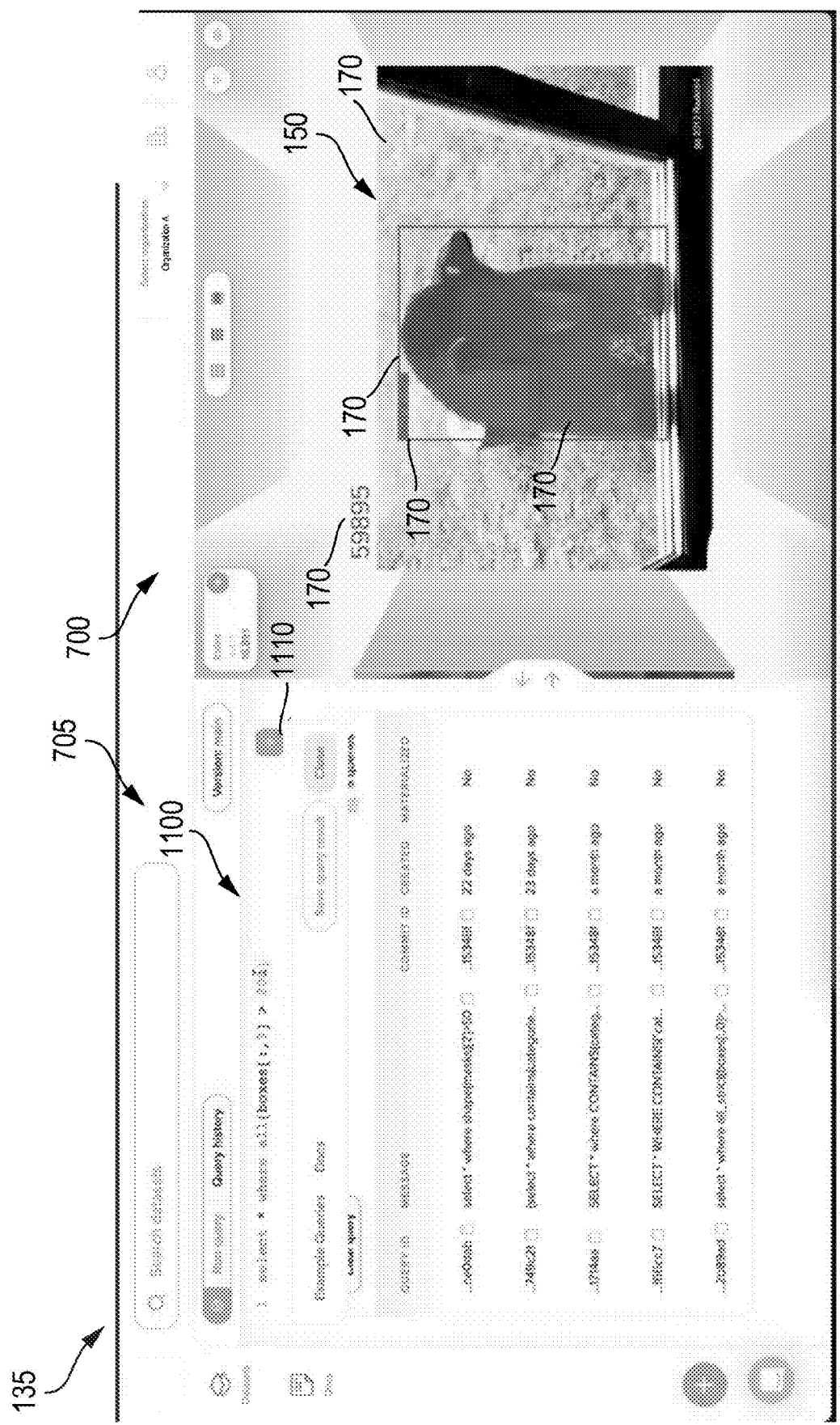
FIG. 13 is another example graphical user interface including a first window where a user enters a query specifying tensors and a second window where samples of a dataset filtered based on query are displayed.

In FIG. 13, the query data 140 can be,
1 select * where all(boxes[:, 3]>200)

The query data 140 of the preceding example query can cause the interface 155 to retrieve samples 150 that include bounding boxes having a height greater than 200 pixels. The query data 140 can cause the interface 155 to retrieve samples 150 that include bounding boxes, where all of the bounding boxes of the sample have a height greater than 200 pixels. The bounding box tensors 170 can be include a two dimension array, where the first dimension is the number of bounding boxes in the sample 150 (":" can indicate any number of bounding boxes). The second dimension includes four numbers defining a bounding box, i.e., top-left x-y coordinates, width, and height (index "3" can indicate height, where top-left x coordinate can indicate index "0" in the second dimension of the two-dimensional array).

In FIG. 13, the sample 150 includes an image tensor 170 of a bear. The sample 150 further includes a graphical representation of a bounding box tensor 170 drawn around pixels in the image tensor 170 of the bear. The sample 150 further includes a label tensor 170 indicating that the bounding box defines pixels corresponding to a bear. The mask tensor 170 can indicate pixels in the image tensor 170 corresponding to the bear. The mask 170 can be a tensor of ones and zeros, ones indicating pixel locations corresponding to a bear and zeros indicating pixel locations corresponding to no bear or pixels that are not part of an image of a bear. The color selected for the mask, label, and bounding box, when displayed in the graphical user interface 135 can be based on the label. For example, each label can be mapped by the front-end system 110 to a specific color of a set of predefined colors (e.g., 10 colors, 16 colors, 50 colors, 100 colors, etc.). The front-end system 110 can render the label tensor 170, the bounding box tensor 170, and the mask tensor 170 according to the color mapped to the label tensor 170.

Figure 14:
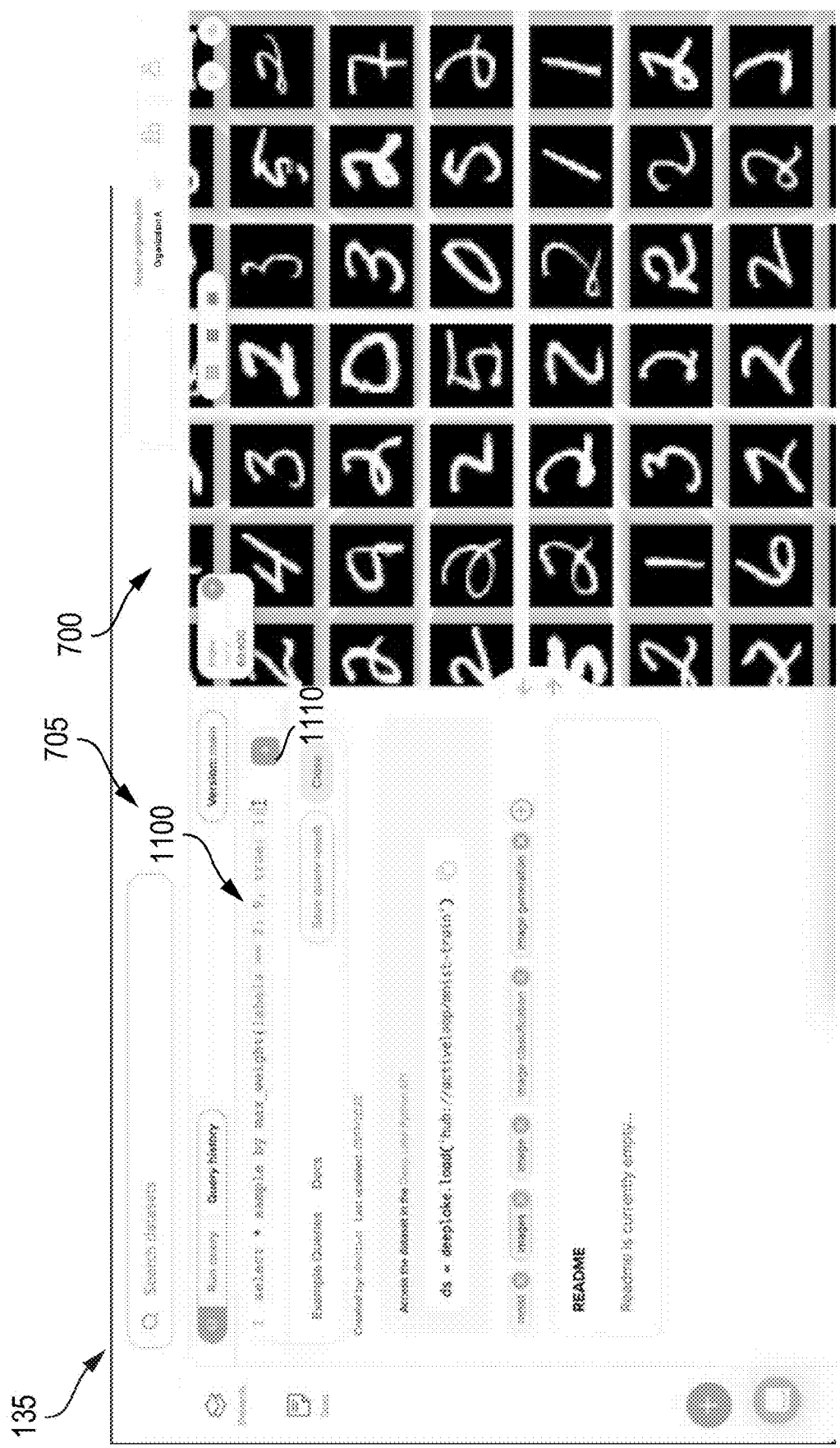
FIG. 14 is another example graphical user interface including a first window where a user enters a query specifying tensors and a second window where samples of a dataset filtered based on query are displayed.

In FIG. 14, the query data 140 can be, 1 select * sample by max_weight(labels==2: 9, true: 1)

The example query data 140 above can cause the front-end system 110 or the client device 130 to pseudo-randomly shuffle and filter the dataset 180, such that image tensors 170 of the number two are shown in an equal, approximately equal, or substantially equal amount to image tensors 170 of other digits (e.g., for a base ten number system, digits zero through nine). The query data 140 can specify a label tensor 170 of "2" and weight samples 150 with the label tensor 170 of "2" to be nine. All other label tensors 170 can be weighted as "1." The resulting samples 150 displayed in the window 700 can include label tensors 170 of "2" in an equal amount to all other digits (e.g., because in this example, there are only ten different possible labels, zero through nine).

Figure 15:
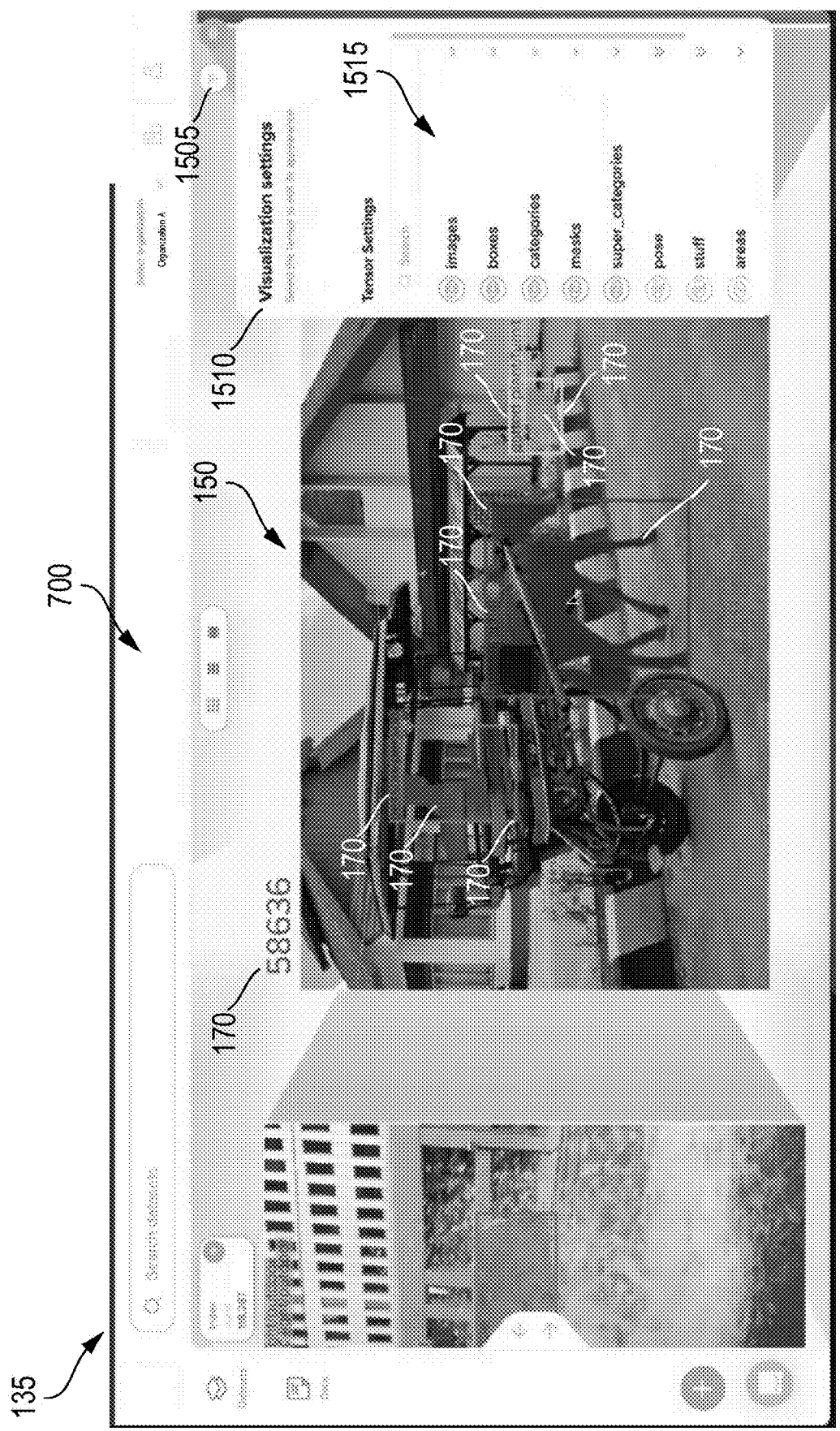
FIG. 15 is an example graphical user interface including a window to activate or deactivate tensors of tensor types for samples displayed in the graphical user interface.

Referring now to FIG. 15, an example graphical user interface 135 is shown including a window 1510 to activate or deactivate tensors 170 of different tensor types for samples 150 displayed in the graphical user interface 135. A user can interact, via the client device 130, with a user interface element 1505. The element 1505 can be a button, a circle shaped button, a square shaped button, or any other type of graphical user interface element. Responsive to interacting with the element 1505, the user interface 135 can cause the window 1510 to be displayed within the graphical user interface 135. The window 1510 can include graphical user interface elements 1515. The elements 1515 can be buttons to provide a binary input, e.g., an on or off input. The elements 1515 can each be associated with a tensor name. The tensor names or types can be images, boxes, categories, masks, super_categories, pose, stuff, areas, etc. Responsive to a user interacting with an element 1515, the front-end system 110 can display or hide corresponding tensors 170 of the tensor name or type or tensors 170 of a tensor group. Via the elements 1515, the user can enable or disable animations, adjust a frame rate of videos or sequences of images, select a transparency level for each tensor 170, etc.

For example, in FIG. 15, bounding box tensors 170 are shown around a person, a horse, and a potted plant. However, if the user interacts with the element 1515 associated with the boxes tensor name, the front-end system 110 can stop displaying the bounding box tensors 170 around the person, horse, and potted plant. However, the front-end system 110 can keep displaying other tensors 170 of the sample 150, e.g., the image tensor 170, the index tensor 170, the mask tensor 170 over the person, the mask tensor 170 over the horse, the mask tensor 170 over the potted plant, etc. Furthermore, the front-end system 110 can apply the tensor type or category selection to all samples 150 displayed in the window 700. For example, as a user, via the client device 130, scrolls or navigates to view another sample 150, the sample tensor filtering settings can be applied to that tensor, e.g., all bounding box tensors 170 of those samples 150 can be hidden.

In FIG. 15, tag tensors 170 for each bounding box tensor 170 are displayed in an upper left corner of the bounding box tensor 170. For example, for the person bounding box tensor 170, "person/person" is displayed in the upper left corner of the bounding box tensor 170. For the horse bounding box tensor 170, the corresponding tag tensor 170 "horses/animal" is displayed in the upper left corner of the bounding box tensor 170. The tag tensors 170 can be associated with the corresponding bounding box tensors 170 based on a number or order of the tag tensors 170 and the bounding box tensors 170 within the samples 150 of the dataset 180. For example, an order in which the tensors 170 are stored within the chunks 165 can define the correspondence between tag tensors 170 and bounding box tensors 170. For example, a first tag tensor 170 can correspond to a first bounding box tensors 170, a second tag tensor 170 can correspond to a second bounding box tensor 170, etc. If the user, via the client device 130, turns off the bounding boxes 170 via the element 1515, the front-end system 110 can move the tag tensors 170 corresponding to the hidden bounding boxes 170 from being displayed on the image to being displayed in a top left corner in a sequence.

Bounding box tensors 170 can have multiple coordinates to define differently sized bounding boxes for objects in an image. One bounding box tensor 170 might define multiple coordinates for multiple different bounding box. Each bounding box tensor 170 may define coordinates for a single bounding box. The front-end system 110 can associate boxes to different types of annotations. Furthermore, the front-end system 110 can size the bounding box tensors 170 based on the number of objects classified within an image.

Figure 16:
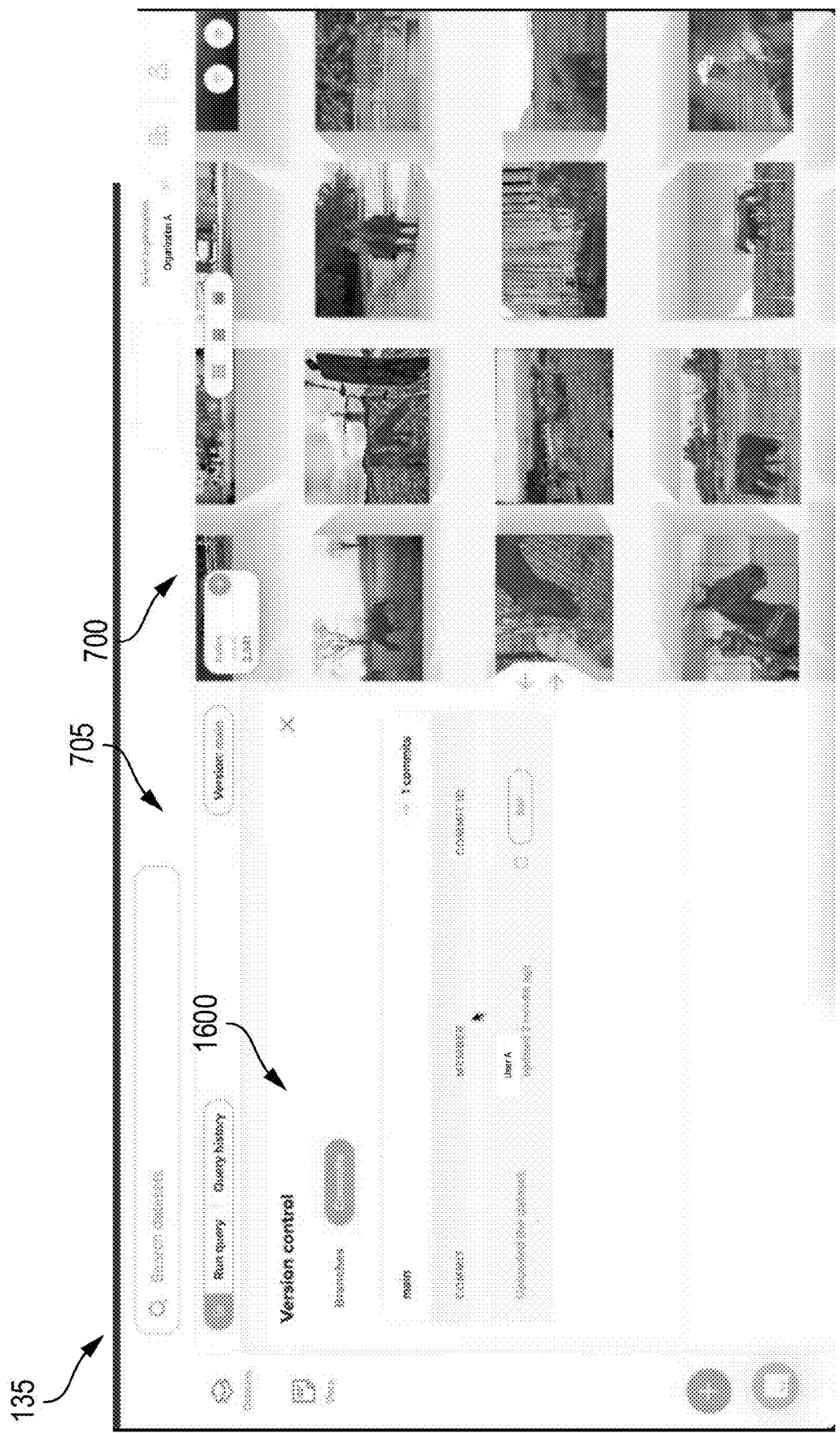
FIG. 16 is an example graphical user interface including a window including a history of versions of a dataset.

Referring now to FIG. 16, a graphical user interface 135 is shown including a window 705 including a history of versions of the dataset 180. The front-end system 110 can receive, via the graphical user interface 135, an input to store a version or "commit" of the dataset 180. For example, the original dataset 180 can be filtered via query data 140 or specific tensor categories can be turned on or off by the user as described in FIG. 15 to create a custom version of the dataset 180. The specific settings used to customize the dataset 180 can be saved as a version and retrieved later for viewing, training a machine learning model, etc. The graphical user interface 135 can include an element 1600 including a historical record of the versions made by users.

Figure 17:
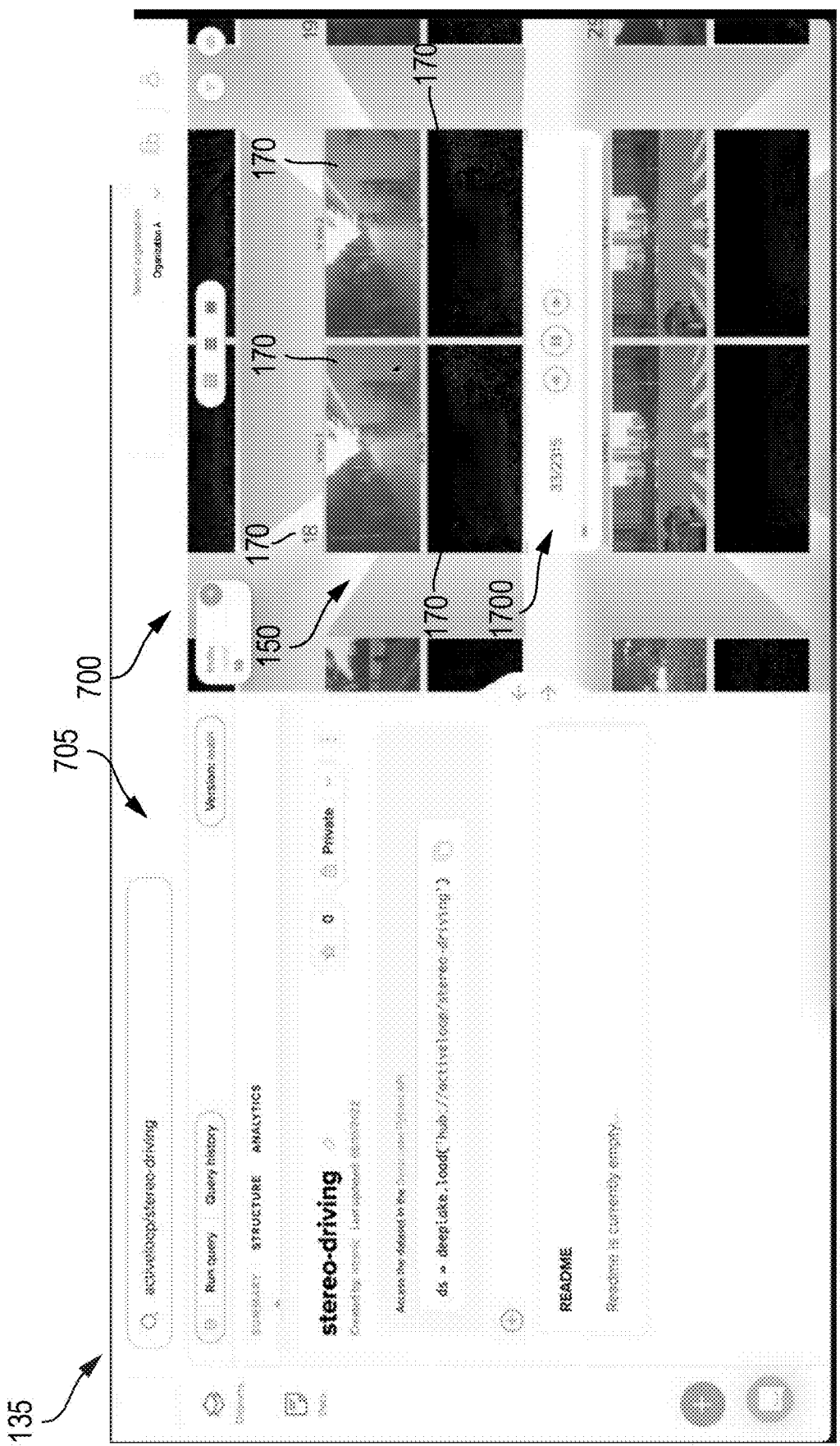
FIG. 17 is an example graphical user interface including a sample window displaying a sample, the sample window including multiple sub-windows displaying tensors of the sample.

Referring now to FIG. 17, a graphical user interface 135 is shown including a sample window displaying a sample 150, the sample window including multiple sub-windows displaying tensors 170 of the sample 150. A sample 150 can include multiple tensors 170, for example, for a stereo camera can record a left video stream, a right video stream, a left depth stream, and a right depth stream. The front-end system 110 can retrieve tensors 170 of frames of the left video stream, tensors 170 of frames of the right video stream, tensors 170 of depth frames of the left and/or right video streams, and tensors 170 of frames of a disparity map of the right and/or left video streams from the data lake 160. The front-end system 110, based on a display configuration, display setting, etc. can display a window for the sample 150 and display other windows or sub-windows within the sample window to display specific tensors 170. Each frame can be a specific tensor 170 and the tensors 170 can be grouped together based on source, e.g., the tensors 170 of frames of the left video stream can be grouped together, tensors 170 of frames of the right video stream can be grouped together, tensors 170 of depth frames can be grouped together, and tensors 170 of disparity frames can be grouped together. The groupings can be performed through a tensor 170 label or identifier.

For example, in FIG. 17, a window for a sample 150 can be divided into four sub-windows or views. The example samples of FIG. 17 include frames captured from stereo video cameras. A top left window can display tensors 170 of frames of the left video stream. A top right window can display tensors 170 of frames of the right video stream. A bottom left window can display tensors 170 of a depth map frames of the left and/or right videos stream. A bottom right window can display tensors 170 of disparity frames of the right and/or left video streams. The sample window can further include an element 1700 to view through each frame of each stream one by one, e.g., play through the frames, pause play of the frames, skip backwards, skip forwards, etc.

Figure 18:
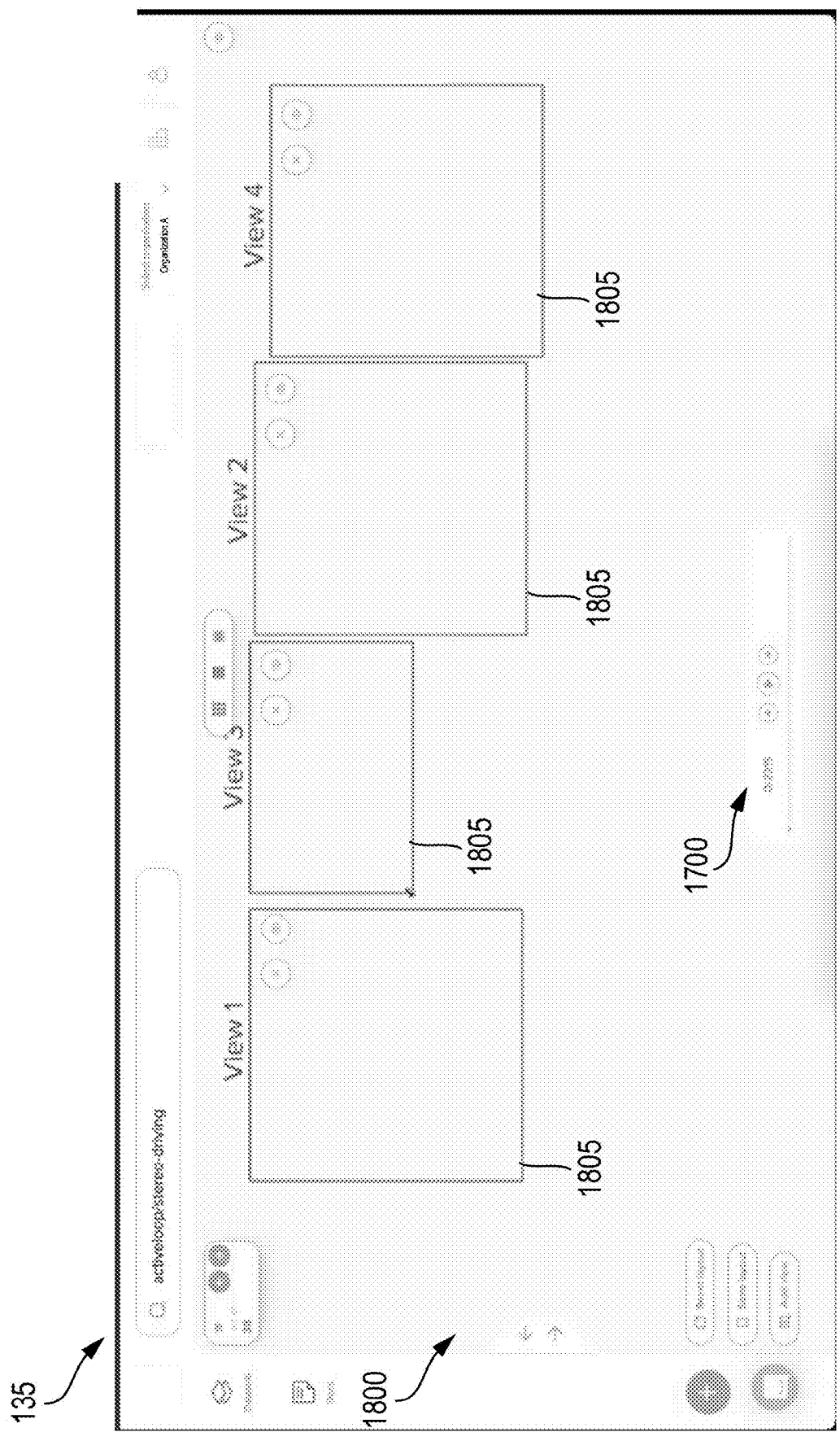
FIG. 18 is an example graphical user interface including a canvas to configure sub-windows for tensors of a sample.

Referring now to FIG. 18, a graphical user interface 135 is shown including a canvas 1800 to configure sub-windows 1805 for tensors 170 of a sample 150. The canvas 1800 can be a user interface element, an area of the graphical user interface 135, a rectangle within the graphical user interface 135, etc., where a user can drag, drop, rotate, move, position, edit, or adjust the size, position, location, orientation, or configuration of views, windows, sub-views, sub-windows, boxes, rectangles, or sub-windows 1805. A user, by providing user input via the client device 130, can create each sub-window 1805. A user, by providing user input via the client device 130, can delete each sub-window 1805. The user, by providing user input via the client device 130, can position each sub-window 1805 on the canvas 1800. For example, the front-end system 110 can receive an interaction from the client device 130 that defines a change in a position of a first sub-window 1805. Furthermore, the front-end system 110 can receive an interaction from the client device 130 that defines a change in a second view position of a sub-window 1805. The user, by providing user input via the client device 130, can adjust the length, width, or height of each sub-window 1805 on the canvas 1800. For example, the front-end system 110 can receive an interaction from the client device 130 that defines a change in a first view size of a first view 1805. Furthermore, the front-end system 110 can receive an interaction from the client device 130 that defines a change in a second view size of a second view 1805. Furthermore, the user can adjust the size or position of the element 1700 on the canvas 1800.

Figure 19:
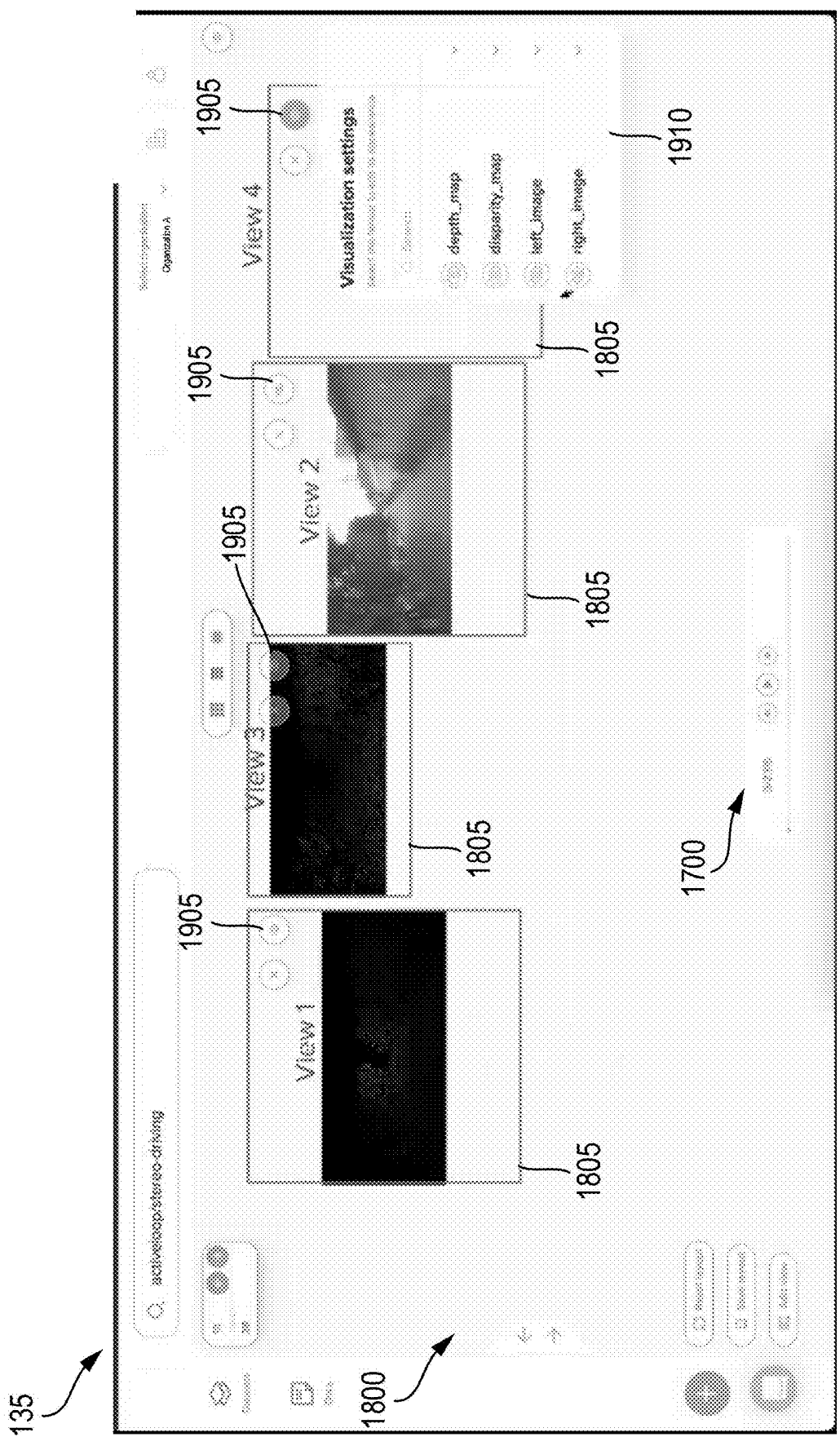
FIG. 19 is an example graphical user interface including a user interface element to select tensors to be displayed within user configured sub-windows.

Referring FIG. 19, a graphical user interface 135 including a user interface element 1910 (sometimes referred to as the "window 1910") to select tensors 170 to be displayed within the user-configured sub-windows 1805 is shown. For example, the user can interact with a user interface element 1905, e.g., button, a region in the graphical user interface 135, a shape such as a circle, square, oval, etc. Each window 1805 can include an element 1905. Responsive to receiving an interaction, via the client device 130, with the element 1905, the front-end system 110 can cause the graphical user interface 135 to display the window 1910. Via the window 1910, a user can select which tensors 170 are displayed within the respective sub-window 1805, e.g., the sub-window 1805 associated with the element 1905 that was inter-acted with. Via the window 1910, a user can activate or deactivate at least one tensor 170 for the sub-window 1805. For example, a user can select corresponding elements in the window 1910 to view the depth map tensors 170 in a first window 1805, view disparity map tensors 170 in a second window 1805, view left camera frame tensors 170 in a third window 1805, and view right camera frame tensors 170 in a fourth window 1805.

The front-end system 110 can save the configuration received via the canvas 1800. The front-end system 110 can save the configuration received via the canvas 1800 responsive to receiving an input from the client device 130. The front-end system 110 can store the configuration for a specific sample 150 and apply the configuration to tensors 170 of the specific sample 150 when the specific sample 150 is displayed in the graphical user interface 135. The front-end system 110 can save the configuration for all samples 150 of the dataset 180 (or a group or set of samples of the dataset 180).

The tensor types selected for display in each view 1805 can be different tensor types. However, the tensor types selected for display in each view 1805 may have at least one tensor type in common. For example, one view 1805 could display an image tensor 170 with label tensors 170 while another view 1805 could display the image tensor 170 with bounding boxes tensors 170. While some views 1805 may have tensor types in common, other views 1805 may not have any tensor types in common. In some cases, none of the views 1805 may have tensor types in common.

Figure 20:
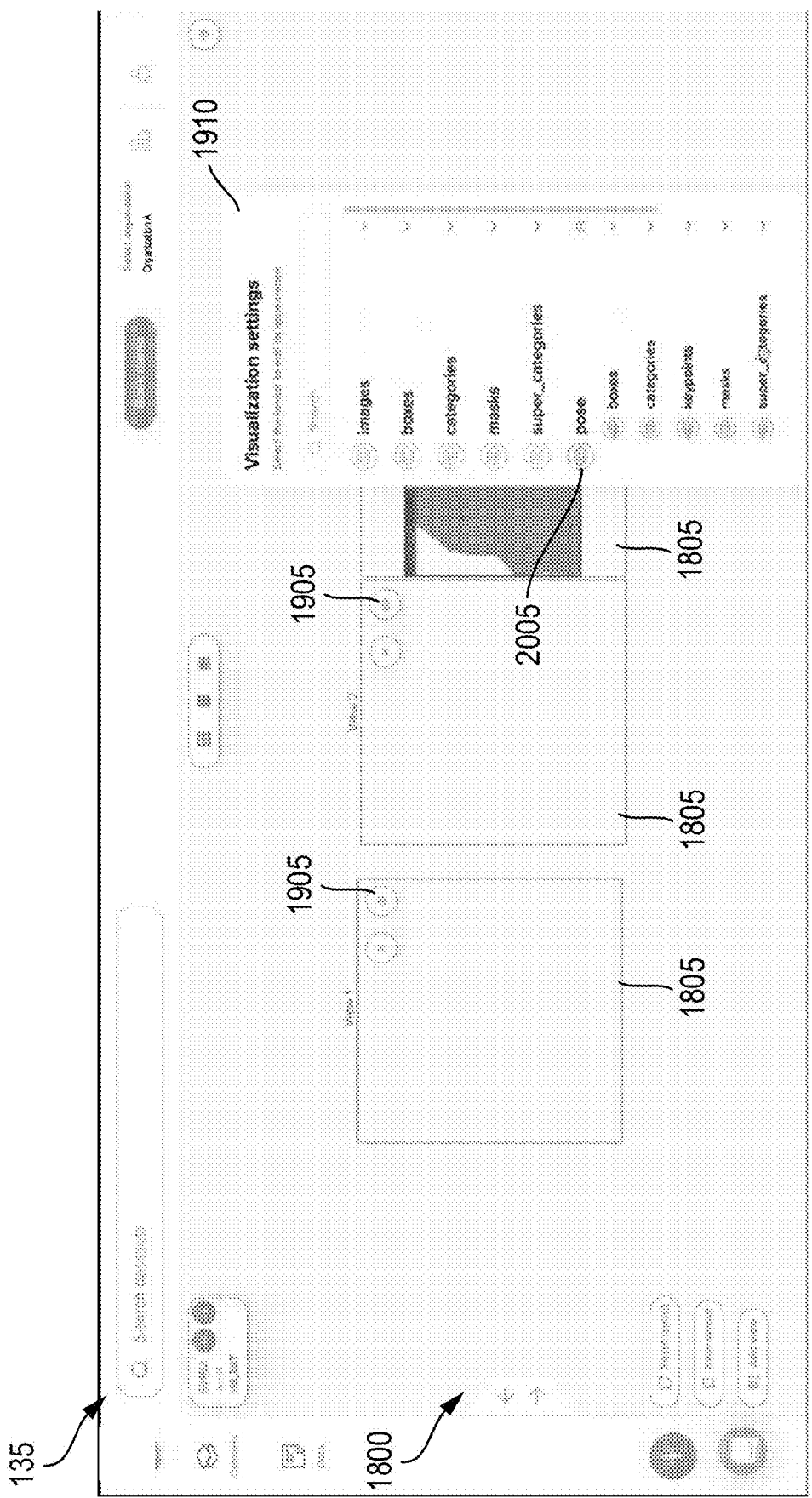
FIG. 20 is an example graphical user interface including a user interface element to select tensor groups to be displayed within user configured sub-windows.

Referring now to FIG. 20, the graphical user interface 135 including the user interface element 1910 to select tensor groups to be displayed within the user-configured sub-windows 1805 is shown. The element 1910 can display a tensor group 2005 that groups multiple other tensors 170 together. For example, a pose tensor group 2005 can include bounding box tensors 170, category tensors 170, key point tensors 170, mask tensors 170, super category tensors 170, etc. A user, via the client device 130 and the element 1910, can enable or disable visibility of a group of tensors 170 within the corresponding sub-window 1805, or enable or disable visibility of specific tensors 170 of the group within the corresponding sub-window 1805. Tensor groups can be defined by a user or defined in a dataset 180 when the dataset 180 is on-boarded by the transformer 175. For example, via the element 1910 of FIG. 20, the front-end system 110 can receive one or multiple interactions from the client device 130 that defines a subset of the multiple of tensors 170 or tensor types of each sample 150 of the multi-dimensional sample dataset 180 that are to be displayed according to a first view size received for a first view 1805 and a second view position of a second view 1805. For example, for each view 1805, a user can select a set of tensor types via the element 1910 for each sample 150 to be displayed in the views 1805. For example, for a first view 1805, the front-end system 110 can receive input identifying one or more first tensor types to define a first group of tensor types 180 for tensors 170 of the dataset 180. For example, for a second view 1805, the front-end system 110 can receive input identifying one or more second tensor types to define a second group of tensor types 180 for tensors 170 of the dataset 180.

Figure 21:
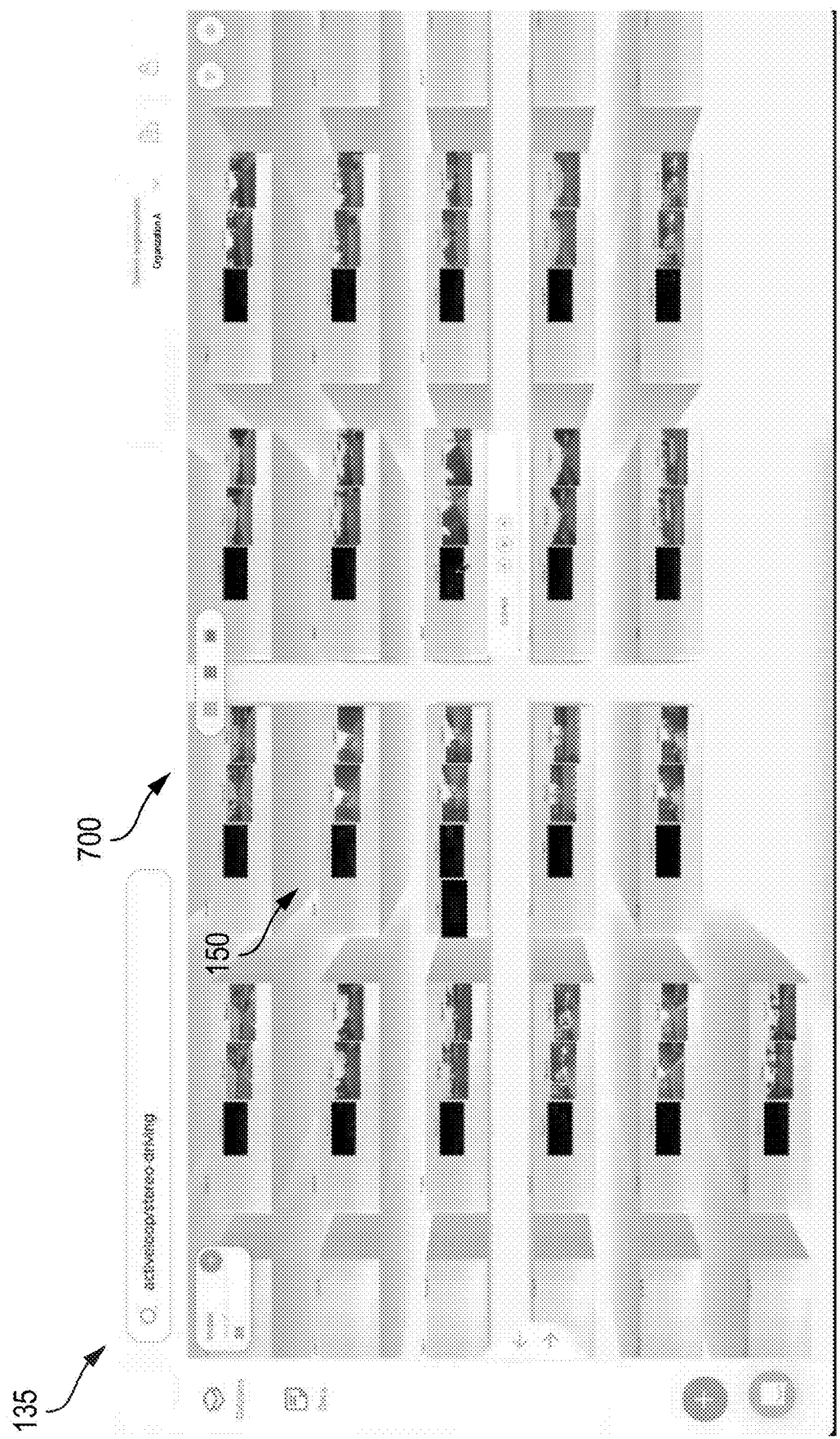
FIG. 21 is an example graphical user interface including samples including tensors displayed within sub-windows of a sample window based on a user configuration.

Referring now to FIG. 21, the graphical user interface 135 is shown including multiple samples 150 displayed in the window 700 according to the user configuration. Each sample 150 can be displayed in a window with sub-windows for specific tensors 170 of the sample defined according to the configuration received by the front-end system 110 and generated via the canvas 1800. As the front-end system 110 retrieves samples 150 from the data lake 160, the front-end system 110 can apply the configuration received from the client device 130 and display each sample 150 according to the configuration of windows and sub-windows.

Figure 22:
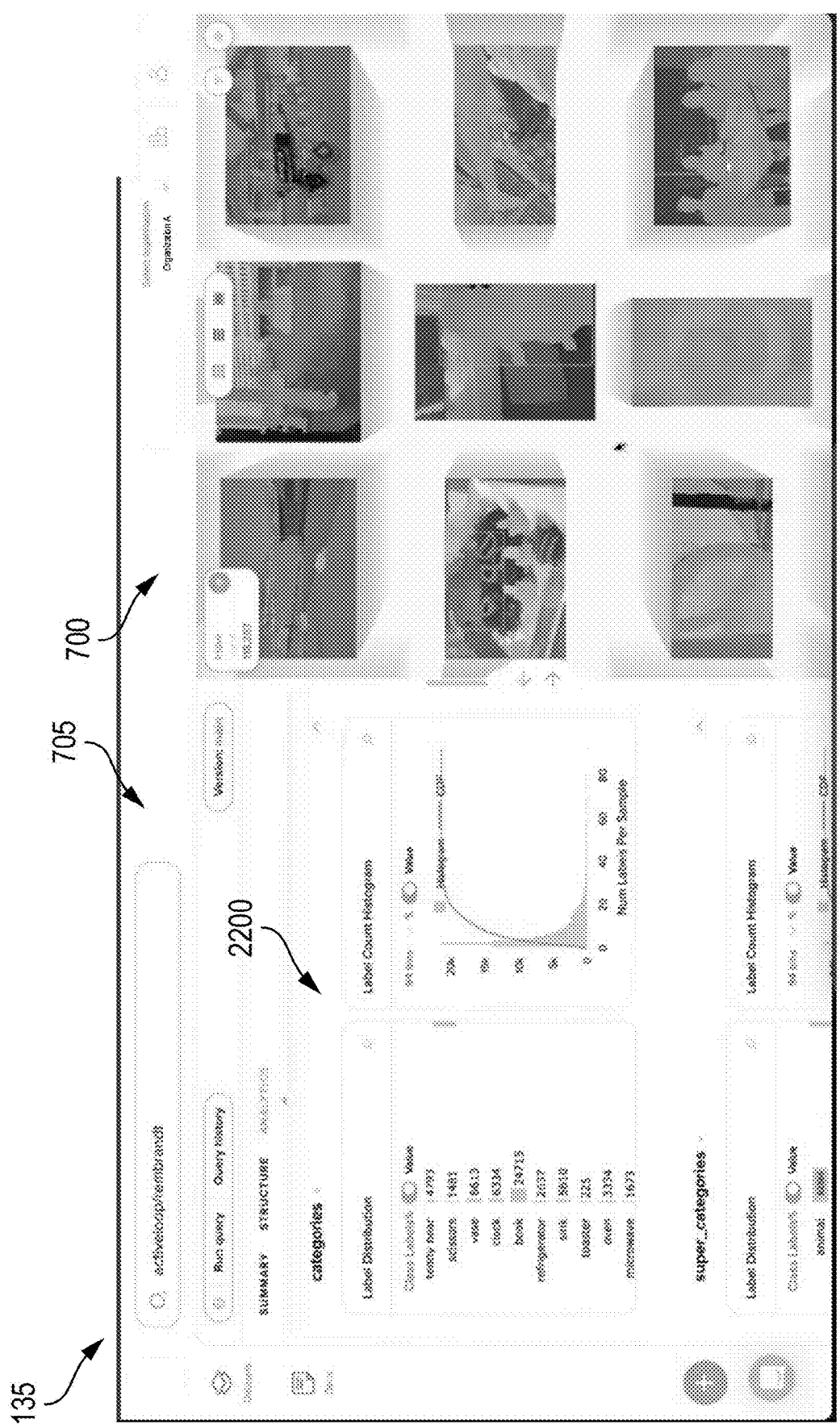
FIG. 22 is an example graphical user interface including analytics for a dataset.

Referring now to FIG. 22, a graphical user interface 135 is shown including analytics for a dataset 180. The graphical user interface 135 can include a user interface element 2200. The element 2200 can be a window, a region of pixels, a box, a rectangle, etc. The element 2200 can include one or multiple charts. The charts can indicate analytic for the dataset 180. For example, responsive to a user selecting a dataset 180, via the client device 130, the front-end system 110 can retrieve samples 150 of the dataset 180 and analytics of the entire dataset 180. The analytics can be stored in the data lake 160. For example, the analytics can be stored as tensors 170 with in the data lake 160. The analytics can be generated responsive to a dataset 180 being created and/or stored in the data lake 160.

The analytics can be determined, generated, or computed by the front-end system 110. For example, if a user filters the dataset 180 with query data 140, turns tensors 170 on or off, or otherwise modifies the dataset 180, the front-end system 110 can determine analytics (e.g., new analytics or updated analytics) based on the filtered or adjusted dataset 180. For example, responsive to implementing a query via query data 140, the interface 155 can return samples 150 or indexes of samples 150 based on the fetch request 145 and/or also return metadata indicating the number of the samples 150 identified by the query data 140, the tensors 170 of the samples 150 identified by the query data 140 (e.g., numbers of different label tensors identified for different image tensors), etc. The front-end system 110 can generate the analytics based on the samples 150, the indices of the samples 150, or based on the metadata.

The charts can be bar charts, e.g., a label distribution of label tensors 170, e.g., number of image tensors 170 that are associated with a teddy bear label tensor 170, a scissors label tensor 170, a vase label tensor 170, etc. The chart can display the raw number of samples 150 including the labels or a percentage of samples 150 including the specific labels. The charts can be a histogram with a plotted cumulative distribution function (CDF) indicating the number of labels per sample 150.

Figure 23:
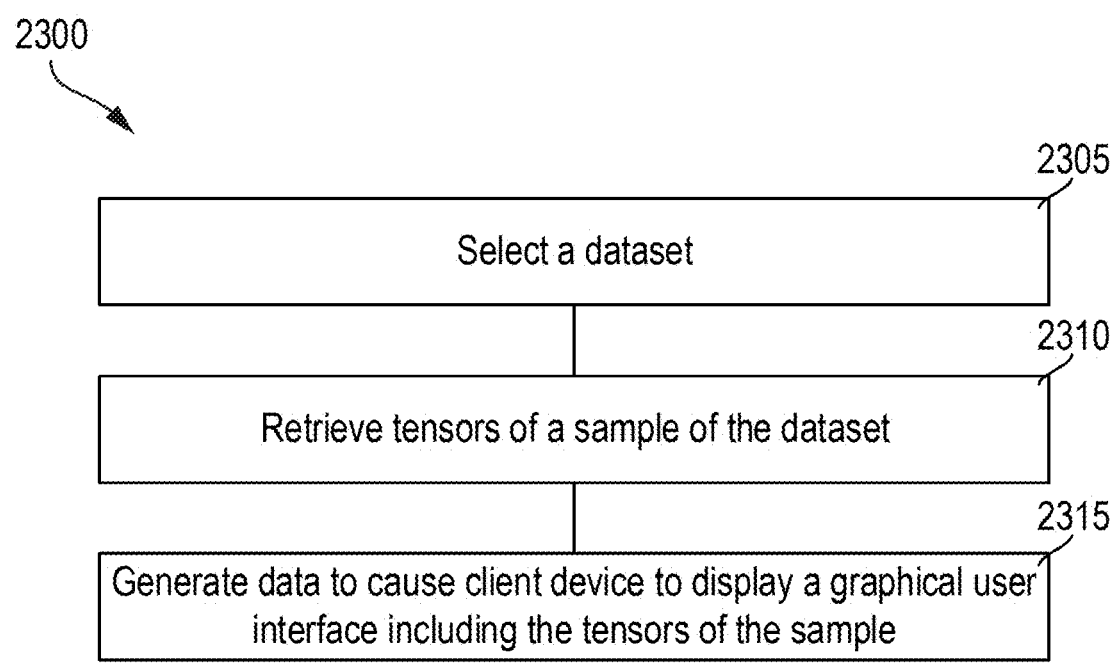
FIG. 23 is an example method of constructing a graphical user interface to display tensors that make up a sample of a dataset.

Referring now to FIG. 23, an example method 2300 of constructing a graphical user interface 135 to display tensors 170 that make up a sample 150 of a dataset 180 is shown. At least a portion of at least one ACT of the method 2300 can be performed by the data processing system 105, the client device 130, or any other type of computing system, server, apparatus, or device. The method 2300 can include an ACT 2305 of selecting a dataset. The method 2300 can include an ACT 2310 of retrieving, from the dataset, tensors of a sample. The method 2300 can include an ACT 2310 of generating data to cause a client device to display a graphical user interface including the tensors of the sample.

At ACT 2305, the method 2300 can include selecting, by the data processing system 105, a dataset 180. For example, the data lake 160 can store multiple different datasets 180, which each may include a collection, group, or segment of samples 150. The data processing system 105 can receive the selection of the dataset 180 from a client device 130. For example, the data processing system 105 can cause the client device 130 to display the graphical user interface 135. A user, via the client device 130, can make a selection of a dataset 180 via the graphical user interface 135, e.g., as shown in FIG. 6. For example, a user can select the dataset 180 via the element 605 or select the dataset 180 via the search element 600.

At ACT 2310, method 2300 can include retrieving, by the data processing system 105, tensors 170 of at least one sample 150 of the dataset 180. For example, the data processing system 105 can retrieve tensors 170 that make up samples 150 from the data lake 160. The data processing system 105 can detect which samples 150 a user has requested to view on the graphical user interface 135, for example, detect which samples 150 or sample tiles are within a viewing window of the graphical user interface 135. The front-end system 110 can generate the fetch request 145 to include index values associated with the tiles that the user has requested to view. By monitoring or detecting which samples 150 are to be displayed in the graphical user interface 135, the front-end system 110 can dynamically request and load samples 150 from the data lake 160, instead of retrieving and loading all of the samples 150 of a dataset 180. The front-end system 110 can transmit the fetch request 145 to the interface 155. Responsive to the fetch request 145, the interface 155 can retrieve the tensors 170 from the chunks 165 corresponding to the identified sample indices of the data lake 160 and respond to the front-end system 110 with the tensors 170.

The interface 155 can read the tensors 170 from one or multiple different chunks 165. For example, based on an index (or indices) included within the fetch request 145, the interface 155 can read portions of chunks 165 that correspond to the tensors 170 associated with the index value. In this regard, instead of retrieving entire chunks 165, the interface 155 can only retrieve portions of chunks that include the tensors 170. This can greatly reduce the amount of information communicated between the front-end system 110 and the interface 155 and reduce the amount of data that the front-end system 110 needs to store.

At ACT 2315, the method 2300 can include generating, by the data processing system 105, data to cause the client device 130 to display a graphical user interface 135 including the tensors 170 of the sample 150. For example, the data processing system 105 can update the graphical user interface 135 to display the tensors 170 of the sample 150. The data processing system 105 can detect a zoom level of the graphical user interface 135. Based on a type associated with each tensors 170, the client device 130 can display or hide the tensors 170. For example, at a first zoom level, the data processing system 105 can cause an image tensor 170 to be displayed for the sample 150. A visibility rule can map tensor types or "htypes" to an on or off indication (e.g., binary value) based on zoom level. At a fully zoomed out level, all tensor types may be enabled. However, at zoomed in levels, the visibility run can indicate that certain tensors 170 of certain tensor types should be on or visible while other tensors 170 of other tensor types should be off or hidden. At a second zoom level greater than the first zoom level, the data processing system 105 can display bounding box tensors 170 or mask tensors 170 over the image tensor 170. At a third zoom level greater than the second zoom level, the data processing system 105 can display a tag tensor 170 along with the bounding box tensors 170, the mask tensors 170, and the image tensor 170.

Figure 24:
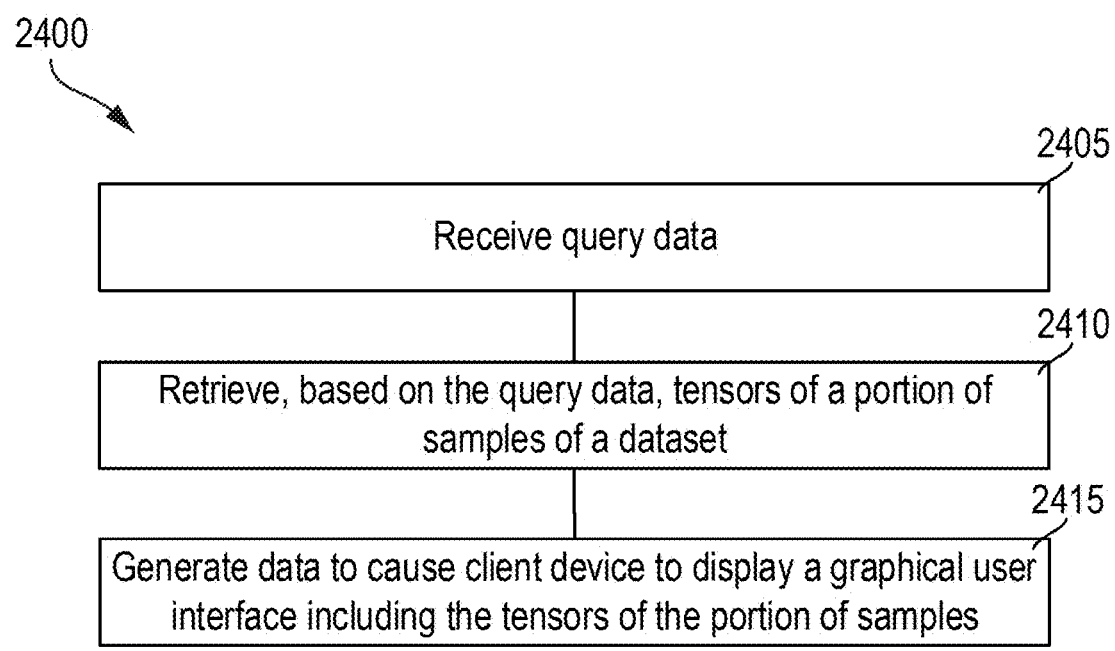
FIG. 24 is an example method of constructing a graphical user interface to display tensors that make up samples of a dataset filtered based on query data.

Referring now to FIG. 24, a method 2400 of constructing a graphical user interface 135 to display tensors 170 that make up samples 150 of a dataset 180 filtered based on query data 140 is shown. At least a portion of at least one ACT of the method 2400 can be performed by the data processing system 105, the client device 130, or any other type of computing system, server system, apparatus, or device. The method 2400 can include an ACT 2405 of receiving query data. The method 2400 can include an ACT 2410 of retrieving, based on the query data, tensors of a portion of samples of a dataset. The method 2400 can include an ACT 2415 generating data to cause client device to display a graphical user interface including the tensors of the portion of samples.

At ACT 2405, the method 2400 can include receiving, by the data processing system 105, query data 140. The data processing system 105 can receive the query data 140 via the graphical user interface 135. For example, a user can type, select, speak, or otherwise input a query string including query commands and query parameters into the graphical user interface 135. For example, the data processing system 105 can receive the query data 140 via the graphical user interface 135 as shown in FIGS. 11-14. The data processing system 105 can identify filtering criteria for displaying the multi-dimensional sample dataset 180 within a display region 310 of the graphical user interface 135. For example, based on the query data 140 received via the client device 130, the data processing system 105 can identify filtering criterial for displaying samples 150 of the dataset 180.

At ACT 2410, the method 2400 can include retrieving, by the data processing system 105, based on the query data 140, tensors 170 of a portion of samples 150 of a datasets 180. For example, the front-end system 110 can receive the query data 140 and transmit the query data 140 to the interface 155. The interface 155 can identify index values of samples 150 that meet the criteria specified in the query data 140. For example, the interface 155 can identify samples 150 that include specific types or numbers of tensors 170. A query 140 can cause the interface 155 to identify all samples 150 that include a mask tensor 170, include all samples 150 that include a specific tensor label 170, retrieve all samples 150 that include a bounding box that meets a specific dimension requirement, etc. The interface 155 can return all of indices of samples 150 that meet the criteria defined by the query data 140 to the front-end system 110.

At ACT 2415, the method 2400 can include generating, by the data processing system 105, data to cause the client device 130 to display the graphical user interface 135 including the tensors 170 of the portion of samples 150 of the dataset 180. For example, the front-end system 110 can transmit requests 145 for tensors 170 of specific indices responsive to receiving a request via the client device 130 to view a specific sample 150 or sample tile. The front-end system 110 can request samples with indices that correspond to the list of indices received from the interface 155, the list of indices identifying samples 150 that meet the criteria of the query data 140. The interface 155 can return tensors 170 of requested samples 150 to the front-end system 110. The front-end system 110 can cause the graphical user interface 135 to include, display, or render the received tensors 170.

Figure 25:
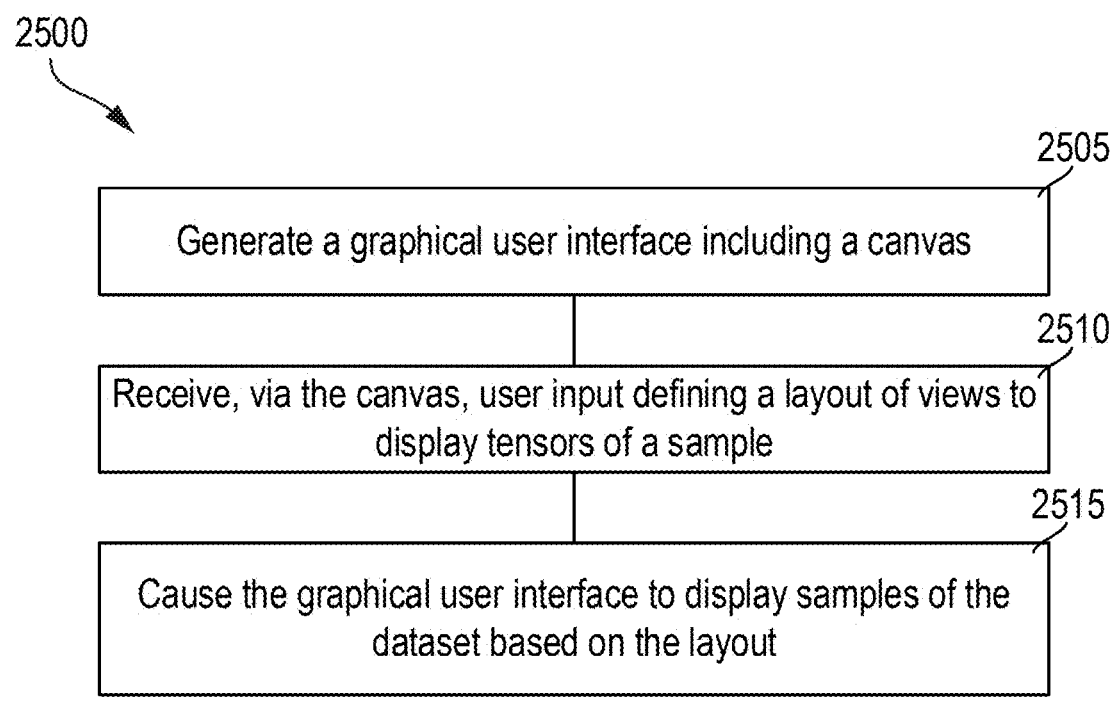
FIG. 25 is an example method of configuring windows to display tensors of samples of a dataset.

Referring now to FIG. 25, a method 2500 is shown of configuring windows 1505 to display tensors 170 of samples 150 of a dataset 180. At least a portion of at least one ACT of the method 2500 can be performed by the data processing system 105, the client device 130, or any other type of computing system, server system, apparatus, or device. The method 2500 can include an ACT 2505 of generating a graphical user interface including a canvas. The method 2500 can include an ACT 2510 of receiving, via the canvas, user input defining a layout of views to display tensors of a sample. The method 2500 can include an ACT 2515 of causing the graphical user interface to display samples of the dataset based on the configuration.

At ACT 2505, the method 2500 can include generating, by the data processing system 105, a graphical user interface 135 including the canvas 1800. For example, front-end system 110 can cause the client device 130 to display the graphical user interface 135 including the canvas 1800. The canvas 1800 can be a workspace, an area of pixels, a window, a box, or a rectangle within which a user, via the client device 130, can position, rotate, shape, size, or adjust other smaller boxes, windows, or areas of pixels, e.g., sub-windows. The front-end system 110 can generate or display the canvas 1800 in the graphical user interface 135 responsive to a request from the client device 130. For example, the front-end system 110 can receive a request to modify a layout for samples 150 of a multi-dimensional sample dataset 180 where each sample 150 of the multi-dimensional dataset 180 corresponds to a respective set of tensors 170. Responsive to the request, the front-end system 110 can provide the canvas 1800. For example, responsive to receiving the request, the front-end system 110 can cause the client device 130 to display the graphical user interface 135 where the graphical user interface 135 enables modification of the layout. For example, the front-end system 110 can cause the graphical user interface 135 to display the canvas 1800.

At ACT 2510, the method 2500 can include receiving, by the data processing system 105, via the canvas 1800, user input defining a layout of views 1805 to display tensors 170 of a sample 150. For example, a user can create or delete views 1805 in the canvas 1800 by providing user input via the client device 130. For example, a user can add a new window 1805 to the canvas 1800 and select a positon for the window 1805 on the canvas 1800. The user can adjust, via the client device 130, the width, height, or shape of the window 1805 by providing user input via the client device 130. For each window 1805, a user can select a tensor type to be displayed within the window 1805 from a menu of tensor types. For each window 1805, a user can select, via the client device 130, a group of tensor types to be displayed within the window 1805.

For example, responsive to providing the graphical user interface 135 or the canvas 1800 in the graphical user interface 135, the front-end system 110 can receive a first request to create or modify a first view 1805 of one or more first tensor types 170 of the respective set of tensors 170 of each sample 150 of the multi-dimensional sample dataset 180. The request can identify one or more first tensor types for display in the first view 1805 and one or more of a first view size and a first view position for the first view 1805. Furthermore, the front-end system 110 can receive additional requests for additional views 1805 to display other tensors of other tensor types for the samples 150 of the dataset 180. For example, the front-end system 110 can receive a second request to create or modify a second view 1805 of one or more second tensor types of the respective set of tensors 170 of each sample 150 of the multi-dimensional sample dataset 180. The request can identify the one or more second tensor types of tensors 170 for display in the second view 1805 and one or more of a second view size and a second view position for the second view 1805.

The user can save, via the client device 130, the layout, the configuration, or the user configuration on the front-end system 110 provided via the user device 130. The front-end system 110 can save the layout for displaying all samples 150, or a portion of samples 150, of a particular dataset 180. For example, the front-end system 110 can generate the layout based on the first request and the second request. The layout can be generated to include the first view and the second view positioned, sized, oriented, or shaped based on the first request and the second request.

At ACT 2515, the method 2500 can include causing, by the data processing system 105, the graphical user interface 135 to display samples 150 of the dataset 180 based on the layout. The data processing system 105 can cause the display of each sample 150 in a window to include tensors 170 in sub-windows 1805 based on the configuration received via the canvas 1800, e.g., the configuration received at the ACT 2510. The data processing system 105 can display each sample 150 of the dataset 180 individually according to the configuration, in a column according to the configuration, or in a grid according to the configuration. For example, the front-end system 110 can present at least a portion of the multi-dimensional sample dataset 180 according to the layout. For example, responsive to viewing one or more tiles within the viewing area 310 of the graphical user interface 135, the front-end system 110 can retrieve display data based on the layout.

For example, the front-end system 110 can retrieve tensors 170 of specific tensor types from the dataset 180 based on the layout and map the tensors 170 into the views 1805 based on a mapping indicated by the layout between the views 1805 and tensor types for samples 150 of the dataset 180. For example, the front-end system 110 can receive a request to view at least a portion of samples 150 of the multi-dimensional dataset 180 according to the layout defined at the ACT 2510 or another second layout, e.g., a default layout or another layout defined by a user via the client device 130. The front-end system 110 can retrieve, with a fetch request 145, tensors 170 of samples 150 of the dataset 180 from the data lake 160. The front-end system 110 can present at least the portion of the multi-dimensional sample dataset 180 according to the layout. The front-end system 110 can provide an indication of each tensor 170 associated with each sample 150 of the multi-dimensional sample dataset 180 in the graphical user interface 135.

Figure 26:
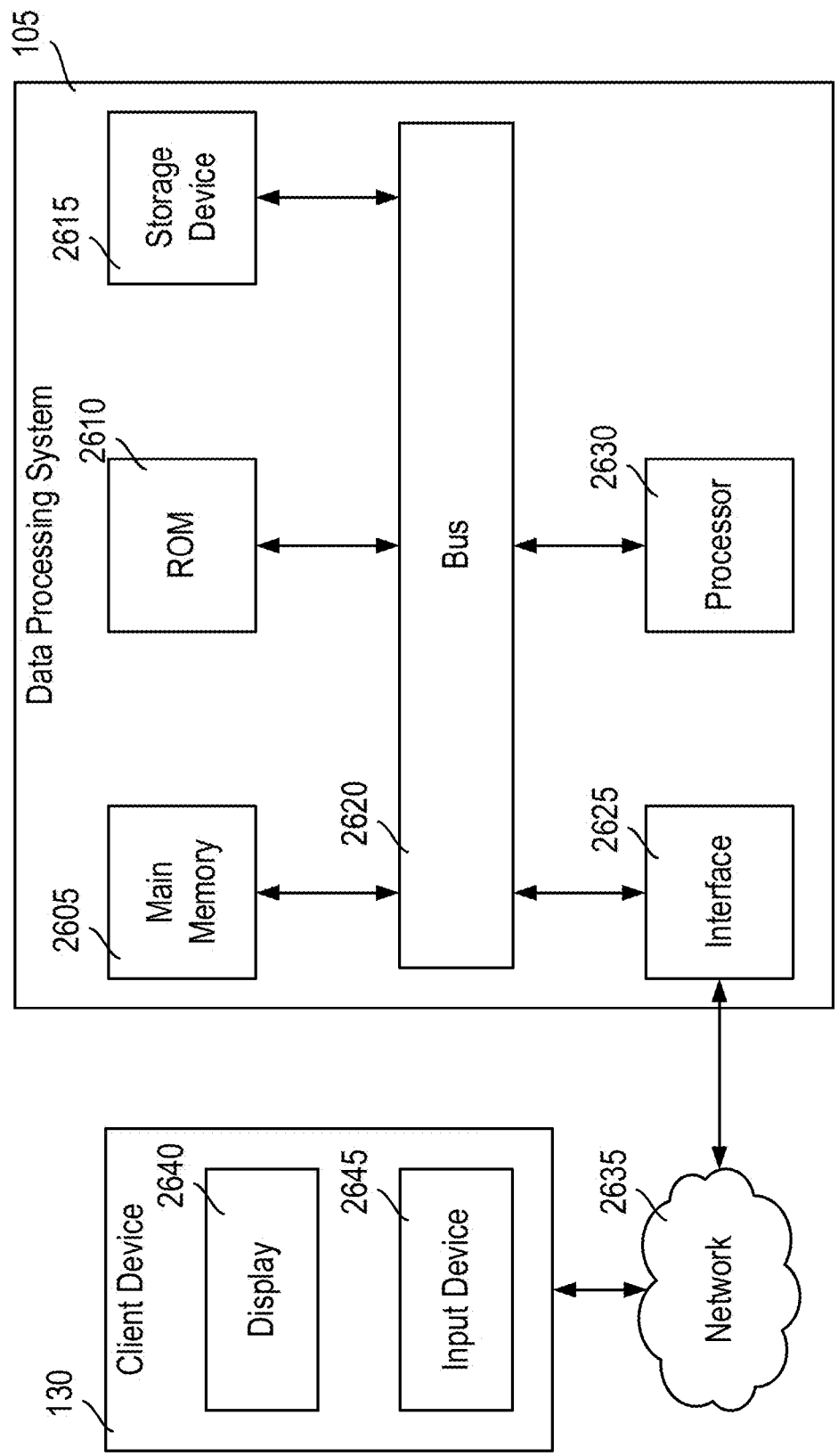
FIG. 26 is a block diagram of an example data processing system.

Referring now to FIG. 26, a data processing system 105 is shown that can be used, for example, to implement the systems and methods described with reference to FIGS. 1-25. The computing architecture described in FIG. 26 can be used for the data processing system 105 or the client device 130. The data processing system 105 includes a bus 2620 or other communication component for communicating information and a processor 2630 coupled to the bus 2620 for processing information. The data processing system 105 also includes main memory 2605, such as a random access memory (RAM) or other dynamic storage device, coupled to the bus 2620 for storing information, and instructions to be executed by the processor 2630. The main memory 2605 can also be used for storing position information, temporary variables, or other intermediate information during execution of instructions by the processor 2630. The data processing system 105 may further include a read only memory (ROM) 2610 or other static storage device coupled to the bus 2620 for storing static information and instructions for the processor 2630. A storage device 2615, such as a solid state device, magnetic disk or optical disk, is coupled to the bus 2620 for persistently storing information and instructions.

The data processing system 105 may be coupled via the bus 2620 to a display 2640, such as a liquid crystal display, or active matrix display, for displaying information to a user. The display 2640 can be a display of the client device 130. An input device 2645, such as a keyboard including alphanumeric and other keys, may be coupled to the bus 2620 for communicating information, and command selections to the processor 2630. The input device 2645 can be a component of the client device 130. The input device 2645 can include a touch screen display 2640. The input device 2645 can include a cursor control, such as a mouse, a trackball, or cursor direction keys, for communicating direction information and command selections to the processor 2630 and for controlling cursor movement on the display 2640.

The data processing system 105 can include an interface 2625, such as a networking adapter. The interface 2625 may be coupled to bus 2620 and may be configured to enable communications with a computing or communications network 2635 and/or other computing systems, e.g., the client device 130. Any type of networking configuration may be achieved using interface 2625, such as wired (e.g., via Ethernet), wireless (e.g., via Wi-Fi, Bluetooth, etc.), pre-configured, ad-hoc, LAN, WAN, etc.

According to various implementations, the processes that effectuate illustrative implementations that are described herein can be achieved by the data processing system 105 in response to the processor 2630 executing an arrangement of instructions contained in main memory 2605. Such instructions can be read into main memory 2605 from another computer-readable medium, such as the storage device 2615. Execution of the arrangement of instructions contained in main memory 2605 causes the data processing system 105 to perform the illustrative processes described herein. One or more processors in a multi-processing arrangement may also be employed to execute the instructions contained in main memory 2605. In alternative implementations, hard-wired circuitry may be used in place of or in combination with software instructions to implement illustrative implementations. Thus, implementations are not limited to any specific combination of hardware circuitry and software.

Although an example processing system has been described in FIG. 26, implementations of the subject matter and the functional operations described in this specification can be carried out using other types of digital electronic circuitry, or in computer software, firmware, or hardware, including the structures disclosed in this specification and their structural equivalents, or in combinations of one or more of them.

In some implementations, a method can include identifying, by one or more processors, a display region for displaying a first subset of samples of a multi-dimensional sample dataset, the display region corresponding to a first zoom level, each sample of the first subset associated with a respective set of tensors. The method can include selecting, by the one or more processors, a first subset of tensors of the respective set of tensors for each sample of the first subset of samples based on the first zoom level of the display region. The method can include presenting, by the one or more processors, first display data corresponding the first subset of tensors within the display region. The method can include receiving, by the one or more processors, a request to adjust the first zoom level to a second zoom level. The method can include selecting, by the one or more processors, a second subset of tensors of the respective set of tensors for each sample of a second subset of samples, the second subset of samples identified from the multi-dimensional sample dataset based on the second zoom level, the second subset of tensors having at least one different tensor type than the first subset of tensors. The method can include presenting, by the one or more processors, second display data corresponding to the second subset of tensors within the display region.

In some implementations, the second subset of samples is a subset of the first subset of samples.

In some implementations, the second subset of samples is a superset of the first subset of samples and a subset of the multi-dimensional sample dataset.

In some implementations, the method includes selecting, by the one or more processors, the first subset of tensors based on a visibility rule for tensor types associated with the first zoom level.

In some implementations, the method can include receiving, by the one or more processors, the request to adjust the first zoom level including a receiving, by the one or more processors, a request to change a display arrangement of the multi-dimensional sample dataset.

In some implementations, a first tensor data type of a first tensor of the first subset of tensors includes image data. In some implementations, a second tensor data type of a second tensor of the first subset of tensors comprises mask data, label data, or bounding box data.

In some implementations, a first sample of the first subset of samples includes the first tensor and the second tensor. In some implementations, the second subset of tensors includes the first tensor and does not include the second tensor.

In some implementations, the method can include presenting, by the one or more processors, the first display data including generating a first set of fetch requests for the first display data corresponding the first subset of tensors.

In some implementations, the method can include presenting, by the one or more processors, the second display data by generating, by the one or more processors, a second set of additional fetch requests for the second display data corresponding to the second subset of tensors. In some implementations, the second subset of tensors is a superset of the first subset of tensors.

In some implementations, the second subset of tensors is a subset of the first subset of tensors. In some implementations, the method can include presenting, by the one or more processors, the first display data including canceling, by the one or more processors, one or more of the first set of fetch requests that do not correspond to the second display data associated with the second subset of tensors.

In some implementations, a system can include a data processing system including memory coupled to one or more processors to identify a display region for displaying a first subset of samples of a multi-dimensional sample dataset, the display region corresponding to a first zoom level, each sample of the first subset associated with a respective set of tensors. The data processing system can select a first subset of tensors of the respective set of tensors for each sample of the first subset of samples based on the first zoom level of the display region. The data processing system can present first display data corresponding the first subset of tensors within the display region. The data processing system can receive a request to adjust the first zoom level to a second zoom level. The data processing system can select a second subset of tensors of the respective set of tensors for each sample of a second subset of samples, the second subset of samples identified from the multi-dimensional sample dataset based on the second zoom level, the second subset of tensors having at least one different tensor type than the first subset of tensors. The data processing system can present second display data corresponding to the second subset of tensors within the display region.

In some implementations, the second subset of samples is a subset of the first subset of samples.

In some implementations, the second subset of samples is a superset of the first subset of samples and a subset of the multi-dimensional sample dataset.

In some implementations, the data processing system can select the first subset of tensors is based on a visibility rule for tensor types associated with the first zoom level.

In some implementations, the data processing system is configured to receive a request to change a display arrangement of the multi-dimensional sample dataset.

In some implementations, the data processing system is configured to generate a first set of fetch requests for the first display data corresponding the first subset of tensors.

In some implementations, a first tensor data type of a first tensor of the first subset of tensors includes image data. In some implementations, a second tensor data type of a second tensor of the first subset of tensors includes mask data, label data, or bounding box data.

In some implementations, a first sample of the first subset of samples includes the first tensor and the second tensor. In some implementations, the second subset of tensors includes the first tensor and does not include the second tensor.

In some implementations, the method can include identifying, by one or more processors, a display region for displaying a first subset of samples of a multi-dimensional sample dataset, the display region corresponding to a first display position, each sample of the first subset associated with a respective set of tensors that are to be displayed within the display region. In some implementations, the method can include generating, by the one or more processors, a first set of fetch requests for the respective set of tensors of the respective set of tensors of each sample of the first subset of samples. In some implementations, the method can include receiving, by the one or more processors, a request to adjust the first display position to a second display position. In some implementations, the method can include terminating, by the one or more processors, one or more of the first set of fetch requests based on the second display position. In some implementations, the method can include generating, by the one or more processors, a second set of fetch requests for the respective set of tensors of each sample of a second subset of samples selected based on the second display position. In some implementations, the method can include presenting, by the one or more processors, display data corresponding to the respective set of tensors of each sample of the second subset of samples within the display region.

In some implementations, the method can include receiving, by the one or more processors, a zoom level for the display region. In some implementations, the method can include selecting, by the one or more processors, a subset of tensors of the respective set of tensors for at least one sample of the second subset of samples, the second subset of samples identified from the multi-dimensional sample dataset based on the zoom level. In some implementations, the method includes presenting, second display data corresponding to the subset of tensors within the display region.

In some implementations, a method can include identifying, by one or more processors, filtering criteria for displaying a multi-dimensional sample dataset within a display region. In some implementations, the method can include selecting, by the one or more processors, based on the filtering criteria, a subset of samples from the multi-dimensional sample dataset, each sample of the subset of samples associated with a respective set of tensors that are to be displayed within the display region. In some implementations, the method can include mapping, by the one or more processors, display data associated with the respective set of tensors of each sample of the subset of samples to respective display locations for display in the display region. In some implementations, the method can include presenting, by the one or more processors, the display data associated with the respective set of tensors in the display region according to the mapping.

In some implementations, the method can include mapping, by the one or more processors, the display data to a two-dimensional grid format.

In some implementations, the method can include mapping, by the one or more processors, the display data to a list format.

In some implementations, the method can include receiving, by the one or more processors, a request to adjust a first display position of the display region to a second display position. In some implementations, the method can include selecting, by the one or more processors, based on the filtering criteria and the second display position, a second subset of samples from the multi-dimensional sample dataset. In some implementations, the method can include mapping, by the one or more processors, second display data associated with the respective set of tensors of each sample of the second subset of samples to respective display locations for display in the display region. In some implementations, the method includes presenting, by the one or more processors, the second display data associated with the respective set of tensors of the second subset of samples in the display region according to the second mapping.

In some implementations, the method includes receiving, by the one or more processors, a request to adjust a first zoom level of the display region to a second zoom level. In some implementations, the method includes selecting, by the one or more processors, based on the filtering criteria and the second zoom level, a second subset of samples from the multi-dimensional sample dataset. In some implementations, the method includes mapping, by the one or more processors, second display data associated with a subset of the respective set of tensors of each sample of the second subset of samples to respective display locations for display in the display region, the subset of the respective set of tensors selected based on the second zoom level. In some implementations, the method includes presenting, by the one or more processors, the second display data associated with the respective set of tensors of the second subset of samples in the display region according to the second mapping.

In some implementations, the method includes generating, by the one or more processors, a set of fetch requests for the display data corresponding to the respective set of tensors of the subset of samples.

In some implementations, the method includes terminating, by the one or more processors, at least one of the set of fetch requests for the display data responsive to receiving a request to adjust a first zoom level of the display region to a second zoom level.

In some implementations, the method includes terminating, by the one or more processors, at least one of the set of fetch requests for the display data responsive to receiving a request to adjust a first display location of the display region to a second display location.

In some implementations, a system includes a data processing system including memory coupled to one or more processors to identify filtering criteria for displaying a multi-dimensional sample dataset within a display region. The data processing system can select based on the filtering criteria, a subset of samples from the multi-dimensional sample dataset, each sample of the subset of samples associated with a respective set of tensors that are to be displayed within the display region. The data processing system can map display data associated with the respective set of tensors of each sample of the subset of samples to respective display locations for display in the display region. The data processing system can present the display data associated with the respective set of tensors in the display region according to the mapping.

In some implementations, the data processing system is configured to map the display data to a two-dimensional grid format.

In some implementations, the data processing system is configured to map the display data to a list format.

In some implementations, the data processing system is configured to receive a request to adjust a first display position of the display region to a second display position. In some implementations, the data processing system can select based on the filtering criteria and the second display position, a second subset of samples from the multi-dimensional sample dataset. In some implementations, the data processing system can map second display data associated with the respective set of tensors of each sample of the second subset of samples to respective display locations for display in the display region. In some implementations, the data processing system can present the second display data associated with the respective set of tensors of the second subset of samples in the display region according to the second mapping.

In some implementations, the data processing system is configured to receive a request to adjust a first zoom level of the display region to a second zoom level. The data processing system can select based on the filtering criteria and the second zoom level, a second subset of samples from the multi-dimensional sample dataset. The data processing system can map second display data associated with a subset of the respective set of tensors of each sample of the second subset of samples to respective display locations for display in the display region, the subset of the respective set of tensors selected based on the second zoom level. The data processing system can present the second display data associated with the respective set of tensors of the second subset of samples in the display region according to the second mapping.

In some implementations, the data processing system is configured to generate a set of fetch requests for the display data corresponding to the respective set of tensors of the subset of samples.

In some implementations, the data processing system is configured to terminate at least one of the set of fetch requests for the display data responsive to receiving a request to adjust a first zoom level of the display region to a second zoom level.

In some implementations, the data processing system is configured to terminate at least one of the set of fetch requests for the display data responsive to receiving a request to adjust a first display location of the display region to a second display location.

In some implementations, one or more storage media storing instructions thereon, that, when executed by one or more processors, cause the one or more processors to identify filtering criteria for displaying a multi-dimensional sample dataset within a display region. The instructions can cause the one or more processors to select based on the filtering criteria, a subset of samples from the multi-dimensional sample dataset, each sample of the subset of samples associated with a respective set of tensors that are to be displayed within the display region. The instructions can cause the one or more processors to map display data associated with the respective set of tensors of each sample of the subset of samples to respective display locations for display in the display region. The instructions can cause the one or more processors to present the display data associated with the respective set of tensors in the display region according to the mapping.

In some implementations, the instructions causing the one or more processors to receive a request to adjust a first display position of the display region to a second display position. In some implementations, the instructions cause the one or more processors to select based on the filtering criteria and the second display position, a second subset of samples from the multi-dimensional sample dataset. In some implementations, the instructions cause the one or more processors to map second display data associated with the respective set of tensors of each sample of the second subset of samples to respective display locations for display in the display region. In some implementations, the instructions cause the one or more processors to present the second display data associated with the respective set of tensors of the second subset of samples in the display region according to the second mapping.

In some implementations, the instructions can cause the one or more processors to receive a request to adjust a first zoom level of the display region to a second zoom level. In some implementations, the instructions can cause the one or more processors to select based on the filtering criteria and the second zoom level, a second subset of samples from the multi-dimensional sample dataset. In some implementations, the instructions can cause the one or more processors to map second display data associated with a subset of the respective set of tensors of each sample of the second subset of samples to respective display locations for display in the display region, the subset of the respective set of tensors selected based on the second zoom level. In some implementations, the instructions cause the one or more processors to present the second display data associated with the respective set of tensors of the second subset of samples in the display region according to the second mapping.

In some implementations, the instructions causing the one or more processors to generate a set of fetch requests for the display data corresponding to the respective set of tensors of the subset of samples.

In some implementations, a method can include receiving, by one or more processors, a request to modify a layout for samples of a multi-dimensional sample dataset, each sample of the multi-dimensional dataset corresponding to a respective tensors. The method can include providing, by the one or more processors, a graphical user interface that enables modification of the layout. The method can include, responsive to providing the graphical user interface, receiving a first request to create or modify a first view of one or more first tensor types of the respective tensors of each sample of the multi-dimensional sample dataset, the request identifying one or more first tensor types and one or more of a first view size and a first view position. The method can include receiving a second request to create or modify a second view of one or more second tensor types of the respective tensors of each sample of the multi-dimensional sample dataset, the request identifying the one or more second tensor types and one or more of a second view size and a second view position. The method can include generating, by the one or more processors, the layout based on the first request and the second request, the layout including the first view and the second view. The method can include presenting, by the one or more processors, at least a portion of the multi-dimensional sample dataset according to the layout.

In some implementations, the one or more second tensor types has at least one tensor type in common with the one or more first tensor types.

In some implementations, the method can include retrieving, by the one or more processors, display data for at least the portion of the multi-dimensional sample dataset based on the layout. In some implementations, the method can include presenting, by the one or more processors, the display data responsive to retrieving the display data within the graphical user interface.

In some implementations, the method can include retrieving, by the one or more processors, an indication of each tensor associated with each sample of the multi-dimensional sample dataset. In some implementations, the method can include presenting, by the one or more processors, the indication of each tensor within a graphical user interface.

In some implementations, receiving the first request includes receiving, by the one or more processors, an interaction that defines a change in the first view position of the first view.

In some implementations, receiving the first request includes receiving, by the one or more processors, an interaction that defines a change in the first view size of the first view.

In some implementations, the method includes receiving, by the one or more processors, an interaction that defines a subset of the tensors of each sample of the multi-dimensional sample dataset that are to be displayed according to the first view size and the second view position of the second view.

In some implementations, the one or more first tensor types are part of a first group of the respective tensors of each sample of the multi-dimensional sample dataset.

In some implementations, one or more of the first view size and the first view position are associated with a respective default value. In some implementations, the method includes generating, by the one or more processors, the layout by setting one or more of the first view size and the first view position to the respective default value.

In some implementations, the method includes receiving, by the one or more processors, a request to view at least a portion of the multi-dimensional dataset according to a second layout. In some implementations, the method includes presenting, by the one or more processors, at least the portion of the multi-dimensional sample dataset according to the second layout.

In some implementations, a system can include a data processing system including memory coupled to one or more processors to receive a request to modify a layout for samples of a multi-dimensional dataset, each sample of the multi-dimensional sample dataset corresponding to a respective tensors. In some implementations, the data processing system can provide a graphical user interface that enables modification of the layout. In some implementations, the data processing system, responsive to providing the graphical user interface, receive a first request to create or modify a first view of one or more first tensor types of the respective tensors of each sample of the multi-dimensional sample dataset, the request identifying one or more first tensor types and one or more of a first view size and a first view position. In some implementations, the data processing system can receive a second request to create or modify a second view of one or more second tensor types of the respective tensors of each sample of the multi-dimensional sample dataset, the request identifying the one or more second tensor types and one or more of a second view size and a second view position. In some implementations, the data processing system can generate the layout based on the first request and the second request, the layout including the first view and the second view. In some implementations, the data processing system can present at least a portion of the multi-dimensional sample dataset according to the layout.

In some implementations, the one or more second tensor types has at least one tensor type in common with the one or more first tensor types.

In some implementations, the data processing system is configured to receive an interaction that defines a change in the first view position of the first view.

In some implementations, the data processing system is configured to receive an interaction that defines a change in the first view size of the first view.

In some implementations, one or more of the first view size and the first view position are associated with a respective default value. In some implementations, the data processing system is configured to generate the layout by setting one or more of the first view size and the first view position to the respective default value.

In some implementations, one or more storage media storing instructions thereon that, when executed by one or more processors, cause the one or more processors to receive a request to modify a layout for samples of a multi-dimensional dataset, each sample of the multi-dimensional sample dataset corresponding to a respective tensors. The instructions can cause the one or more processors to provide a graphical user interface that enables modification of the layout. The instructions can cause the one or more processors to, responsive to providing the graphical user interface, receive a first request to create or modify a first view of one or more first tensor types of the respective tensors of each sample of the multi-dimensional sample dataset, the request identifying one or more first tensor types and one or more of a first view size and a first view position. The instructions can cause the one or more processors to receive a second request to create or modify a second view of one or more second tensor types of the respective tensors of each sample of the multi-dimensional sample dataset, the request identifying the one or more second tensor types and one or more of a second view size and a second view position. The instructions can cause the one or more processors to generate the layout based on the first request and the second request, the layout including the first view and the second view. The instructions can cause the one or more processors to present at least a portion of the multi-dimensional sample dataset according to the layout.

In some implementations, the one or more second tensor types has at least one tensor type in common with the one or more first tensor types.

In some implementations, the instructions cause the one or more processors to receive an interaction that defines a change in the first view position of the first view.

In some implementations, the instructions cause the one or more processors to receive an interaction that defines a change in the first view size of the first view.

In some implementations, one or more of the first view size and the first view position are associated with a respective default value. In some implementations, the instructions cause the one or more processors to generate the layout by setting one or more of the first view size and the first view position to the respective default value.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 105 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for visualizing multi-dimensional sample datasets, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed:

1. A method, comprising:
   identifying, by one or more processors, filtering criteria for displaying a multi-dimensional sample dataset within a display region of a graphical user interface;
   selecting, by the one or more processors, based on the filtering criteria, a subset of samples from the multi-dimensional sample dataset, each sample of the subset of samples associated with a respective set of tensors that are to be displayed within the display region;
   generating, by the one or more processors, a set of fetch requests for display data corresponding to the respective set of tensors of the subset of samples;
   mapping, by the one or more processors, the display data retrieved according to the set of fetch requests to respective display locations for display in the display region; and
   presenting, by the one or more processors, the display data associated with the respective set of tensors in the display region according to the mapping.

2. The method of claim 1, comprising mapping, by the one or more processors, the display data to a two-dimensional grid format.

3. The method of claim 1, comprising mapping, by the one or more processors, the display data to a list format.

4. The method of claim 1, comprising:
   receiving, by the one or more processors, a request to adjust a first display position of the display region to a second display position;
   selecting, by the one or more processors, based on the filtering criteria and the second display position, a second subset of samples from the multi-dimensional sample dataset;
   mapping, by the one or more processors, second display data associated with the respective set of tensors of each sample of the second subset of samples to respective display locations for display in the display region; and
   presenting, by the one or more processors, the second display data associated with the respective set of tensors of the second subset of samples in the display region according to the second mapping.

5. The method of claim 1, comprising:
   receiving, by the one or more processors, a request to adjust a first zoom level of the display region to a second zoom level;
   selecting, by the one or more processors, based on the filtering criteria and the second zoom level, a second subset of samples from the multi-dimensional sample dataset;
   mapping, by the one or more processors, second display data associated with a subset of the respective set of tensors of each sample of the second subset of samples to respective display locations for display in the display region, the subset of the respective set of tensors selected based on the second zoom level; and
   presenting, by the one or more processors, the second display data associated with the respective set of tensors of the second subset of samples in the display region according to the second mapping.

6. The method of claim 1, comprising terminating, by the one or more processors, at least one of the set of fetch requests for the display data responsive to receiving a request to adjust a first zoom level of the display region to a second zoom level.

7. The method of claim 1, comprising terminating, by the one or more processors, at least one of the set of fetch requests for the display data responsive to receiving a request to adjust a first display location of the display region to a second display location.

8. A system, comprising:
   a data processing system comprising memory coupled to one or more processors to:
   identify filtering criteria for displaying a multi-dimensional sample dataset within a display region of a graphical user interface;
   select based on the filtering criteria, a subset of samples from the multi-dimensional sample dataset, each sample of the subset of samples associated with a respective set of tensors that are to be displayed within the display region;
   generate a set of fetch requests for display data corresponding to the respective set of tensors of the subset of samples;
   map the display data retrieved according to the set of fetch requests to respective display locations for display in the display region; and
   present the display data associated with the respective set of tensors in the display region according to the mapping.

9. The system of claim 8, wherein the data processing system is configured to map the display data to a two-dimensional grid format.

10. The system of claim 8, wherein the data processing system is configured to map the display data to a list format.

11. The system of claim 8, wherein the data processing system is configured to:
- receive a request to adjust a first display position of the display region to a second display position;
- select based on the filtering criteria and the second display position, a second subset of samples from the multi-dimensional sample dataset;
- map second display data associated with the respective set of tensors of each sample of the second subset of samples to respective display locations for display in the display region; and
- present the second display data associated with the respective set of tensors of the second subset of samples in the display region according to the second mapping.

12. The system of claim 8, wherein the data processing system is configured to:
- receive a request to adjust a first zoom level of the display region to a second zoom level;
- select based on the filtering criteria and the second zoom level, a second subset of samples from the multi-dimensional sample dataset;
- map second display data associated with a subset of the respective set of tensors of each sample of the second subset of samples to respective display locations for display in the display region, the subset of the respective set of tensors selected based on the second zoom level; and
- present the second display data associated with the respective set of tensors of the second subset of samples in the display region according to the second mapping.

13. The system of claim 8, wherein the data processing system is configured to terminate at least one of the set of fetch requests for the display data responsive to receiving a request to adjust a first zoom level of the display region to a second zoom level.

14. The system of claim 8, wherein the data processing system is configured to terminate at least one of the set of fetch requests for the display data responsive to receiving a request to adjust a first display location of the display region to a second display location.

15. One or more storage media storing instructions thereon, that, when executed by one or more processors, cause the one or more processors to:
- identify filtering criteria for displaying a multi-dimensional sample dataset within a display region of a graphical user interface;
- select based on the filtering criteria, a subset of samples from the multi-dimensional sample dataset, each sample of the subset of samples associated with a respective set of tensors that are to be displayed within the display region;
- generate a set of fetch requests for display data corresponding to the respective set of tensors of the subset of samples;
- map the display data retrieved according to the set of fetch requests to respective display locations for display in the display region; and
- present the display data associated with the respective set of tensors in the display region according to the mapping.

16. The one or more storage media of claim 15, the instructions causing the one or more processors to:
- receive a request to adjust a first display position of the display region to a second display position;
- select based on the filtering criteria and the second display position, a second subset of samples from the multi-dimensional sample dataset;
- map second display data associated with the respective set of tensors of each sample of the second subset of samples to respective display locations for display in the display region; and
- present the second display data associated with the respective set of tensors of the second subset of samples in the display region according to the second mapping.

17. The one or more storage media of claim 15, the instructions causing the one or more processors to:
- receive a request to adjust a first zoom level of the display region to a second zoom level;
- select based on the filtering criteria and the second zoom level, a second subset of samples from the multi-dimensional sample dataset;
- map second display data associated with a subset of the respective set of tensors of each sample of the second subset of samples to respective display locations for display in the display region, the subset of the respective set of tensors selected based on the second zoom level; and
- present the second display data associated with the respective set of tensors of the second subset of samples in the display region according to the second mapping.

\* \* \* \* \*